US012793734B2

(12) United States Patent
Nakagawa et al.

(10) Patent No.: US 12,793,734 B2
(45) Date of Patent: *Nov. 10, 2026

(54) MAGNETIC HEAD AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki (JP); Masayuki Takagishi, Tokyo (JP); Naoyuki Narita, Funabashi (JP); Tomoyuki Maeda, Kawasaki (JP); Ryo Osamura, Kawasaki (JP); Tazumi Nagasawa, Yokohama (JP); Kosuke Kurihara, Yokohama (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/176,589

(22) Filed: Apr. 11, 2025

(65) Prior Publication Data

US 2025/0239272 A1 Jul. 24, 2025

Related U.S. Application Data

(63) Continuation of application No. 18/363,624, filed on Aug. 1, 2023, now Pat. No. 12,300,279.

(30) Foreign Application Priority Data

Mar. 1, 2023 (JP) ................................ 2023-031365

(51) Int. Cl.
*G11B 5/31* (2006.01)

(52) U.S. Cl.
CPC ................................ *G11B 5/3146* (2013.01)

(58) Field of Classification Search
None
See application file for complete search history.

(56) References Cited

U.S. PATENT DOCUMENTS

| | | | |
|---|---|---|---|
| 7,616,412 | B2 | 11/2009 | Zhu et al. |
| 9,007,721 | B2 | 4/2015 | Sato et al. |

(Continued)

FOREIGN PATENT DOCUMENTS

| | | | |
|---|---|---|---|
| JP | 2006-331538 | A | 12/2006 |
| JP | 2008-277586 | A | 11/2008 |

(Continued)

OTHER PUBLICATIONS

Final Office Action of corresponding U.S. Appl. No. 18/363,613 issued on Apr. 22, 2024 in 9 pages.

(Continued)

*Primary Examiner* — William J Klimowicz
(74) *Attorney, Agent, or Firm* — Knobbe, Martens, Olson & Bear, LLP

(57) ABSTRACT

According to one embodiment, a magnetic head includes a first magnetic pole, a second magnetic pole, and a magnetic element provided between the first and the second magnetic poles. The magnetic element includes first to fifth magnetic layers. A differential electric resistance of the magnetic element when a voltage between the first magnetic pole and the second magnetic pole being changed includes a first positive peak and a second positive peak. The voltage corresponding to the first positive peak is a first positive peak voltage. The voltage corresponding to the second positive peak is a second positive peak voltage. The second positive peak voltage is higher than the first positive peak voltage. An element voltage applied between the first mag- (Continued)

netic pole and the second magnetic pole in a recording operation is higher than the second positive peak voltage.

5 Claims, 52 Drawing Sheets

(56) References Cited

U.S. PATENT DOCUMENTS

| | | | | |
|---|---|---|---|---|
| 9,064,508 | B1 | 6/2015 | Shiimoto et al. | |
| 9,117,474 | B1 | 8/2015 | Contreras et al. | |
| 10,325,618 | B1 | 6/2019 | Wu et al. | |
| 10,522,174 | B1 | 12/2019 | Chen et al. | |
| 10,714,129 | B1 | 7/2020 | Tang et al. | |
| 10,937,450 | B1 | 3/2021 | Kawasaki et al. | |
| 11,393,493 | B1 | 7/2022 | Nakagawa et al. | |
| 11,398,244 | B2 | 7/2022 | Takagishi et al. | |
| 11,568,891 | B1 | 1/2023 | Chen et al. | |
| 12,190,917 | B2 * | 1/2025 | Nakagawa | G11B 5/1278 |
| 2005/0053805 | A1 | 3/2005 | Hinoue et al. | |
| 2006/0051620 | A1 | 3/2006 | Hinoue et al. | |
| 2006/0057429 | A1 | 3/2006 | Hinoue et al. | |
| 2006/0269793 | A1 | 11/2006 | Hinoue et al. | |
| 2006/0292401 | A1 | 12/2006 | Suzuki et al. | |
| 2008/0019040 | A1 | 1/2008 | Zhu et al. | |
| 2008/0268291 | A1 | 10/2008 | Akiyama et al. | |
| 2009/0052095 | A1 | 2/2009 | Yamada et al. | |
| 2009/0059417 | A1 | 3/2009 | Takeo et al. | |
| 2009/0197120 | A1 | 8/2009 | Taguchi et al. | |
| 2009/0258253 | A1 | 10/2009 | Hinoue et al. | |
| 2012/0126905 | A1 | 5/2012 | Zhang et al. | |
| 2012/0164487 | A1 | 6/2012 | Childress et al. | |
| 2012/0176702 | A1 | 7/2012 | Yamada et al. | |
| 2013/0050869 | A1 | 2/2013 | Nagasaka et al. | |
| 2015/0043106 | A1 | 2/2015 | Yamada et al. | |
| 2016/0027455 | A1 | 1/2016 | Kudo et al. | |
| 2019/0088275 | A1 | 3/2019 | Narita et al. | |
| 2020/0090685 | A1 | 3/2020 | Takagishi et al. | |
| 2020/0294537 | A1 | 9/2020 | Nagasawa et al. | |
| 2020/0381012 | A1 | 12/2020 | Chembrolu et al. | |
| 2020/0402532 | A1 | 12/2020 | Asif Bashir et al. | |
| 2021/0125631 | A1 | 4/2021 | Bai et al. | |
| 2021/0142821 | A1 | 5/2021 | Iwasaki et al. | |
| 2021/0375309 | A1 | 12/2021 | Iwasaki et al. | |
| 2022/0005497 | A1 | 1/2022 | Takagishi et al. | |
| 2022/0084551 | A1 | 3/2022 | Koizumi | |
| 2022/0157335 | A1 | 5/2022 | Iwasaki et al. | |
| 2022/0270640 | A1 | 8/2022 | Nakagawa et al. | |
| 2022/0270641 | A1 | 8/2022 | Nakagawa et al. | |
| 2022/0399035 | A1 | 12/2022 | Goncharov et al. | |
| 2023/0031273 | A1 | 2/2023 | Nakagawa et al. | |
| 2023/0046928 | A1 | 2/2023 | Nakagawa et al. | |
| 2023/0178102 | A1 | 6/2023 | Nakagawa et al. | |
| 2023/0386510 | A1 * | 11/2023 | Nakagawa | G11B 5/314 |
| 2023/0410841 | A1 * | 12/2023 | Freitag | G11B 5/3146 |
| 2024/0029759 | A1 | 1/2024 | Chen et al. | |
| 2024/0144961 | A1 | 5/2024 | Asif Bashir et al. | |
| 2024/0144962 | A1 | 5/2024 | Asif Bashir et al. | |
| 2024/0144963 | A1 | 5/2024 | Asif Bashir et al. | |
| 2024/0296861 | A1 * | 9/2024 | Nakagawa | G11B 5/235 |
| 2024/0296862 | A1 * | 9/2024 | Nakagawa | G11B 5/235 |
| 2024/0296863 | A1 * | 9/2024 | Nakagawa | G11B 5/1278 |
| 2024/0296864 | A1 * | 9/2024 | Nakagawa | G11B 5/3146 |
| 2024/0296865 | A1 * | 9/2024 | Nakagawa | G11B 5/1278 |
| 2024/0321296 | A1 * | 9/2024 | Goncharov | G11B 5/3143 |

FOREIGN PATENT DOCUMENTS

| | | | |
|---|---|---|---|
| JP | 2009-064499 | A | 3/2009 |
| JP | 4358279 | B2 | 11/2009 |
| JP | 2012-146351 | A | 8/2012 |
| JP | 2019-057338 | A | 4/2019 |
| JP | 2022-012263 | A | 1/2022 |
| JP | 2022-050037 | A | 3/2022 |
| JP | 2022-129730 | A | 9/2022 |
| JP | 2023-083663 | A | 6/2023 |

OTHER PUBLICATIONS

Office Action issued in U.S. Appl. No. 18/358,677 dated Oct. 15, 2024 in 24 pages.

Office Action of corresponding U.S. Appl. No. 18/358,872 issued on Jun. 18, 2024, 17 pages.

Office Action received in U.S. Appl. No. 18/363,423 dated Nov. 14, 2024 in 26 pages.

T. Tanaka, et al., "MAMR writability and signal-recording characteristics on granular exchange-coupled composite media" in Journal of Magnetism and Magnetic Materials 529 (2021).

X. Bai and J.-G. Zhu, "Effective Field Analysis of Segmented Media for Microwave-Assisted Magnetic Recording", in IEEE Magnetics Letters, vol. 8, pp. 1-4, 2017.

Office Action issued in Japanese Patent Application No. 2022-194583, dated Apr. 20, 2026 in 10 pages.

* cited by examiner

141

141a

MAGNETIC HEAD AND MAGNETIC RECORDING DEVICE

CROSS-REFERENCE TO RELATED APPLICATIONS

This application is a continuation application of U.S. patent application Ser. No. 18/363,624, filed on Aug. 1, 2023, which is hereby incorporated by reference in its entirety herein and which is based upon and claims the benefit of priority from Japanese Patent Application No. 2023-031365, filed on Mar. 1, 2023; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve recording density in the magnetic recording device.

DETAILED DESCRIPTION

Figure 1:
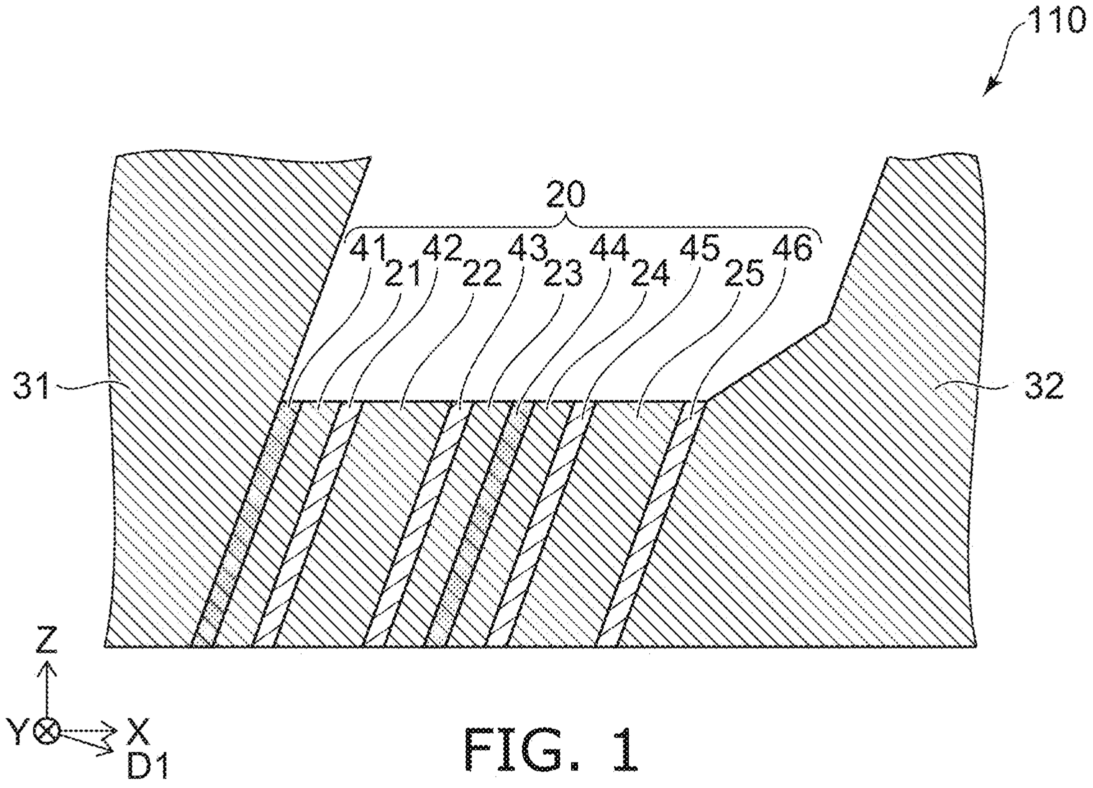
FIG. 1 is a schematic cross-sectional view illustrating a magnetic head according to a first embodiment.

According to one embodiment, a magnetic head includes a first magnetic pole, a second magnetic pole, and a magnetic element provided between the first magnetic pole and the second magnetic pole. The magnetic element includes a first magnetic layer, a second magnetic layer provided between the first magnetic layer and the second magnetic pole, a third magnetic layer provided between the second magnetic layer and the second magnetic pole, a fourth magnetic layer provided between the third magnetic layer and the second magnetic pole, and a fifth magnetic layer provided between the fourth magnetic layer and the second magnetic pole. One end of the magnetic element being electrically connected to the first magnetic pole. Another end of the magnetic element being electrically connected to the second magnetic pole. A differential electric resistance of the magnetic element when a voltage between the first magnetic pole and the second magnetic pole being changed includes a first positive peak and a second positive peak. The voltage corresponding to the first positive peak is a first positive peak voltage. The voltage corresponding to the second positive peak is a second positive peak voltage. The first positive peak voltage and the second positive peak voltage are positive with respect to the first magnetic pole. The second positive peak voltage is higher than the first positive peak voltage. An element voltage applied between the first magnetic pole and the second magnetic pole in a recording operation is higher than the second positive peak voltage.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head according to a first embodiment.

Figure 2:
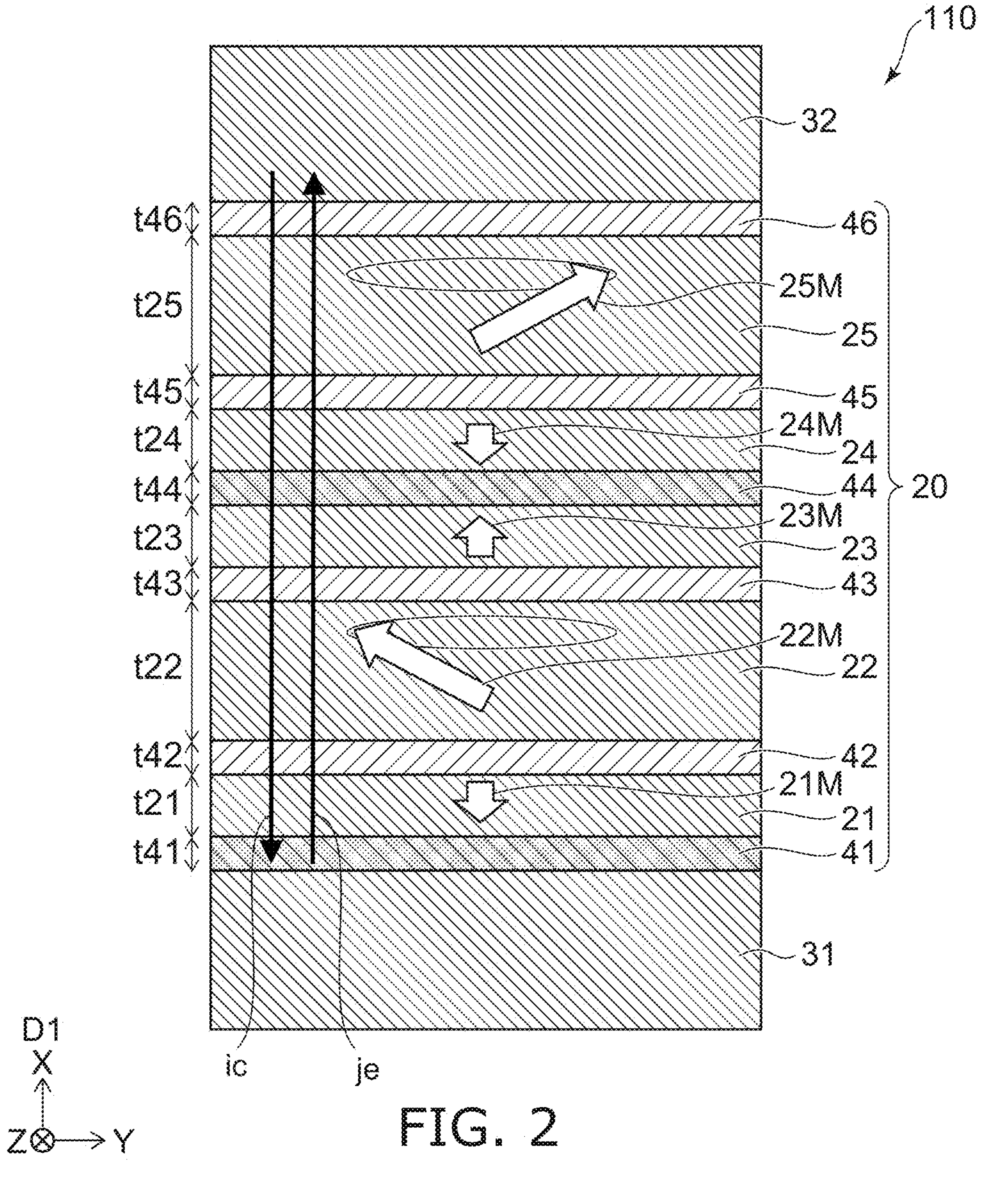
FIG. 2 is a schematic plan view illustrating the magnetic head according to the first embodiment.

FIG. 2 is a schematic plan view illustrating the magnetic head according to the first embodiment.

Figure 3:
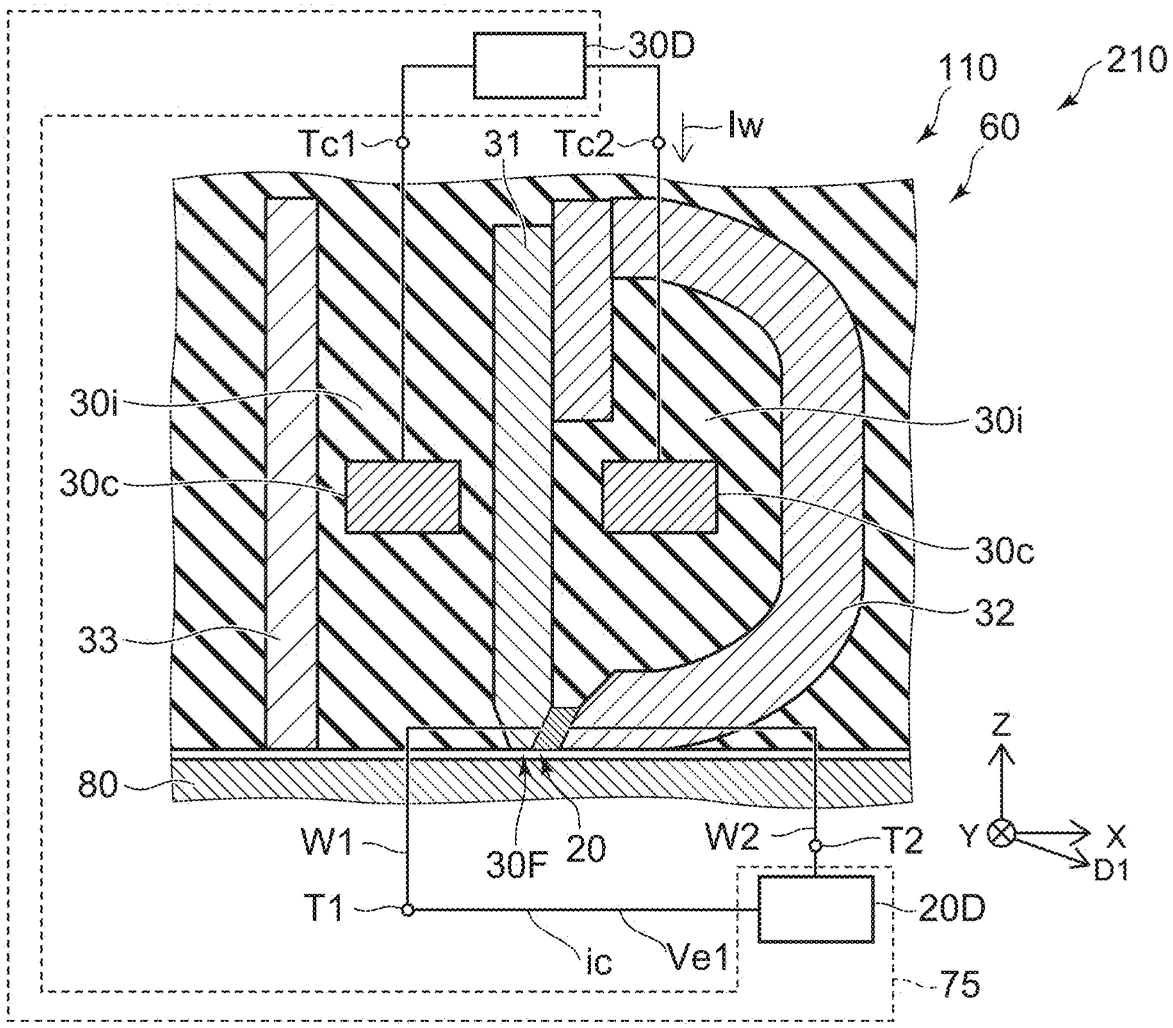
FIG. 3 is a schematic cross-sectional view illustrating the magnetic recording device including the magnetic head according to the first embodiment.

FIG. 3 is a schematic cross-sectional view illustrating the magnetic recording device including the magnetic head according to the first embodiment.

As shown in FIG. 3, a magnetic recording device 210 according to the embodiment includes a magnetic head 110 and a controller 75. The magnetic recording device 210 may include a magnetic recording medium 80. At least a recording operation is performed in the magnetic recording device 210. In the recording operation, information is recorded on the magnetic recording medium 80 using the magnetic head 110.

The magnetic head 110 includes a first magnetic pole 31, a second magnetic pole 32 and a magnetic element 20. The magnetic head 110 may include coil 30*c*. The first magnetic pole 31, the second magnetic pole 32, the magnetic element 20 and the coil 30*c* are included in the recording section 60. As will be described below, the magnetic head 110 may include a reproducing section. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, a main magnetic pole. The second magnetic pole 32 is, for example, a trailing shield. The first magnetic pole 31 may be the trailing shield and the second magnetic pole 32 may be the main pole.

A direction from the magnetic recording medium 80 to the magnetic head 110 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, the height direction. The X-axis direction corresponds to, for example, the down-track direction. The Y-axis direction corresponds to, for example, the cross-track direction. The magnetic recording medium 80 and the magnetic head 110 move relatively along the down-track direction. A recording magnetic field generated by a magnetic head 110 is applied to a desired position on the magnetic recording medium 80. Magnetization at a desired position of the magnetic recording medium 80 is controlled in a direction according to the recording magnetic field. Thus, information is recorded on the magnetic recording medium 80.

A direction from the first magnetic pole 31 to the second magnetic pole 32 is defined as a first direction D1. The first direction D1 is substantially along the X-axis direction. In the embodiments, the first direction D1 may be inclined with respect to the X-axis direction. The angle of inclination is, for example, more than 0 degrees and not more than 30 degrees.

In this example, a portion of coil 30$c$ is provided between the first magnetic pole 31 and the second magnetic pole 32. In this example, a shield 33 is provided. The first magnetic pole 31 is provided between the shield 33 and the second magnetic pole 32 in the X-axis direction. Another portion of coil 30$c$ is provided between the shield 33 and the first magnetic pole 31. An insulating portion 30$i$ is provided between these multiple elements. The shield 33 is, for example, a leading shield. The magnetic head 110 may also include side shields (not shown).

As shown in FIG. 3, the first magnetic pole 31 includes a medium facing surface 30F. The medium facing surface 30F is, for example, an ABS (Air Bearing Surface). The medium facing surface 30F faces the magnetic recording medium 80, for example. The medium facing surface 30F extends, for example, along the X-Y plane.

As shown in FIG. 3, the controller 75 includes a recording circuit 30D and an element circuit 20D. A recording current Iw is supplied from the recording circuit 30D to the coil 30$c$. For example, a first coil terminal Tc1 and a second coil terminal Tc2 are provided on the coil 30$c$. The recording current Iw is supplied to the coil 30$c$ via these coil terminals. The recording magnetic field corresponding to the recording current Iw is applied to the magnetic recording medium 80 from the first magnetic pole 31.

As shown in FIG. 3, the element circuit 20D is electrically connected to the magnetic element 20. In this example, the magnetic element 20 is electrically connected to the first magnetic pole 31 and the second magnetic pole 32. In the magnetic head 110, a first terminal T1 and a second terminal T2 are provided. The first terminal T1 is electrically connected to one end of the magnetic element 20 via the first wiring W1 and the first magnetic pole 31. The second terminal T2 is electrically connected to the other end of the magnetic element 20 via the second wiring W2 and the second magnetic pole 32. For example, an element current ic is supplied to the magnetic element 20 from the element circuit 20D. The element current ic is direct current, for example.

The element circuit 20D applies an element voltage Ve1 between the first terminal T1 and the second terminal T2. The element current ic based on the element voltage Ve1 flows through the magnetic element 20.

For example, by the element current ic equal to or higher than a threshold flowing through the magnetic element 20, oscillation occurs in a magnetic layer included in the magnetic element 20. The magnetic element 20 functions, for example, as an STO (Spin-Torque Oscillator). An alternating magnetic field (for example, a high-frequency magnetic field) is generated from the magnetic element 20 along with the oscillation. An alternating magnetic field generated by the magnetic element 20 is applied to the magnetic recording medium 80 to assist recording on the magnetic recording medium 80. For example, MAMR (Microwave Assisted Magnetic Recording) can be performed.

As described above, the controller 75 is configured to supply the recording current Iw to the coil 30$c$ and supply the element current ic to the magnetic element 20.

FIG. 2 corresponds to a plan view of the medium facing surface 30F viewed from the magnetic recording medium 80.

As shown in FIGS. 1 and 2, the magnetic element 20 includes a first magnetic layer 21, a second magnetic layer 22, a third magnetic layer 23, a fourth magnetic layer 24, a fifth magnetic layer 25, and a first non-magnetic layer. 41, a second non-magnetic layer 42, a third non-magnetic layer 43, a fourth non-magnetic layer 44, a fifth non-magnetic layer 45 and a sixth non-magnetic layer 46.

The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32. The fifth magnetic layer 25 is provided between the fourth magnetic layer 24 and the second magnetic pole 32.

The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the fourth magnetic layer 24. The fifth non-magnetic layer 45 is provided between the fourth magnetic layer 24 and the fifth magnetic layer 25. The sixth non-magnetic layer 46 is provided between the fifth magnetic layer 25 and the second magnetic pole 32.

In the embodiments, the sixth non-magnetic layer 46 includes at least one selected from the group consisting of Cu, Au, Cr, Al, V and Ag.

By such a configuration, highly efficient and stable oscillation can be obtained. According to the embodiments, it is possible to provide a magnetic head capable of improving the recording density. An example of simulation results of the characteristics of the magnetic element will be described below.

Figure 4:
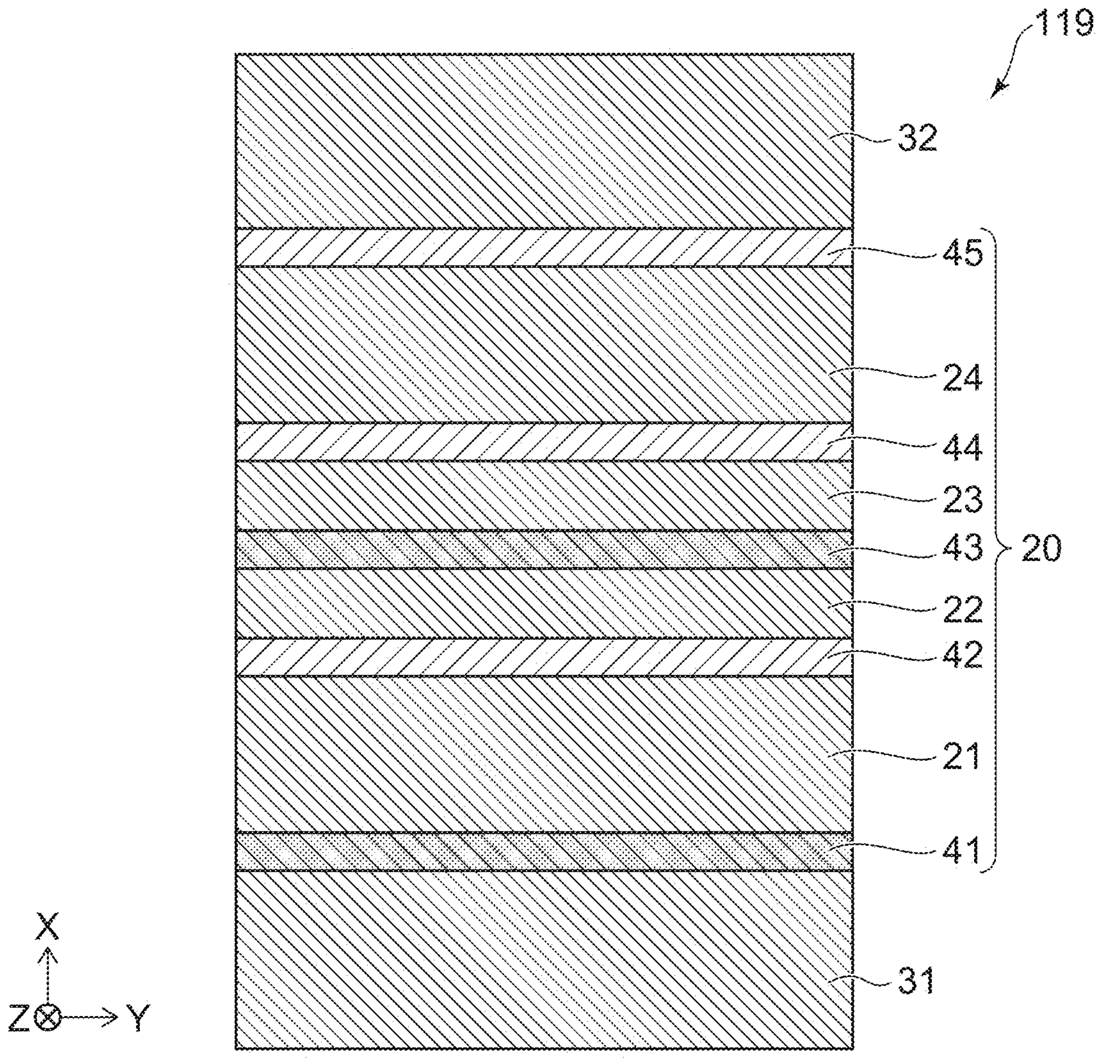
FIG. 4 is a schematic plan view illustrating a magnetic head of a reference example.

FIG. 4 is a schematic plan view illustrating a magnetic head of a reference example.

FIG. 4 shows a magnetic head 119 of a reference example. The magnetic head 119 has four magnetic layers and five non-magnetic layers.

Figure 5:
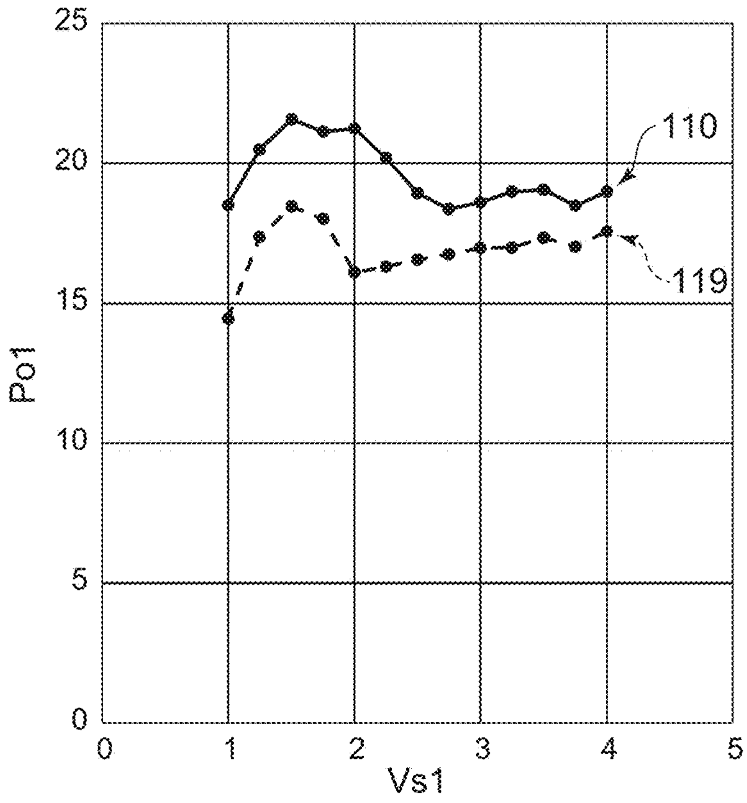
FIG. 5 is a graph illustrating characteristics of the magnetic heads.

FIG. 5 is a graph illustrating characteristics of the magnetic heads.

The horizontal axis of FIG. 5 is the normalized applied voltage Vs1. The applied voltage Vs1 is applied between one end of the magnetic element 20 and the other end. The vertical axis is the oscillation parameter Pol. The higher the oscillation parameter Pol, the higher the intensity of oscillation. In FIG. 5, the characteristics of the magnetic head 110 according to the embodiment and the characteristics of the magnetic head 119 of the reference example are shown.

As shown in FIG. 5, the oscillation parameter Pol in the magnetic head 110 is higher than the oscillation parameter Pol in the magnetic head 119 of the reference example. The oscillation parameter Pot is lower than the oscillation parameter Pot of the magnetic head 110 even when the thickness relationships of the magnetic layers included in the magnetic head 119 of the reference example are changed.

By a configuration in which the number of magnetic layers is five, high-intensity oscillation can be obtained. High efficiency and stable oscillation can be obtained. According to the embodiments, it is possible to provide a magnetic head capable of improving the recording density.

As described above, the sixth non-magnetic layer 46 includes at least one selected from the group consisting of Cu, Au, Cr, Al, V and Ag. Thereby, providing and receiving spins between the fifth magnetic layer 25 and the second magnetic pole 32 becomes easy. For example, the second magnetic pole 32 functions as a spin injection layer for the fifth magnetic layer 25.

In the embodiments, the first non-magnetic layer 41 includes at least one selected from the group consisting of Ru, Ir, Ta, Rh, Pd, Pt and W, for example. For example, the second non-magnetic layer 42 includes at least one selected from the group consisting of Cu, Au, Cr, Al, V and Ag. For example, the third non-magnetic layer 43 includes at least one selected from the group consisting of Cu, Au, Cr, Al, V and Ag. For example, the fourth non-magnetic layer 44 includes at least one selected from the group consisting of Ru, Ir, Ta, Rh, Pd, Pt and W. For example, the fifth non-magnetic layer 45 includes at least one selected from the group consisting of Cu, Au, Cr, Al, V and Ag.

At least one of the first magnetic layer 21, the second magnetic layer 22, the third magnetic layer 23, the fourth magnetic layer 24, or the fifth magnetic layer 25 includes at least one selected from the group consisting of Fr, Co, and Ni. These magnetic layers are, for example, ferromagnetic layers.

As shown in FIG. 2, a thickness of the first magnetic layer 21 in the first direction D1 is defined as a first thickness t21. The first direction D1 is a direction from the first magnetic pole 31 to the second magnetic pole 32. A thickness of the second magnetic layer 22 in the first direction D1 is defined as a second thickness t22. A thickness of the third magnetic layer 23 in the first direction D1 is defined as a third thickness t23. A thickness of the fourth magnetic layer 24 in the first direction D1 is defined as a fourth thickness t24. A thickness of the fifth magnetic layer 25 in the first direction D1 is defined as a fifth thickness t25.

In the embodiments, the second thickness t22 is thicker than the first thickness t21. The second thickness t22 is thicker than the third thickness t23. The second thickness t22 is thicker than the fourth thickness t24. The fifth thickness t25 is thicker than the first thickness t21. The fifth thickness t25 is thicker than the third thickness t23. The fifth thickness t25 is thicker than the fourth thickness t24.

The second magnetic layer 22 and the fifth magnetic layer 25 function, for example, oscillation layers. The first magnetic layer 21, the third magnetic layer 23, and the fourth magnetic layer 24 function, for example, as spin injection layers.

For example, when the element current ic equal to or higher than the threshold voltage flows through the magnetic element 20, the magnetization 22M of the second magnetic layer 22 and the magnetization 25M of the fifth magnetic layer 25 oscillate. For example, an alternating magnetic field is generated.

For example, a component along the first direction D1 of the magnetization 24M of the fourth magnetic layer 24 is opposite to a component along the first direction D1 of the magnetization 23M of the third magnetic layer 23. A component along the first direction D1 of the magnetization 21M of the first magnetic layer 21 is opposite to the component along the first direction D1 of the magnetization 23M of the third magnetic layer 23.

As shown in FIG. 2, a thickness of the first non-magnetic layer 41 in the first direction D1 is defined as a first non-magnetic layer thickness t41. A thickness of the second non-magnetic layer 42 in the first direction D1 is defined as a second non-magnetic layer thickness t42. A thickness of the third non-magnetic layer 43 in the first direction D1 is defined as a third non-magnetic layer thickness t43. A thickness of the fourth non-magnetic layer 44 in the first direction D1 is defined as a fourth non-magnetic layer thickness t44. A thickness of the fifth non-magnetic layer 45 in the first direction D1 is defined as a fifth non-magnetic layer thickness t45. A thickness of the sixth non-magnetic layer 46 in the first direction D1 is defined as a sixth non-magnetic layer thickness t46.

For example, the second thickness t22 may be not less than 1.5 times and not more than 10 times the first thickness t21. The second thickness t22 may be not less than 1.5 times and not more than 10 times the third thickness t23. The second thickness t22 may be not less than 1.5 times and not more than 10 times the fourth thickness t24.

For example, the fifth thickness t25 may be not less than 1.5 times and not more than 10 times the first thickness t21. The fifth thickness t25 may be not less than 1.5 times and not more than 10 times the third thickness t23. The fifth thickness t25 may be not less than 1.5 times and not more than 10 times the fourth thickness t24.

For example, the first thickness t21 is not less than 0.5 nm and not more than 5 nm. For example, the second thickness t22 is not less than 4 nm and not more than 15 nm. For example, the third thickness t23 is not less than 0.5 nm and not more than 5 nm. For example, the fourth thickness t24 is not less than 0.5 nm and not more than 5 nm. For example, the fifth thickness t25 is not less than 4 nm and not more than 15 nm.

The first non-magnetic layer thickness t41 may be, for example, not less than 1 nm and not more than 10 nm. The second non-magnetic layer thickness t42 may be, for example, not less than 0.5 nm and not more than 6 nm. The third non-magnetic layer thickness t43 may be, for example, not less than 0.5 nm and not more than 6 nm. The fourth non-magnetic layer thickness t44 may be, for example, not less than 1 nm and not more than 10 nm. The fifth nonmagnetic layer thickness t45 may be, for example, not less than 0.5 nm and not more than 6 nm. The sixth non-magnetic layer thickness t46 may be, for example, not less than 0.5 nm and not more than 6 nm.

As shown in FIG. 2, when the magnetic head 110 is in operation, the element current ic equal to or higher than the threshold value is supplied to the magnetic element 20. The element current ic flows in the direction from the second magnetic pole 32 to the first magnetic pole 31, for example. An electron flow je corresponding to the device current ic flows in the direction from the first magnetic pole 31 to the second magnetic pole 32. The element current ic flows in the direction from the sixth non-magnetic layer 46 to the first non-magnetic layer 41.

The element voltage Ve1 is applied to the magnetic element 20 in the operation. A potential of the second magnetic pole 32 is higher than a potential of the first magnetic pole 31.

The element current ic and the element voltage Ve1 are supplied by the element circuit 20D. For example, one end of the magnetic element 20 is electrically connected to the first magnetic pole 31. The other end of the magnetic element 20 is electrically connected to the second magnetic pole 32. The element circuit 20D is configured to apply the element voltage Ve1 between the first magnetic pole 31 and the second magnetic pole 32. The potential of the first magnetic pole 31 is lower than the potential of the second magnetic pole 32 when the element voltage Ve1 is applied.

Figure 6:
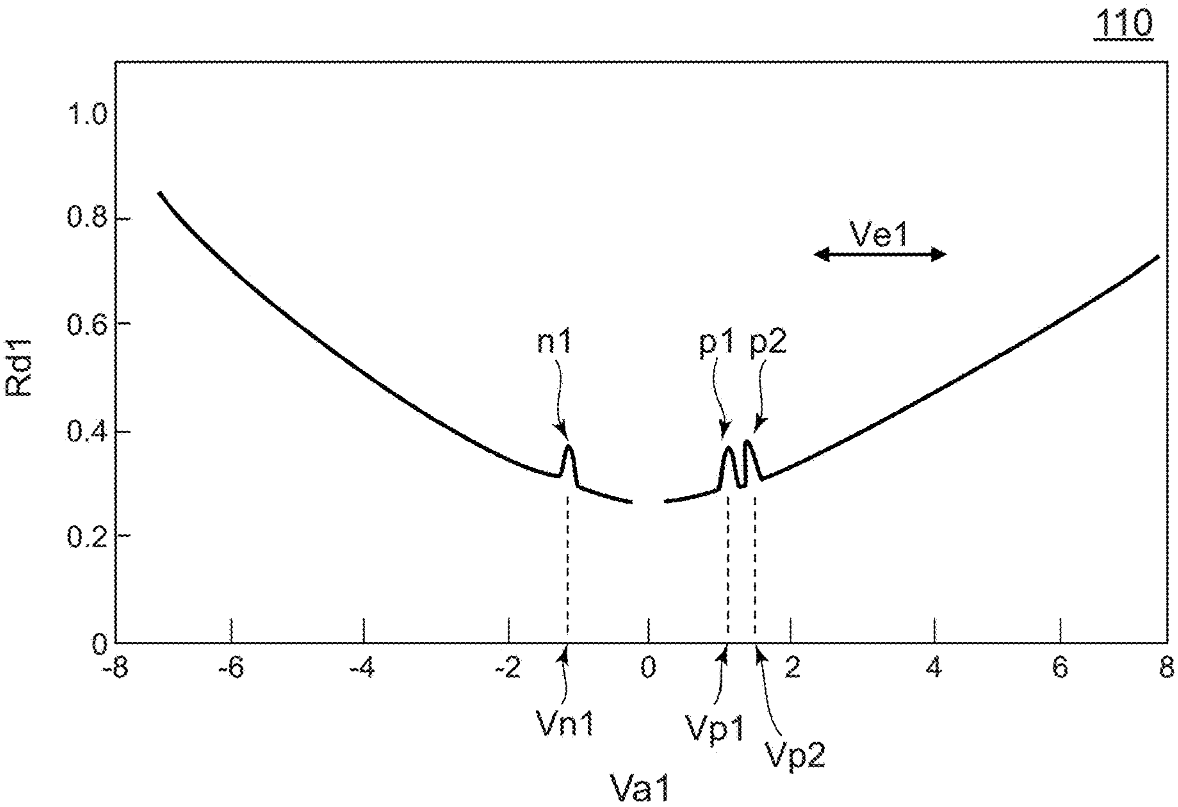
FIG. 6 is a graph illustrating characteristics of the magnetic head.

FIG. 6 is a graph illustrating characteristics of the magnetic head.

FIG. 6 illustrates a differential electrical resistance of the magnetic element 20 when the voltage Vat applied to the magnetic element 20 is changed. The horizontal axis of FIG. 6 is the voltage Vat. The vertical axis is the differential electrical resistance Rd1. The voltage Vat may be the voltage between the first terminal T1 and the second terminal T2. For example, a voltage corresponding to voltage Vat is applied to the magnetic element 20.

As shown in FIG. 6, the differential electrical resistance Rd1 when the voltage Va1 is changed includes three or more peaks. These peaks are considered to correspond to discontinuous changes in electrical resistance accompanying reversal of magnetization of the multiple magnetic layers included in the magnetic element 20.

The magnetic recording device 210 (see FIG. 3) includes the magnetic head according to the embodiment and the controller 75. The controller 75 includes the element circuit 20D. For example, one end of the magnetic element 20 is electrically connected to the first magnetic pole 31. The other end of the magnetic element 20 is electrically connected to the second magnetic pole 32. The potential of the first magnetic pole 31 is lower than the potential of the second magnetic pole 32 when the element voltage Ve1 is applied.

The differential electrical resistance Rd1 of the magnetic element 20 when the voltage Va1 between the first magnetic pole 31 and the second magnetic pole 32 is changed includes a first negative peak n1, a first positive peak p1 and a second positive peak p2. The voltage Va1 corresponding to the first negative peak n1 is defined as a first negative peak voltage Vn1. The voltage Va1 corresponding to the first positive peak p1 is defined as a first positive peak voltage Vp1. The voltage Va1 corresponding to the second positive peak p2 is defined as a second positive peak voltage Vp2.

The first negative peak voltage Vn1 is negative, and the first positive peak voltage Vp1 and the second positive peak voltage Vp2 are positive. The potential of the first magnetic pole 31 is higher than the potential of the second magnetic pole 32 when the negative voltage Vat is applied. The potential of the first magnetic pole 31 is lower than the potential of the second magnetic pole 32 when the positive voltage Vat is applied.

The first positive peak voltage Vp1 is higher than the first negative peak voltage Vn1 and lower than the second positive peak voltage Vp2. The element voltage Ve1 is equal to or higher than the second positive peak voltage Vp2. A stable and high-intensity oscillation can be obtained. The absolute value of the first negative peak voltage Vn1 may be greater than the second positive peak voltage Vp2.

Thus, the differential electrical resistance Rd1 includes three or more peaks (e.g., first peak, second peak and third peak). The "first peak" is, for example, the first negative peak n1. The "second peak" is, for example, the first positive peak p1. The "third peak" is, for example, the second positive peak p2. The first negative peak voltage Vn1 is, for example, the first voltage. The first positive peak voltage Vp1 is, for example, the second voltage. The second positive peak voltage Vp2 is, for example, the third voltage. The second voltage is between the first voltage and the third voltage. The element voltage Vet is equal to or higher than the third voltage.

In the magnetic head 110, for example, the absolute value of the element voltage Vet is ten times or less the absolute value of the first negative peak voltage Vn1. For example, the absolute value of the element voltage Vet may be eight times or less the absolute value of the first negative peak voltage Vn1. For example, the absolute value of the element voltage Vet is ten times or less the absolute value of the first positive peak voltage Vp1. The absolute value of the element voltage Vet may be eight times or less the absolute value of the first positive peak voltage Vpt.

In the magnetic head 110, for example, the absolute value of the third voltage is four times or less the absolute value of the first negative peak voltage Vn1. For example, the absolute value of the third voltage may be less than or equal to three times the absolute value of the first negative peak voltage Vn1. For example, the absolute value of the third voltage is four times or less the absolute value of the first positive peak voltage Vpt. The absolute value of the third voltage may be three times or less the absolute value of the first positive peak voltage Vpt.

In the embodiments, the tail of the first positive peak pt may overlap the second positive peak p2. The tail of the second positive peak p2 may overlap the first positive peak pt.

The embodiments may include the following configurations (for example, technical proposals).

Configuration A1

A magnetic head, comprising:

- a first magnetic pole;
- a second magnetic pole; and
- a magnetic element provided between the first magnetic pole and the second magnetic pole,
- the magnetic element including
- a first magnetic layer,
- a second magnetic layer provided between the first magnetic layer and the second magnetic pole,
- a third magnetic layer provided between the second magnetic layer and the second magnetic pole,
- a fourth magnetic layer provided between the third magnetic layer and the second magnetic pole,
- a fifth magnetic layer provided between the fourth magnetic layer and the second magnetic pole,
- a first non-magnetic layer provided between the first magnetic pole and the first magnetic layer,
- a second non-magnetic layer provided between the first magnetic layer and the second magnetic layer,
- a third non-magnetic layer provided between the second magnetic layer and the third magnetic layer,
- a fourth non-magnetic layer provided between the third magnetic layer and the fourth magnetic layer,
- a fifth non-magnetic layer provided between the fourth magnetic layer and the fifth magnetic layer, and
- a sixth non-magnetic layer provided between the fifth magnetic layer and the second magnetic pole,
- the sixth non-magnetic layer including at least one selected from the group consisting of Cu, Au, Cr, Al, V and Ag.

Configuration A2

The magnetic head according to Configuration A1, wherein

- the first non-magnetic layer includes at least one selected from the group consisting of Ru, Ir, Ta, Rh, Pd, Pt and W,
- the second non-magnetic layer includes at least one selected from the group consisting of Cu, Au, Cr, Al, V and Ag,
- the third non-magnetic layer includes at least one selected from the group consisting of Cu, Au, Cr, Al, V and Ag,
- the fourth non-magnetic layer includes at least one selected from the group consisting of Ru, Ir, Ta, Rh, Pd, Pt and W, and
- the fifth non-magnetic layer includes at least one selected from the group consisting of Cu, Au, Cr, Al, V and Ag.

Configuration A3

The magnetic head according to Configuration A2, wherein

- a second thickness of the second magnetic layer in a first direction from the first magnetic pole to the second magnetic pole is thicker than a first thickness of the first magnetic layer in the first direction, the second thickness is thicker than a third thickness of the third magnetic layer in the first direction, the second thickness is thicker than a fourth thickness of the fourth magnetic layer in the first direction, and a fifth thickness of the fifth magnetic layer in the first direction is thicker than the first thickness, thicker than the third thickness, and thicker than the fourth thickness.

Configuration A4

The magnetic head according to Configuration A3, wherein the second thickness is not less than 1.5 times and not more than 10 times the first thickness, the second thickness is not less than 1.5 times and not more than 10 times the third thickness, the second thickness is not less than 1.5 times and not more than 10 times the fourth thickness, the fifth thickness is not less than 1.5 times and not more than 10 times the first thickness, the fifth thickness is not less than 1.5 times and not more than 10 times the third thickness, and the fifth thickness is not less than 1.5 times and not more than 10 times the fourth thickness.

Configuration A5

The magnetic head according to Configuration A3, wherein the first thickness is not less than 0.5 nm and not more than 5 nm, the second thickness is not less than 4 nm and not more than 10 nm, the third thickness is not less than 0.5 nm and not more than 5 nm, the fourth thickness is not less than 0.5 nm and not more than 5 nm, and the fifth thickness is not less than 4 nm and not more than 10 nm.

Configuration A6

The magnetic head according to any one of Configurations A3-A5, wherein a first non-magnetic layer thickness of the first non-magnetic layer in the first direction is not less than 1 nm and not more than 10 nm, a second non-magnetic layer thickness of the second non-magnetic layer in the first direction is not less than 0.5 nm and not more than 6 nm, a third non-magnetic layer thickness of the third non-magnetic layer in the first direction is not less than 0.5 nm and not more than 6 nm, a fourth non-magnetic layer thickness of the fourth non-magnetic layer in the first direction is not less than 1 nm and not more than 10 nm, a fifth non-magnetic layer thickness of the fifth non-magnetic layer in the first direction is not less than 0.5 nm and not more than 6 nm, and a sixth non-magnetic layer thickness of the sixth non-magnetic layer in the first direction is not less than 0.5 nm and not more than 6 nm or less.

Configuration A7

The magnetic head according to any one of Configurations A1-A6, wherein one end of the magnetic element is electrically connected to the first magnetic pole, another end of the magnetic element is electrically connected to the second magnetic pole, and a differential electrical resistance of the magnetic element when a voltage between the first magnetic pole and the second magnetic pole is changed includes 3 or more peaks.

Configuration A8

A magnetic recording device, comprising:

the magnetic head according to any one of Configurations A1-A6; and a controller including an element circuit, one end of the magnetic element being electrically connected to the first magnetic pole, another end of the magnetic element being electrically connected to the second magnetic pole, the element circuit being configured to apply an element voltage between the first magnetic pole and the second magnetic pole, when the element voltage is applied, a potential of the first magnetic pole being lower than a potential of the second magnetic pole.

Configuration A9

The magnetic recording device according to Configuration A8, wherein a differential electrical resistance of the magnetic element when changing a voltage between the first magnetic pole and the second magnetic pole includes a first peak, a second peak and a third peak, the voltage corresponding to the first peak is a first voltage, the voltage corresponding to the second peak is a second voltage, the voltage corresponding to the third peak is a third voltage, the second voltage is between the first voltage and the third voltage, and the element voltage is equal to or higher than the third voltage.

Configuration A10

The magnetic recording device according to Configuration A8, wherein a differential electrical resistance of the magnetic element when changing a voltage between the first magnetic pole and the second magnetic pole includes a first negative peak, a first positive peak and a second positive peak, the voltage corresponding to the first negative peak is a first negative peak voltage, the voltage corresponding to the first positive peak is a first positive peak voltage, the voltage corresponding to the second positive peak is a second positive peak voltage, the first positive peak voltage is between the first negative peak voltage and the second positive peak voltage, and the element voltage is equal to or higher than the second positive peak voltage.

Second Embodiment

Figure 7:
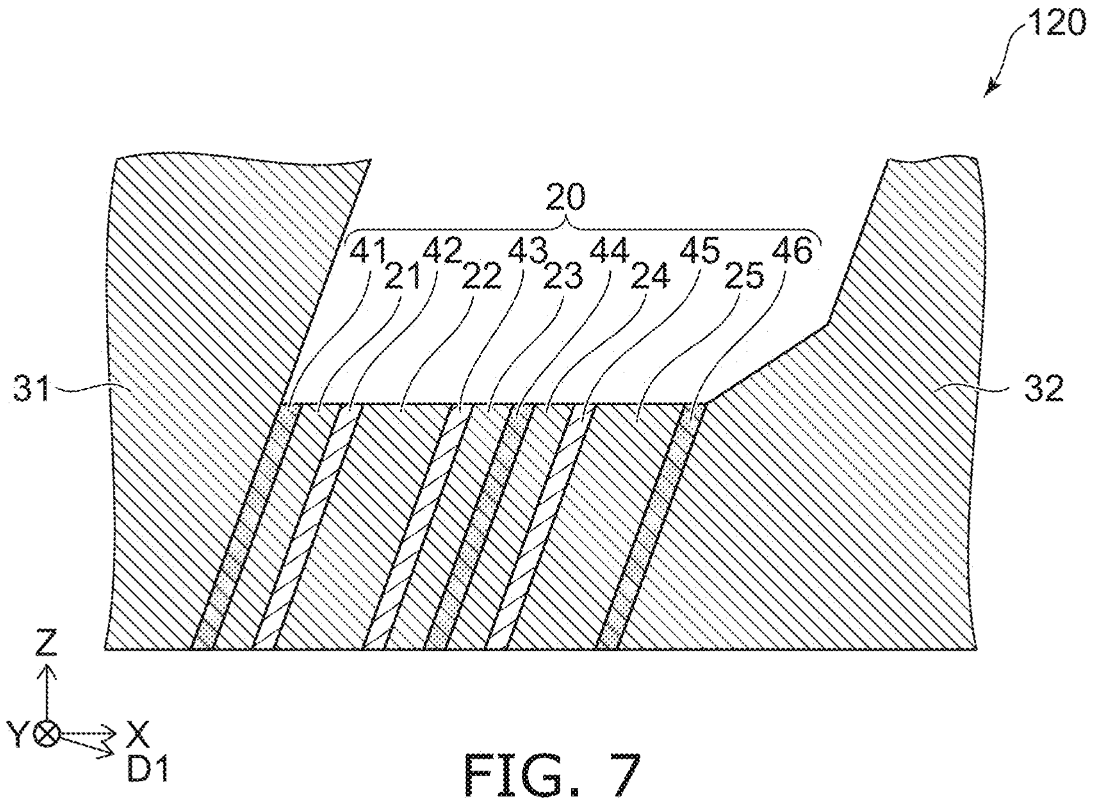
FIG. 7 is a schematic cross-sectional view illustrating a magnetic head according to a second embodiment.

FIG. 7 is a schematic cross-sectional view illustrating a magnetic head according to a second embodiment.

Figure 8:
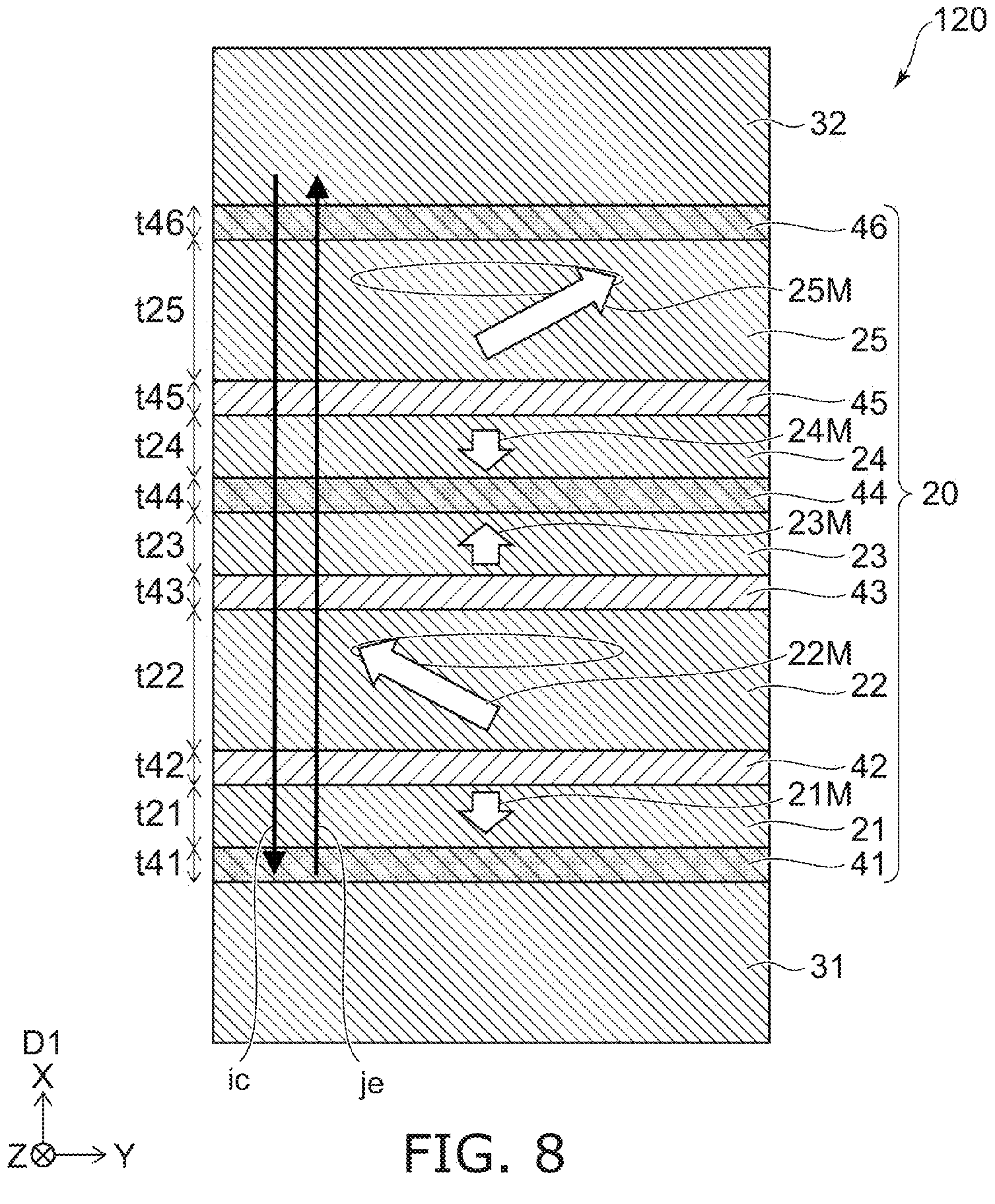
FIG. 8 is a schematic plan view illustrating the magnetic head according to the second embodiment.

FIG. 8 is a schematic plan view illustrating the magnetic head according to the second embodiment.

Figure 9:
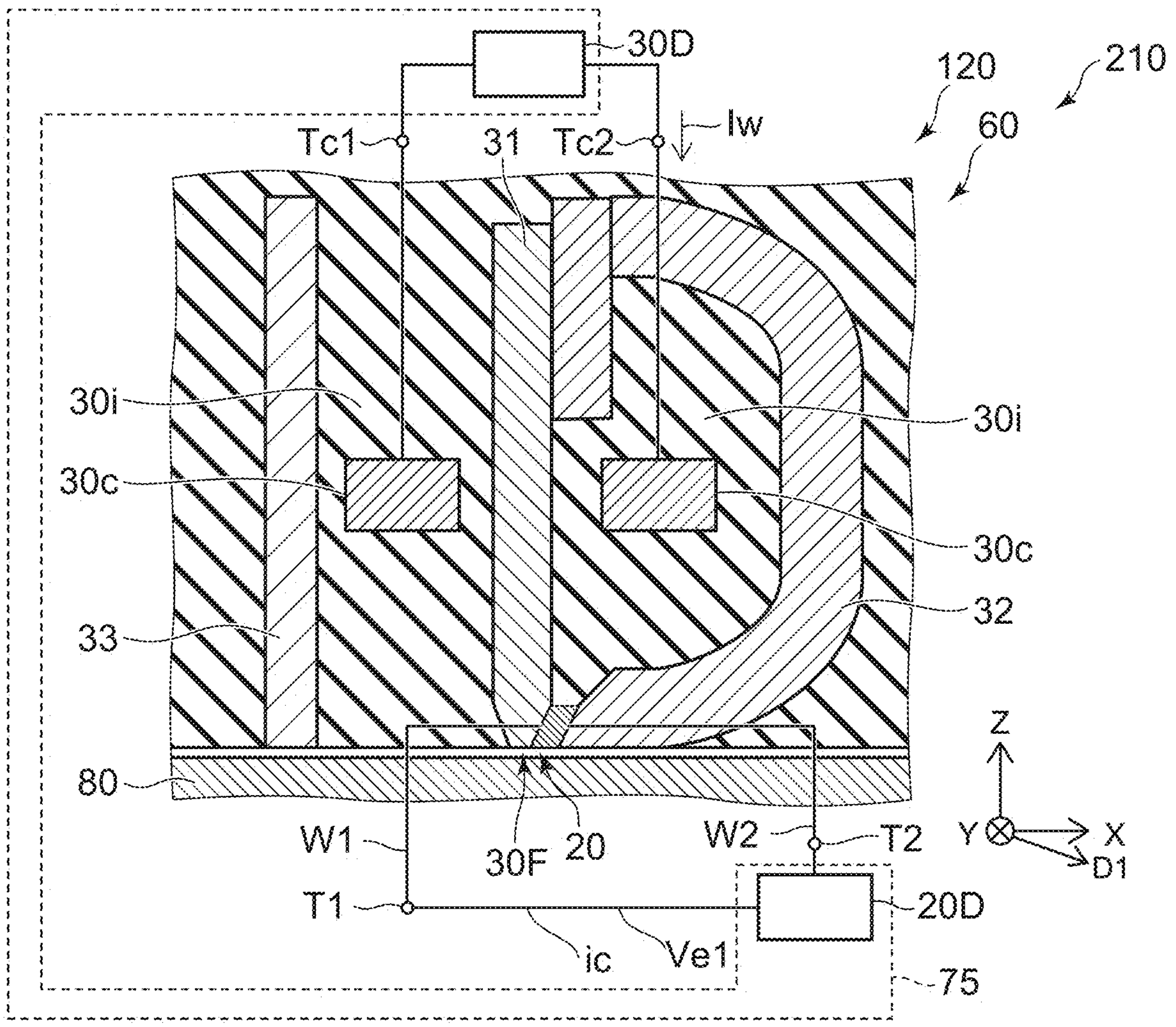
FIG. 9 is a schematic cross-sectional view illustrating the magnetic recording device including the magnetic head according to the second embodiment.

FIG. 9 is a schematic cross-sectional view illustrating the magnetic recording device including the magnetic head according to the second embodiment.

As shown in FIG. 9, the magnetic recording device 210 according to the embodiment includes a magnetic head 120 according to the second embodiment and the controller 75.

The magnetic head 120 includes the first magnetic pole 31, the second magnetic pole 32 and the magnetic element 20. The magnetic head 120 may include the coil 30*c*. The magnetic element 20 is provided between the first magnetic pole 31 and the second magnetic pole 32. The configuration described for the magnetic head 110 may be appropriately applied to the magnetic head 120. In the magnetic head 120, for example, the magnetic element 20 generates the alternating magnetic field (for example, a high frequency magnetic field). For example, MAMR can be performed.

FIG. 9 corresponds to a plan view of the medium facing surface 30F viewed from the magnetic recording medium 80.

As shown in FIGS. 7 and 8, the magnetic element 20 includes a first magnetic layer 21, a second magnetic layer 22, a third magnetic layer 23, a fourth magnetic layer 24, a fifth magnetic layer 25, and a first non-magnetic layer. 41, a second non-magnetic layer 42, a third non-magnetic layer 43, a fourth non-magnetic layer 44, a fifth non-magnetic layer 45 and a sixth non-magnetic layer 46.

The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32. The fifth magnetic layer 25 is provided between the fourth magnetic layer 24 and the second magnetic pole 32.

The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the fourth magnetic layer 24. The fifth non-magnetic layer 45 is provided between the fourth magnetic layer 24 and the fifth magnetic layer 25. The sixth non-magnetic layer 46 is provided between the fifth magnetic layer 25 and the second magnetic pole 32.

In the second embodiments, the sixth non-magnetic layer 46 includes at least one selected from the group consisting of Ru, Ir, Ta, Rh, Pd, Pt and W.

By such a configuration, highly efficient and stable oscillation can be obtained. According to the embodiments, it is possible to provide a magnetic head capable of improving the recording density. An example of simulation results of the characteristics of the magnetic element will be described below.

As shown in FIG. 8, a thickness of the first magnetic layer 21 in a first direction D1 is defined as a first thickness t21. A first direction D1 is a direction from the first magnetic pole 31 to the second magnetic pole 32. A thickness of the second magnetic layer 22 in the first direction D1 is defined as a second thickness t22. A thickness of the third magnetic layer 23 in the first direction D1 is defined as a third thickness t23. A thickness of the fourth magnetic layer 24 in the first direction D1 is defined as a fourth thickness t24. A thickness of the fifth magnetic layer 25 in the first direction D1 is defined as a fifth thickness t25.

In the magnetic head 120, the second thickness t22 is thicker than the first thickness t21. The second thickness t22 is thicker than the third thickness t23. In the magnetic head 120, the fourth thickness t24 is thinner than the fifth thickness t25.

Figure 10:
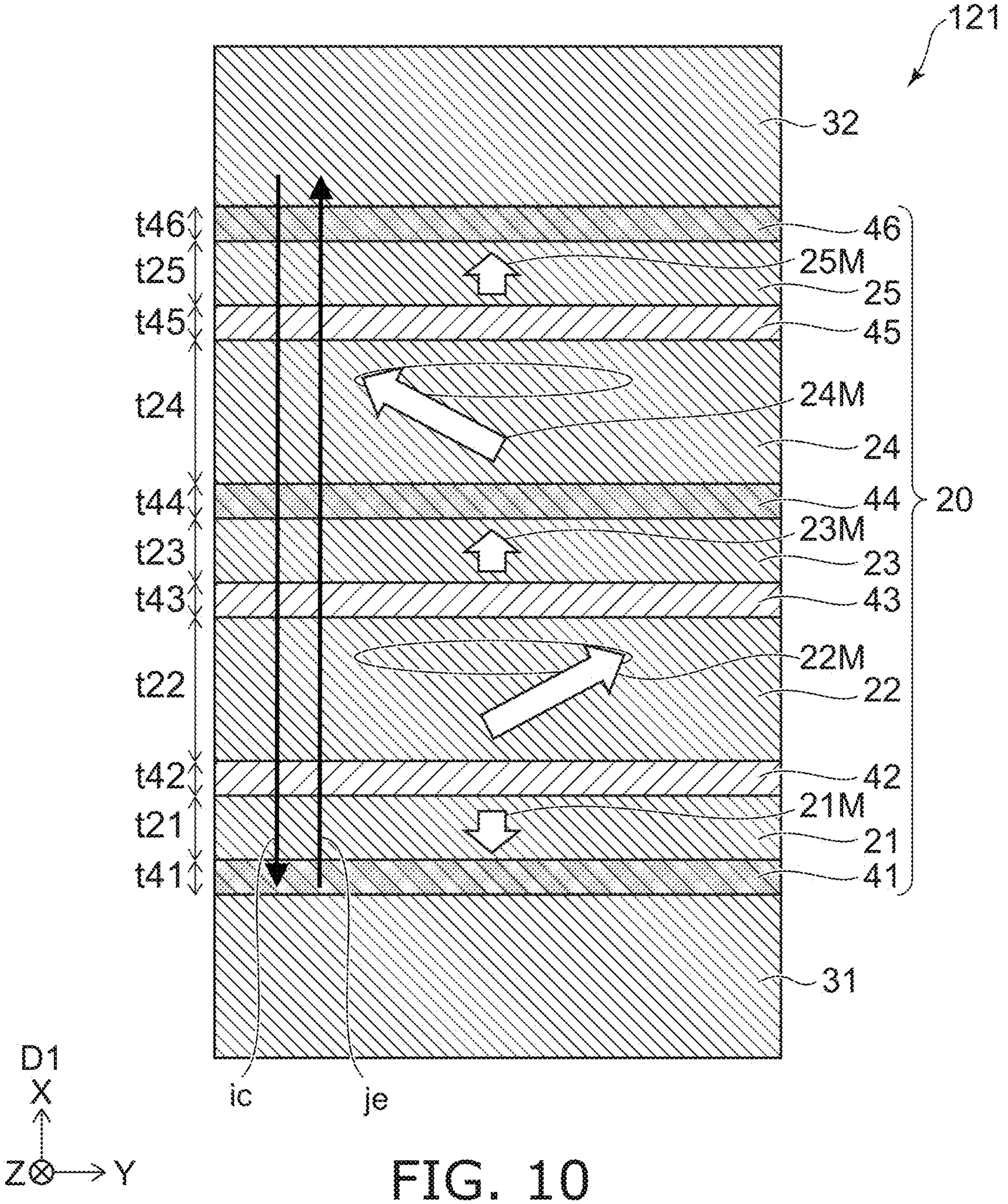
FIG. 10 is a schematic plan view illustrating a magnetic head according to the second embodiment.

FIG. 10 is a schematic plan view illustrating a magnetic head according to the second embodiment.

As shown in FIG. 10, a magnetic head 121 according to the embodiment also includes the above five magnetic layers and six non-magnetic layers. Also in the magnetic head 121, the second thickness t22 is thicker than the first thickness t21. The second thickness t22 is thicker than the third thickness t23. On the other hand, in the magnetic head 121, the fourth thickness t24 is thicker than the fifth thickness t25. Even in such a magnetic head 121, highly efficient and stable oscillation can be obtained.

The magnetization of the magnetic pole (e.g., the second magnetic pole 32) is not always stable and may oscillate. Thus, it is preferable that stable oscillation be obtained in the magnetic element 20 even when the magnetization of the second magnetic pole 32 is unstable. In the magnetic heads 120 and 121 according to the embodiment, stable oscillation can be obtained even when the magnetization of the second magnetic pole 32 is unstable.

Figure 11:
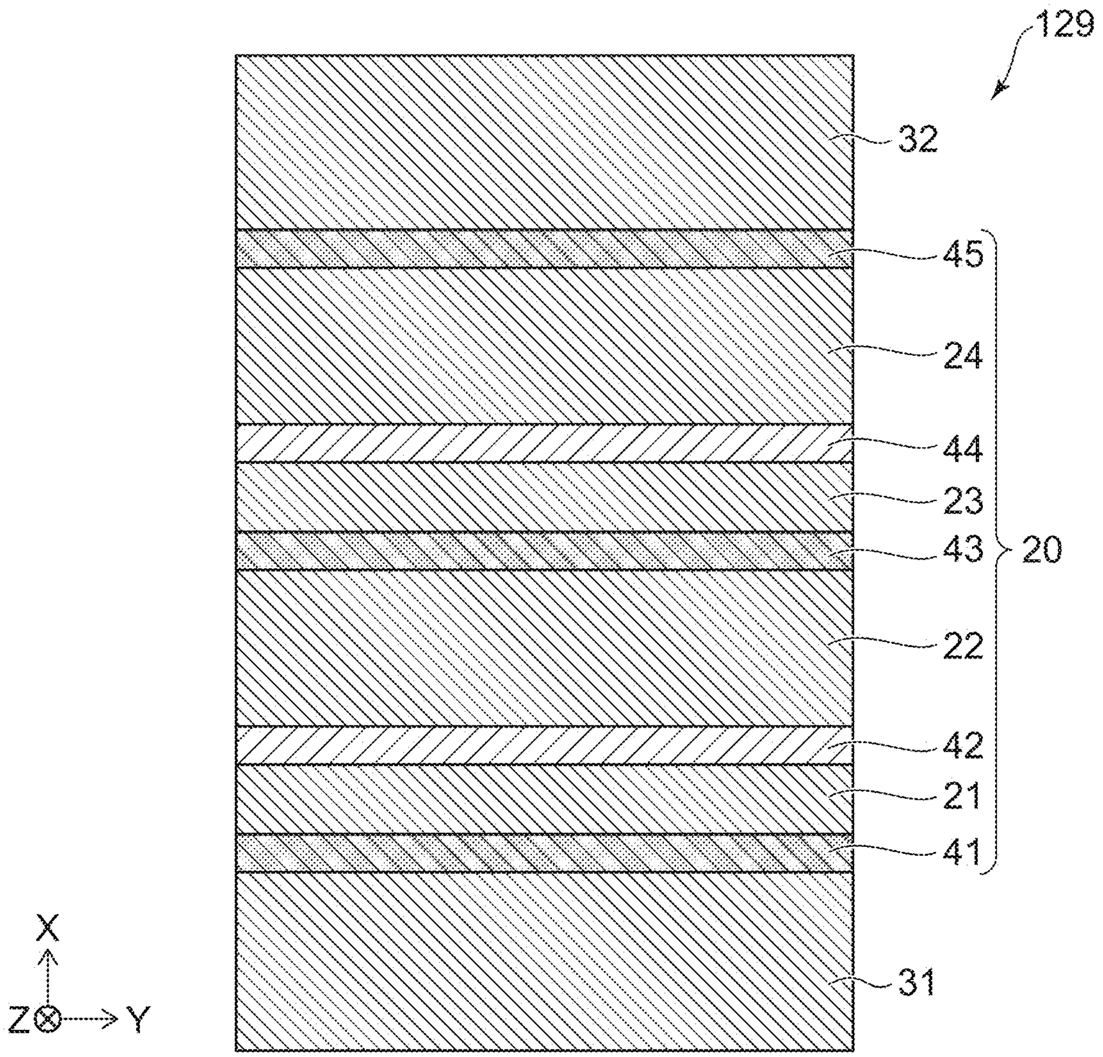
FIG. 11 is a schematic plan view illustrating a magnetic head of a reference example.

FIG. 11 is a schematic plan view illustrating a magnetic head of a reference example.

FIG. 11 shows a magnetic head 129 of a reference example. The magnetic head 129 has four magnetic layers and five non-magnetic layers. In the magnetic head 129, the fifth non-magnetic layer 45 includes at least one selected from the group consisting of Ru, Ir, Ta, Rh, Pd, Pt and W.

Figure 12:
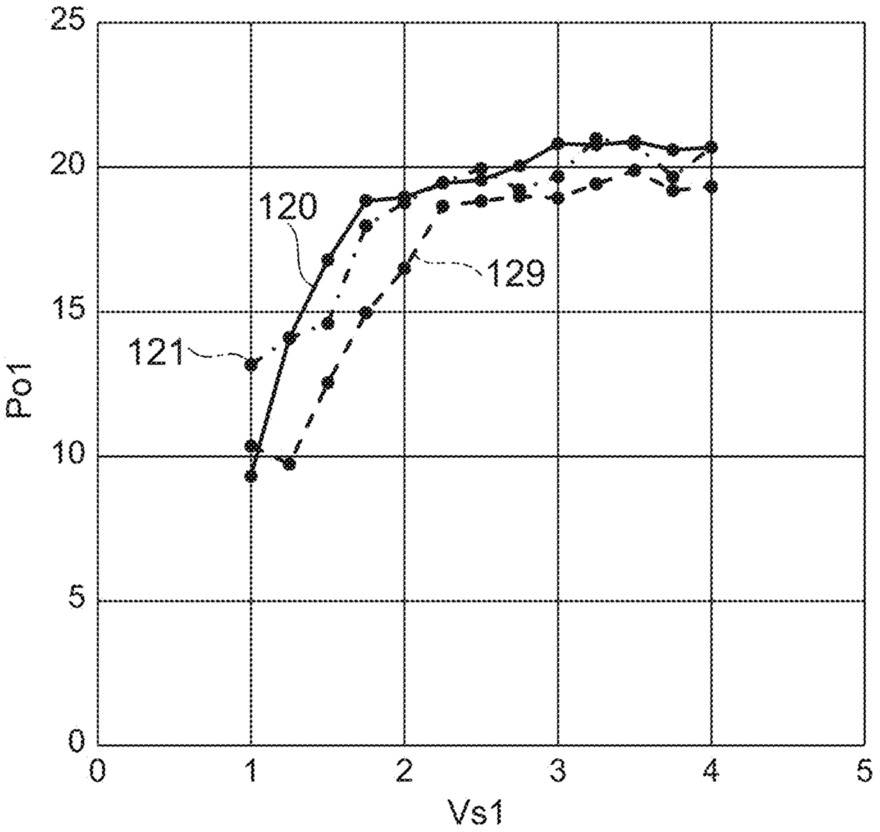
FIG. 12 is a graph illustrating characteristics of the magnetic heads.

FIG. 12 is a graph illustrating characteristics of the magnetic heads.

FIG. 12 illustrates simulation results of the characteristics of the magnetic heads 120, 122 and 129. In the simulation model, the magnetization of the second magnetic pole 32 is movable.

The horizontal axis of FIG. 12 is an applied voltage Vs1 being normalized. The applied voltage Vs1 is applied between one end of the magnetic element 20 and the other end. The vertical axis is an oscillation parameter Pol. The higher the oscillation parameter Pol, the higher the intensity of stable oscillation.

As shown in FIG. 12, in the magnetic heads 120 and 121, a higher oscillation parameter Pol than the magnetic head 129 of the reference example is obtained. In the magnetic heads 120 and 121, a high oscillation parameter Pot can be obtained at a low applied voltage compared to the magnetic head 129 of the reference example. The oscillation parameter Pol is lower than the oscillation parameter Pot in the magnetic heads 120 and 121 even when the thickness relationships of the magnetic layers included in the magnetic head 129 of the reference example are changed.

By a configuration in which the number of magnetic layers is five, high-intensity oscillation can be obtained. Oscillation can be obtained at a low element voltage Ve1 (small element current ic). According to the embodiments, it is possible to provide a magnetic head capable of improving the recording density.

As described above, the sixth non-magnetic layer 46 includes at least one selected from the group consisting of Ru, Ir, Ta, Rh, Pd, Pt and W. Thereby, for example, the influence of the magnetization of the second magnetic pole 32 is suppressed. For example, stable oscillation can be easily obtained in the fourth magnetic layer 24 or the fifth magnetic layer 25.

In the second embodiments, the first non-magnetic layer 41 includes at least one selected from the group consisting of Ru, Ir, Ta, Rh, Pd, Pt and W, for example. For example, the fourth non-magnetic layer 44 includes at least one selected from the group consisting of Ru, Ir, Ta, Rh, Pd, Pt and W.

In the second embodiments, for example, the second non-magnetic layer 42 includes at least one selected from the group consisting of Cu, Au, Cr, Al, V and Ag. The third non-magnetic layer 43 includes at least one selected from the group consisting of Cu, Au, Cr, Al, V and Ag. The fifth non-magnetic layer 45 includes at least one selected from the group consisting of Cu, Au, Cr, Al, V and Ag.

At least one of the first magnetic layer 21, the second magnetic layer 22, the third magnetic layer 23, the fourth magnetic layer 24, or the fifth magnetic layer 25 includes at least one selected from the group consisting of Fr, Co, and Ni. These magnetic layers are, for example, ferromagnetic layers.

In the magnetic head 120 illustrated in FIG. 8, the second magnetic layer 22 and the fifth magnetic layer 25 function, for example, as oscillation layers. The first magnetic layer 21, the third magnetic layer 23, and the fourth magnetic layer 24 function, for example, as spin injection layers. In the magnetic head 120, the magnetization 22M of the second magnetic layer 22 and the magnetization 25M of the fifth magnetic layer 25 oscillate when, for example, the element current ic equal to or higher than the threshold value flows through the magnetic element 20. For example, the alternating magnetic field is generated.

In the magnetic head 120, for example, the component of the magnetization 23M of the third magnetic layer 23 along the first direction D1 is opposite to the component of the magnetization 21M of the first magnetic layer 21 along the first direction D1. The component of the magnetization 24M of the fourth magnetic layer 24 along the first direction D1 is opposite to the component of the magnetization 23M of the third magnetic layer 23 along the first direction D1.

As shown in FIG. 8, a thickness of the first non-magnetic layer 41 in the first direction D1 is defined as a first non-magnetic layer thickness t41. A thickness of the second non-magnetic layer 42 in the first direction D1 is defined as a second non-magnetic layer thickness t42. A thickness of the third non-magnetic layer 43 in the first direction D1 is defined as a third non-magnetic layer thickness t43. A thickness of the fourth non-magnetic layer 44 in the first direction D1 is defined as a fourth non-magnetic layer thickness t44. A thickness of the fifth non-magnetic layer 45 in the first direction D1 is defined as a fifth non-magnetic layer thickness t45. A thickness of the sixth non-magnetic layer 46 in the first direction D1 is defined as a sixth non-magnetic layer thickness t46.

In the magnetic head 120, for example, the second thickness t22 may be not less than 1.5 times and not more than 10 times the first thickness t21. The second thickness t22 may be not less than 1.5 times and not more than 10 times the third thickness t23. The second thickness t22 may be not less than 1.5 times and not more than 10 times the fourth thickness t24. For example, the fifth thickness t25 may be not less than 1.5 times and not more than 10 times the fourth thickness t24. The fifth thickness t25 may be not less than 1.5 times and not more than 10 times the third thickness t23. The fifth thickness t25 may be not less than 1.5 times and not more than 10 times the first thickness t21.

In the magnetic head 120, for example, the first thickness t21 is not less than 0.5 nm and not more than 5 nm. For example, the second thickness t22 is not less than 4 nm and not more than 15 nm. For example, the third thickness t23 is not less than 0.5 nm and not more than 5 nm. For example, the fourth thickness t24 is not less than 0.5 nm and not more than 5 nm. For example, the fifth thickness t25 is not less than 4 nm and not more than 15 nm.

In the magnetic head 121 illustrated in FIG. 10, the second magnetic layer 22 and the fourth magnetic layer 24 function, for example, as oscillation layers. The first magnetic layer 21, the third magnetic layer 23, and the fifth magnetic layer 25 function, for example, as spin injection layers. In the magnetic head 121, the magnetization 22M of the second magnetic layer 22 and the magnetization 24M of the fourth magnetic layer 24 oscillate when, for example, the element current ic equal to or higher than the threshold value flows through the magnetic element 20. For example, the alternating magnetic field is generated.

In the magnetic head 121, for example, the component of the magnetization 23M of the third magnetic layer 23 along the first direction D1 is opposite to the component of the magnetization 21M of the first magnetic layer 21 along the first direction D1. The component of the magnetization 25M of the fifth magnetic layer 25 along the first direction D1 is in the same direction as the component of the magnetization 23M of the third magnetic layer 23 along the first direction D1.

In the magnetic head 121, for example, the second thickness t22 may be not less than 1.5 times and not more than 10 times the first thickness t21. The second thickness t22 may be not less than 1.5 times and not more than 10 times the third thickness t23. For example, the fourth thickness t24 may be not less than 1.5 times and not more than 10 times the fifth thickness t25.

In the magnetic head 121, for example, the first thickness t21 is not less than 0.5 nm and not more than 5 nm. For example, the second thickness t22 is not less than 4 nm and not more than 15 nm. For example, the third thickness t23 is not less than 0.5 nm and not more than 5 nm. For example, the fourth thickness t24 is not less than 4 nm and not more than 15 nm. For example, the fifth thickness t25 is not less than 0.5 nm and not more than 5 nm.

In the magnetic heads 120 and 121, the first non-magnetic layer thickness t41 may be, for example, not less than 1 nm and not more than 10 nm. The second non-magnetic layer thickness t42 may be, for example, not less than 0.5 nm and not more than 6 nm. The third non-magnetic layer thickness t43 may be, for example, not less than 0.5 nm and not more than 6 nm. The fourth non-magnetic layer thickness t44 may be, for example, not less than 1 nm and not more than 10 nm. The fifth non-magnetic layer thickness t45 may be, for example, not less than 0.5 nm and not more than 6 nm. The sixth non-magnetic layer thickness t46 may be, for example, not less than 1 nm and not more than 10 nm.

As shown in FIG. 8, when the magnetic head 120 is in operation, the element current ic equal to or higher than the threshold value is supplied to the magnetic element 20. The element current ic flows in the direction from the second magnetic pole 32 to the first magnetic pole 31, for example. An electron flow je corresponding to the element current ic flows in the direction from the first magnetic pole 31 to the second magnetic pole 32. The element current ic flows in the direction from the sixth non-magnetic layer 46 to the first non-magnetic layer 41.

An element voltage Ve1 is applied to the magnetic element 20 in the operation. In the example of FIG. 8, the potential of the first magnetic pole 31 is lower than the potential of the second magnetic pole 32.

The element current ic and the element voltage Ve1 are supplied by the element circuit 20D. For example, one end of the magnetic element 20 is electrically connected to the first magnetic pole 31. The other end of the magnetic element 20 is electrically connected to the second magnetic pole 32. The element circuit 20D is configured to apply the element voltage Ve1 between the first magnetic pole 31 and the second magnetic pole 32. The potential of the first magnetic pole 31 is lower than the potential of the second magnetic pole 32 when the element voltage Ve1 is applied.

In the example of FIG. 10, in the operation of the magnetic head 121, the element current ic flows in the direction from the second magnetic pole 32 to the first magnetic pole 31, for example. The potential of the first magnetic pole 31 is lower than the potential of the second magnetic pole 32 when the element voltage Ve1 is applied.

Figure 13:
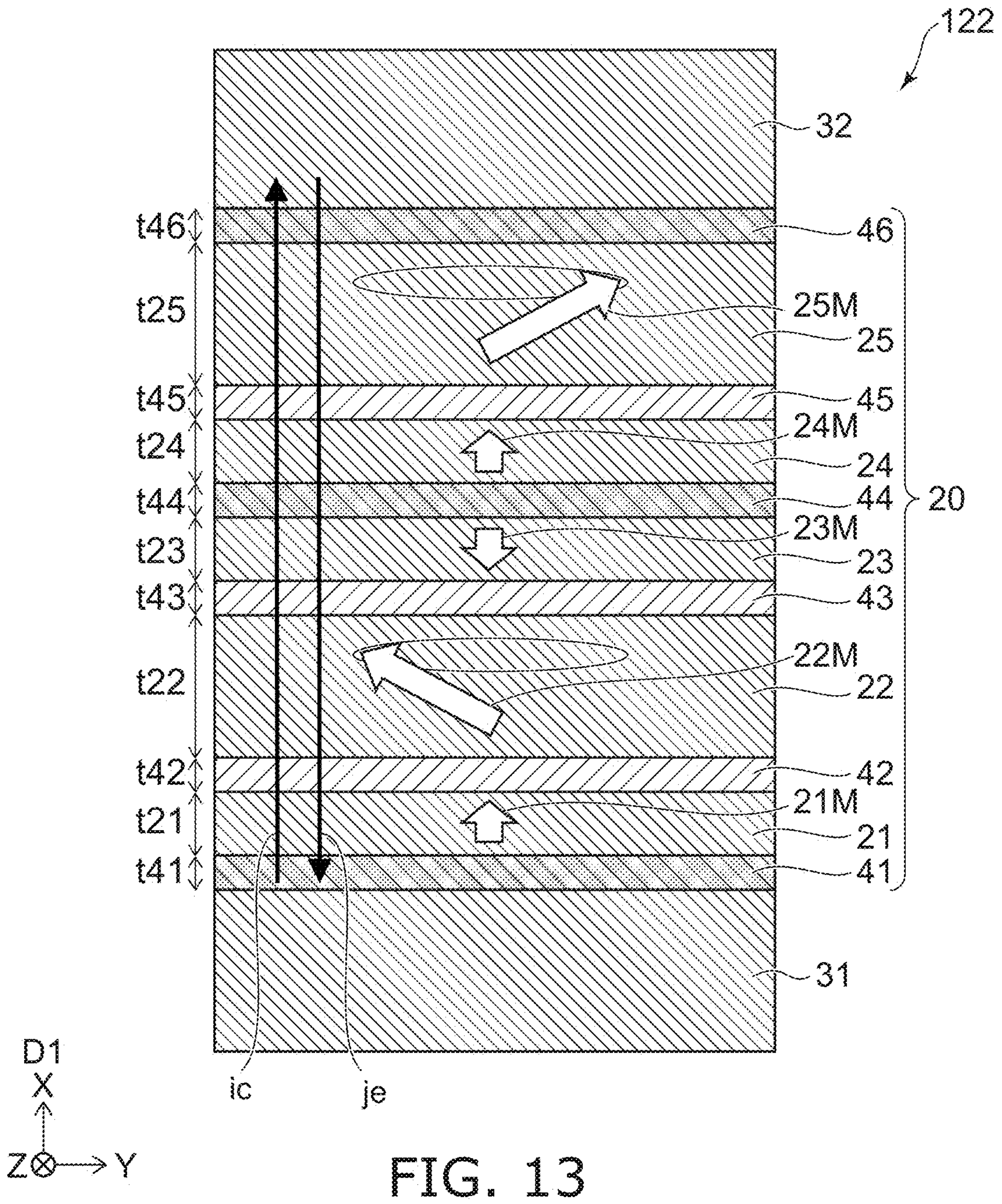
FIG. 13 is a schematic plan view illustrating a magnetic head according to the second embodiment.

FIG. 13 is a schematic plan view illustrating a magnetic head according to the second embodiment.

As shown in FIG. 13, in a magnetic head 122 according to the embodiment, the direction of the element current ic is opposite to the direction of the element current ic in the magnetic head 120. Characteristics similar to those of the magnetic head 121 are obtained in the magnetic head 122.

Figure 14:
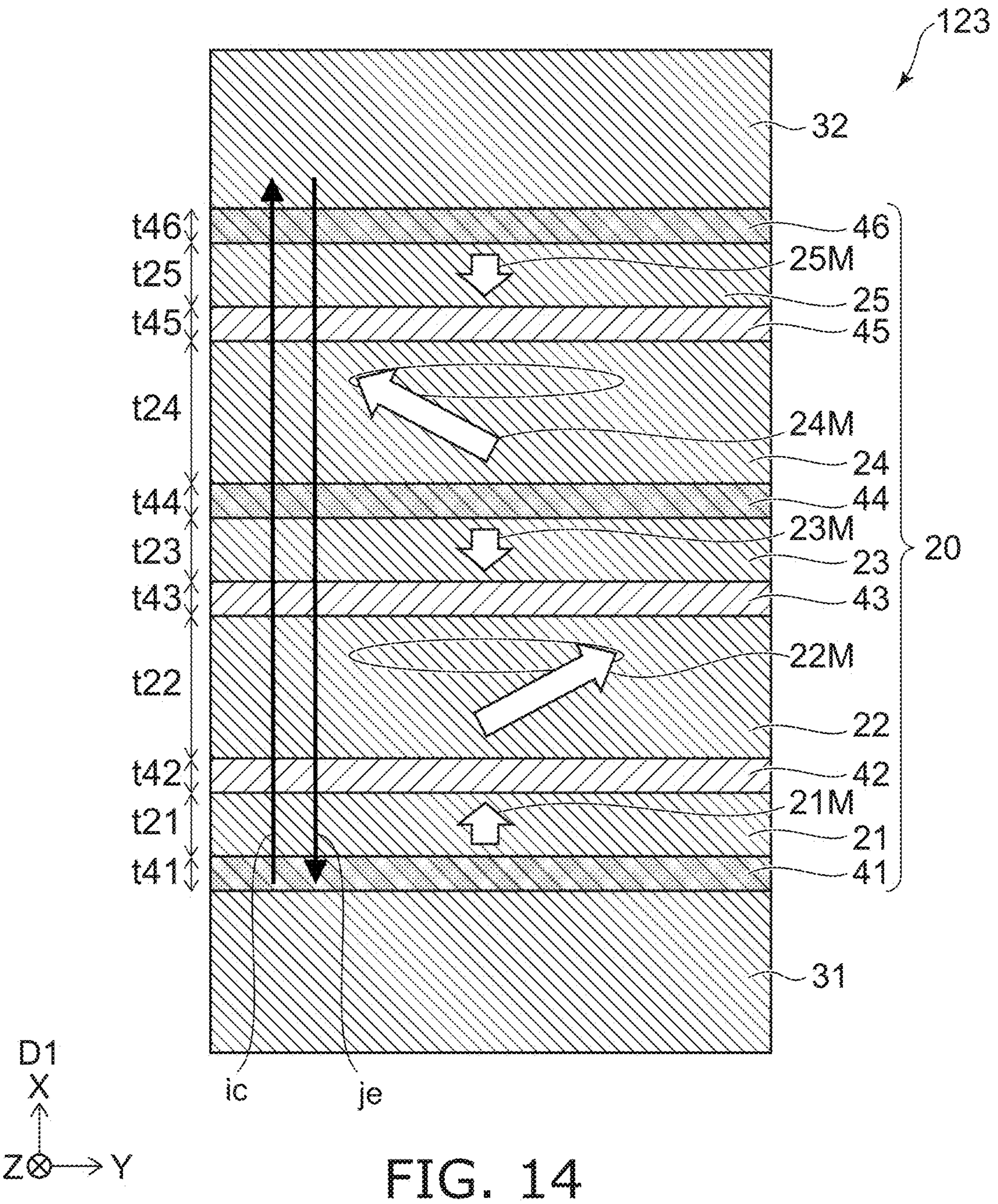
FIG. 14 is a schematic plan view illustrating a magnetic head according to the second embodiment.

FIG. 14 is a schematic plan view illustrating a magnetic head according to the second embodiment.

As shown in FIG. 14, in a magnetic head 123 according to the embodiment, the direction of the element current ic is opposite to the direction of the device current ic in the magnetic head 121. Characteristics similar to those of the magnetic head 120 are obtained in the magnetic head 123.

Figure 15:
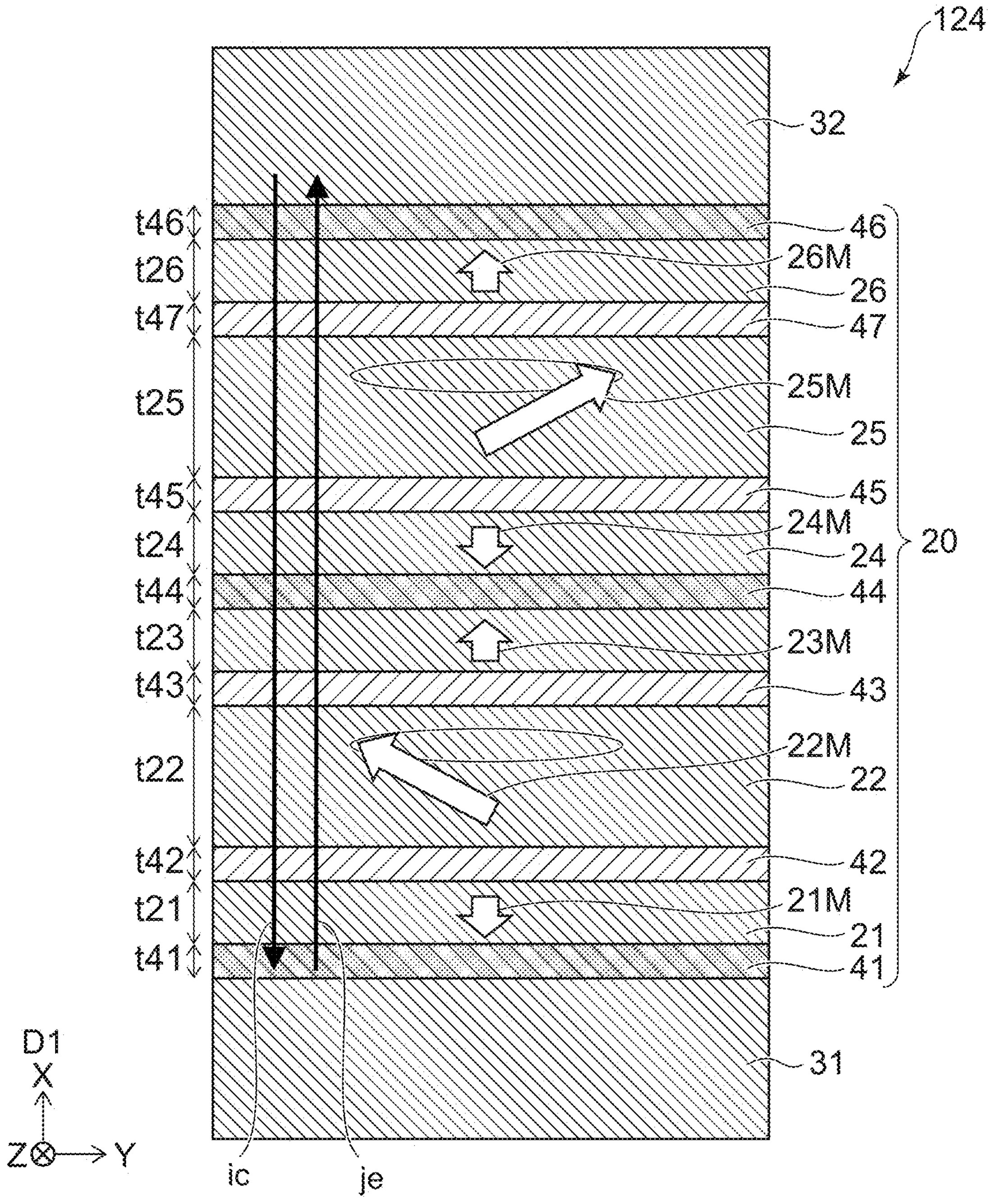
FIG. 15 is a schematic plan view illustrating a magnetic head according to the second embodiment.

FIG. 15 is a schematic plan view illustrating a magnetic head according to the second embodiment.

As shown in FIG. 15, in a magnetic head 124 according to the embodiment, the magnetic element 20 further includes a sixth magnetic layer 26 and a seventh non-magnetic layer 47. The sixth magnetic layer 26 is provided between the fifth magnetic layer 25 and the sixth non-magnetic layer 46. The seventh non-magnetic layer 47 is provided between the fifth magnetic layer 25 and the sixth magnetic layer 26. Except for this, the configuration of the magnetic head 124 may be the same as the configuration of the magnetic head 120.

Even in such a magnetic head 124, stable oscillation can be obtained even when the second magnetic pole 32 is unstable. In the magnetic head 124, the direction of the element current ic is from the first magnetic pole 31 to the second magnetic pole 32.

In the magnetic head 124, the seventh non-magnetic layer 47 includes at least one selected from the group consisting of Cu, Au, Cr, Al, V and Ag. The fifth thickness t25 of the fifth magnetic layer 25 in the first direction D1 is thicker than the fourth thickness t24 of the fourth magnetic layer 24 in the first direction D1. The fifth thickness t25 is thicker than the sixth thickness t26 of the sixth magnetic layer 26 in the first direction D1.

In the example of the magnetic head 124, the component of the magnetization 26M of the sixth magnetic layer 26 along the first direction D1 is, for example, opposite to the component of the magnetization of the fourth magnetic layer 24 along the first direction D1. In the magnetic head 124, the sixth magnetic layer 26 functions as a spin injection layer. The sixth magnetic layer 26 includes, for example, at least one selected from the group consisting of Fe, Co and Ni.

The sixth thickness t26 may be, for example, not less than 0.5 nm and not more than 5 nm. A seventh non-magnetic layer thickness t47 of the seventh non-magnetic layer 47 in the first direction D1 may be, for example, not less than 0.5 nm and not more than 6 nm.

In the magnetic head 124, the first non-magnetic layer 41 contacts the first magnetic pole 31 and the first magnetic layer 21. The second non-magnetic layer 42 contacts the first magnetic layer 21 and the second magnetic layer 22. The third non-magnetic layer 43 contacts the second magnetic layer 22 and the third magnetic layer 23. The fourth non-magnetic layer 44 contacts the third magnetic layer 23 and the fourth magnetic layer 24. The fifth non-magnetic layer 45 contacts the fourth magnetic layer 24 and the fifth magnetic layer 25. The seventh non-magnetic layer 47 contacts the fifth magnetic layer 25 and the sixth magnetic layer 26. The sixth non-magnetic layer 46 contacts the sixth magnetic layer 26 and the second magnetic pole 32.

Figure 16:
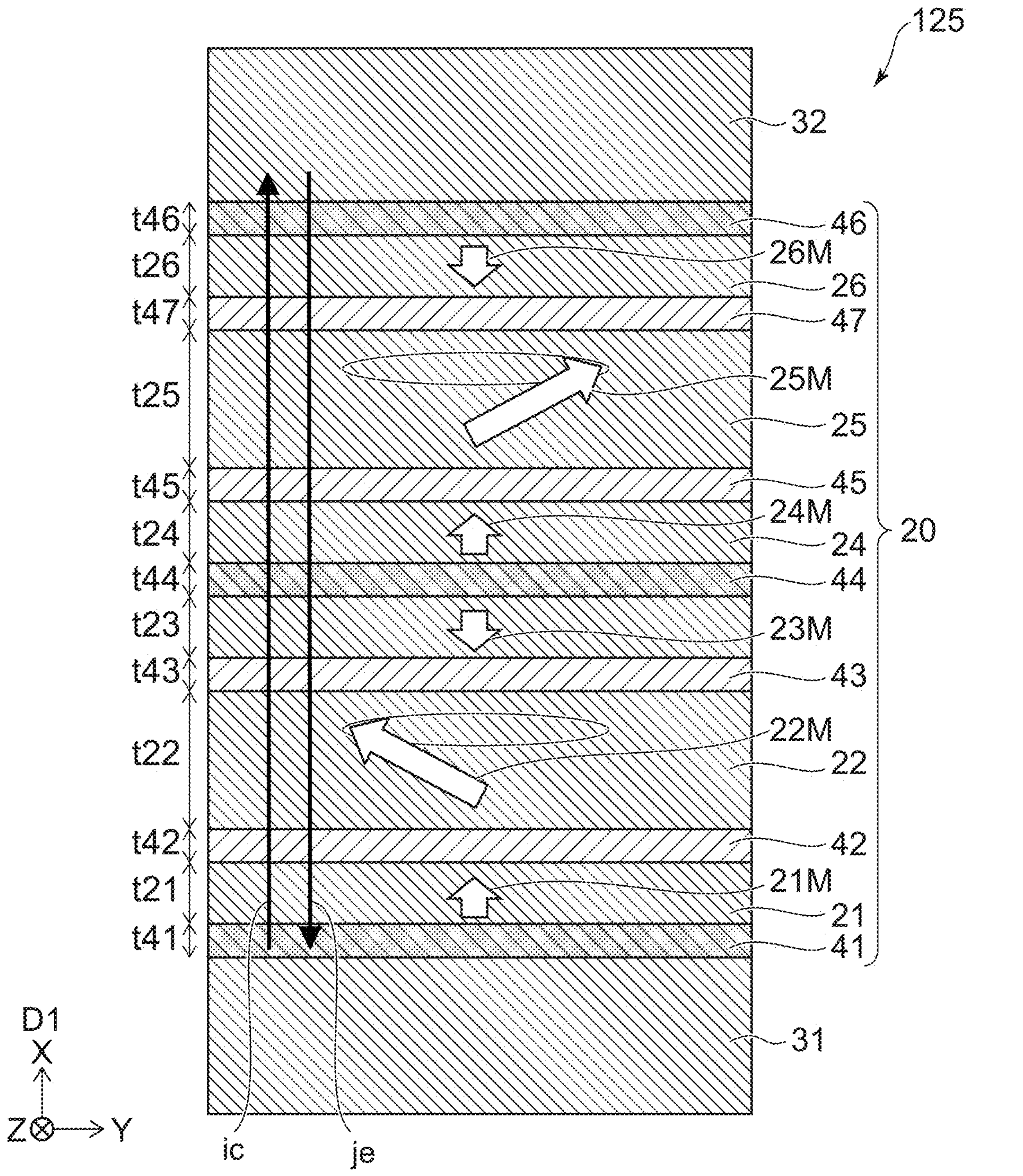
FIG. 16 is a schematic plan view illustrating a magnetic head according to the second embodiment.

FIG. 16 is a schematic plan view illustrating a magnetic head according to the second embodiment.

As shown in FIG. 16, in a magnetic head 125 according to the embodiment, the direction of the element current ic is opposite to the direction of the element current ic in the magnetic head 124. In the magnetic head 125, characteristics similar to those of the magnetic head 124 are obtained.

Figure 17:
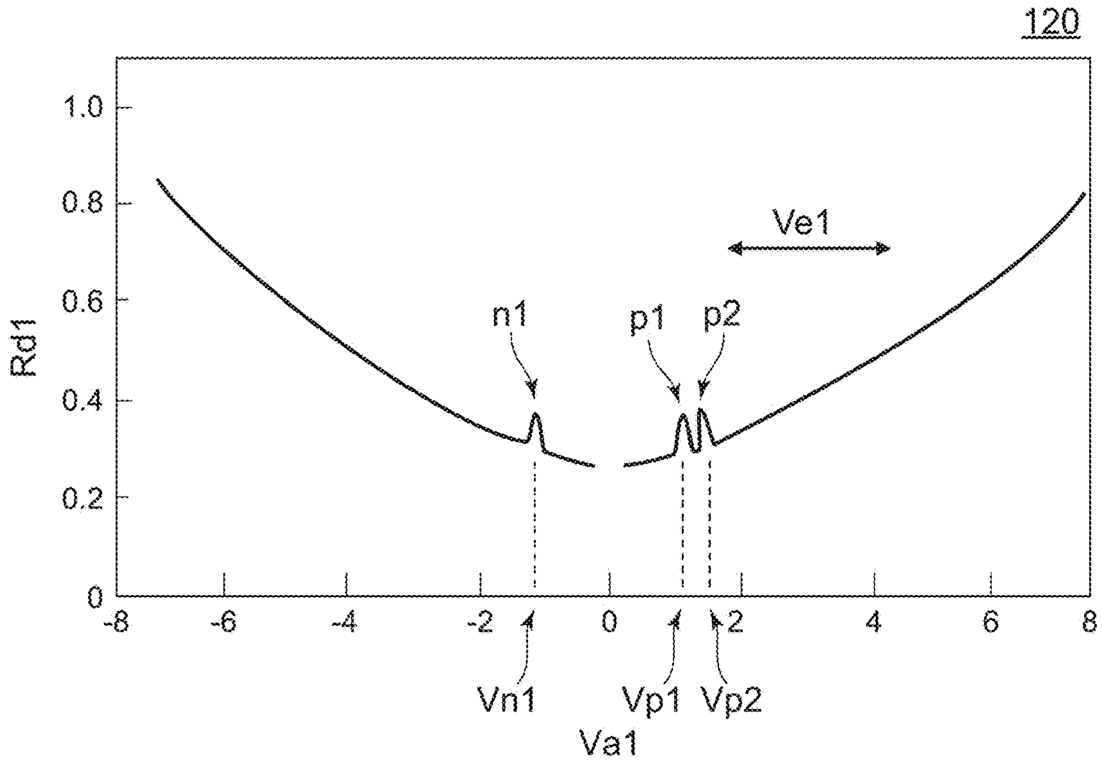
FIG. 17 is a graph illustrating characteristics of the magnetic head.

FIG. 17 is a graph illustrating characteristics of the magnetic head.

FIG. 17 corresponds to the magnetic head 120. FIG. 17 illustrates a differential electrical resistance of the magnetic element 20 when a voltage Va1 applied to the magnetic element 20 is changed. The horizontal axis is the voltage Vat. The vertical axis is the differential electrical resistance Rd1. The voltage Vat may be the voltage between the first terminal T1 and the second terminal T2. For example, a voltage corresponding to voltage Vat is applied to the magnetic element 20.

As shown in FIG. 17, the differential electrical resistance Rd1 when the voltage Va1 is changed includes three or more peaks. These peaks are considered to correspond to discontinuous changes in electrical resistance accompanying reversal of magnetization of the multiple magnetic layers included in the magnetic element 20.

The magnetic recording device 210 (see FIG. 9) includes a magnetic head according to the embodiment and a controller 75. The controller 75 includes an element circuit 20D. For example, one end of the magnetic element 20 is electrically connected to the first magnetic pole 31. The other end of the magnetic element 20 is electrically connected to the second magnetic pole 32.

As shown in FIG. 17, in the magnetic head 120, the differential electrical resistance Rd1 of the magnetic element 20 when the voltage Va1 between the first magnetic pole 31 and the second magnetic pole 32 is changed includes a first negative peak n1, a first positive peak p1 and a second positive peak p2. The voltage Va1 corresponding to the first negative peak n1 is defined as a first negative peak voltage Vn1. The voltage Va1 corresponding to the first positive peak p1 is defined as a first positive peak voltage Vp1. The voltage Va1 corresponding to the second positive peak p2 is defined as a second positive peak voltage Vp2.

The first negative peak voltage Vn1 is negative. The first positive peak voltage Vp1 and the second positive peak voltage Vp2 are positive. The potential of the first magnetic pole 31 is lower than the potential of the second magnetic pole 32 when the voltage Va1 is positive. The potential of the first magnetic pole 31 is higher than the potential of the second magnetic pole 32 when the voltage Vat is negative.

The first positive peak voltage Vp1 is higher than the first negative peak voltage Vn1 and lower than the second positive peak voltage Vp2. In the magnetic head 120, the element voltage Ve1 (the absolute value of the element voltage Ve1) is equal to or higher than the second positive peak voltage Vp2. A stable and high-intensity oscillation can be obtained. The absolute value of the first negative peak voltage Vn1 may be greater than the second positive peak voltage Vp2.

Thus, the differential electrical resistance Rd1 includes three or more peaks (For example, the first peak, the second peak and the third peak). The "first peak" is, for example, a first negative peak n1. The "second peak" is, for example, the first positive peak p1. The "third peak" is, for example, the second positive peak p2. The first negative peak voltage Vn1 is, for example, a first voltage. The first positive peak voltage Vp1 is, for example, a second voltage. The second positive peak voltage Vp2 is, for example, a third voltage. The second voltage is between the first voltage and the third voltage. The element voltage Vd1 is not less than the third voltage.

Thus, the element voltage Ve1 may satisfy a first condition. In the first condition, the first voltage is negative. The second voltage, the third voltage and the element voltage Vd1 are positive. In the first condition, the element voltage Vd1 is not less than the third voltage.

In the magnetic head 120, for example, the absolute value of the element voltage Vd1 may be 10 times or less of the absolute value of the first positive peak voltage Vp1. For example, the absolute value of the element voltage Ve1 may be 8 times or less of the absolute value of the first positive peak voltage Vp1. For example, the absolute value of the element voltage Vd1 may be 10 times or less of the absolute value of the first negative peak voltage Vn1. For example, the absolute value of the element voltage Ve1 may be 8 times or less of the absolute value of the first negative peak voltage Vn1.

In the magnetic head 120, for example, the absolute value of the third voltage may be 4 times or less of the absolute value of the first positive peak voltage Vp1. For example, the absolute value of the third voltage may be three times or less of the absolute value of the first positive peak voltage Vp1. For example, the absolute value of the third voltage may be 4 times or less of the absolute value of the first negative peak voltage Vn1. For example, the absolute value of the third voltage may be 3 times or less of the absolute value of the first negative peak voltage Vn1.

In the magnetic head 120, the tail of the first positive peak p1 may overlap the second positive peak p2. The tail of the second positive peak p2 may overlap the first positive peak p1.

Figure 18:
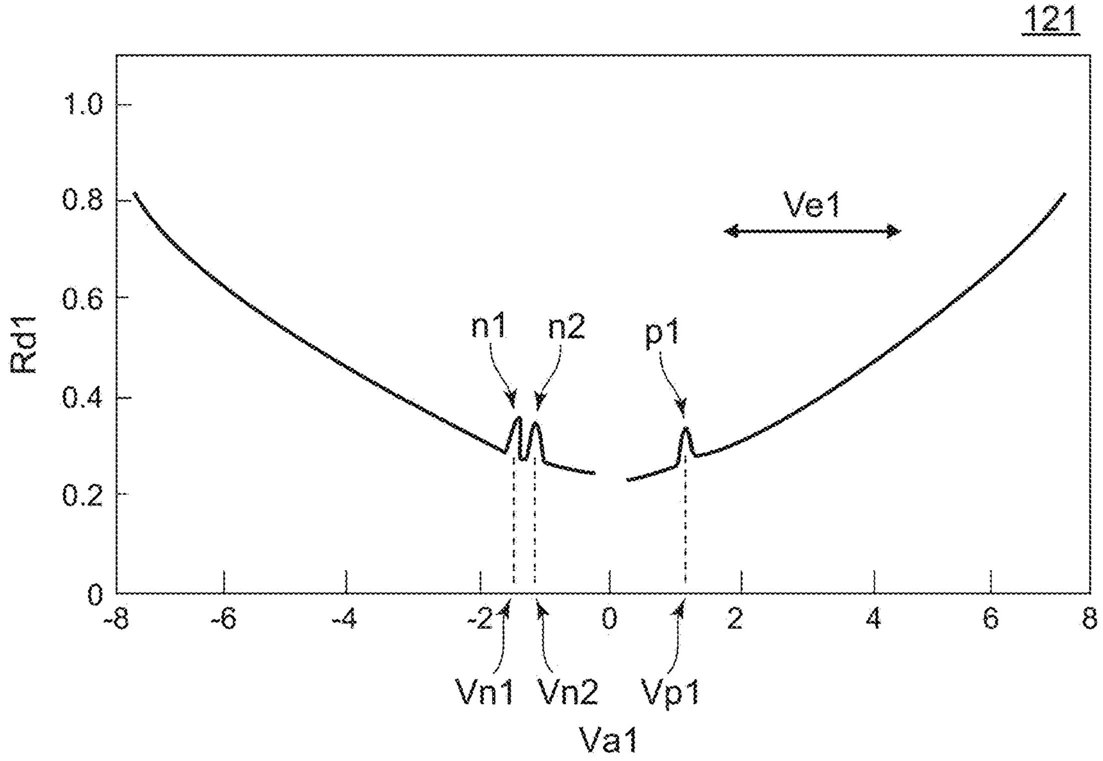
FIG. 18 is a graph illustrating characteristics of the magnetic head according to the second embodiment.

FIG. 18 is a graph illustrating characteristics of the magnetic head according to the second embodiment.

FIG. 18 corresponds to the magnetic head 121. As shown in FIG. 18, in the magnetic head 121, the differential electrical resistance Rd1 of the magnetic element 20 when the voltage Va1 is changed includes the first negative peak n1, a second negative peak n2 and the first positive peak p1. The voltage Va1 corresponding to the first negative peak n1 is defined as the first negative peak voltage Vn1. The voltage Va1 corresponding to the second negative peak n2 is defined as a second negative peak voltage Vn2. The voltage Va1 corresponding to the first positive peak p1 is defined as the first positive peak voltage Vp1.

The first negative peak voltage Vn1 and the second negative peak voltage Vn2 are negative. The first positive peak voltage Vp1 is positive. The second negative peak voltage Vn2 is higher than the first negative peak voltage Vn1 and lower than the first positive peak voltage Vp1. In the magnetic head 121, the element voltage Ve1 is equal to or higher than the first positive peak voltage Vp1. A stable and high-intensity oscillation can be obtained.

In the magnetic head 121, the "first peak" is, for example, the first negative peak n1. The "second peak" is, for example, the second negative peak n2. The "third peak" is, for example, the first positive peak p1. The first negative peak voltage Vn1 is, for example, a first voltage. The second negative peak voltage Vn2 is, for example, a second voltage. The first positive peak voltage Vp1 is, for example, a third voltage. The second voltage is between the first voltage and the third voltage. The element voltage Vd1 is not less than the third voltage.

Thus, the element voltage Ve1 may satisfy a second condition. In the second condition, the first voltage and the second voltage are negative. The third voltage and the element voltage are positive. In the third condition, the element voltage Vd1 is not less than the third voltage.

In the magnetic head 121, for example, the absolute value of the element voltage Ve1 may be 10 times or less the absolute value of the first positive peak voltage Vp1. The absolute value of the element voltage Ve1 may be 8 times or less the absolute value of the first positive peak voltage Vp1. In the magnetic head 121, for example, the absolute value of the element voltage Ve1 may be 10 times or less the absolute value of the second negative peak voltage Vn2. The absolute value of the element voltage Ve1 may be 8 times or less the absolute value of the second negative peak voltage Vn2.

In the magnetic head 121, for example, the absolute value of the third voltage may be 4 times or less the absolute value of the first negative peak voltage Vn1. For example, the absolute value of the third voltage may be 3 times or less the absolute value of the first negative peak voltage Vn1. For example, the absolute value of the third voltage may be 4 times or less the absolute value of the second negative peak voltage Vn2. For example, the absolute value of the third voltage may be 3 times or less the absolute value of the second negative peak voltage Vn2.

In the magnetic head 121, the tail of the first negative peak n1 may overlap the second negative peak n2. The tail of the second negative peak n2 may overlap the first negative peak n1.

Figure 19:
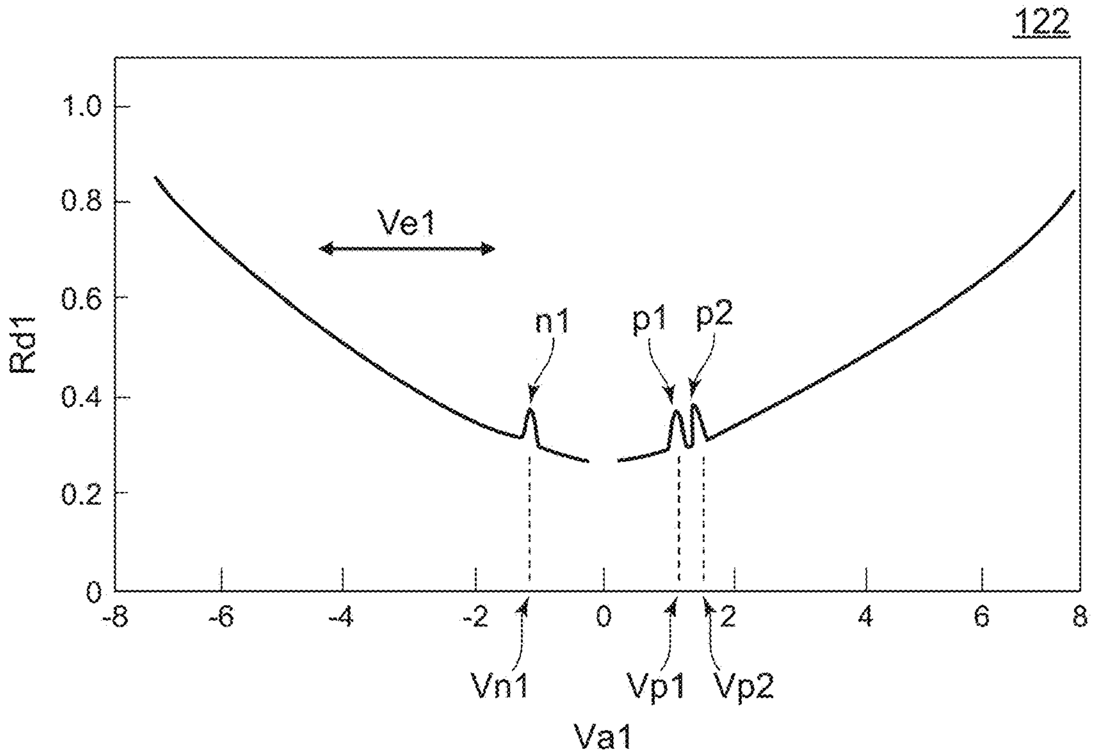
FIG. 19 is a graph illustrating characteristics of the magnetic head according to the second embodiment.

FIG. 19 is a graph illustrating characteristics of the magnetic head according to the second embodiment.

FIG. 19 corresponds to the magnetic head 122. As shown in FIG. 19, in the magnetic head 122, the differential electrical resistance Rd1 of the magnetic element 20 when the voltage Va1 is changed includes the first negative peak n1, the first positive peak p1 and the second positive peak p2. The first positive peak voltage Vp1 is higher than the first negative peak voltage Vn1 and lower than the second positive peak voltage Vp2. In the magnetic head 122, the absolute value of the element voltage Ve1 being negative is greater than or equal to the absolute value of the first negative peak voltage Vn1. A stable and high-intensity oscillation can be obtained. The absolute value of the first negative peak voltage Vn1 may be greater than the second positive peak voltage Vp2.

Thus, the differential electrical resistance Rd1 includes three or more peaks (For example, the first peak, the second peak and the third peak). The "first peak" is, for example, the first negative peak n1. The "second peak" is, for example, the first positive peak p1. The "third peak" is, for example, the second positive peak p2. The first negative peak voltage Vn1 is, for example, a first voltage. The first positive peak voltage Vp1 is, for example, a second voltage. The second positive peak voltage Vp2 is, for example, a third voltage. The second voltage is between the first voltage and the third voltage. The absolute value of the element voltage Vd1 being negative is not less than the absolute value of the first voltage.

Thus, the element voltage Ve1 may satisfy a third condition. In the third condition, the first voltage and the element voltage Vd1 are negative. The second voltage and the third voltage are positive. In the third condition, the absolute value of the element voltage Vd1 is equal to or greater than the absolute value of the first voltage.

In the magnetic head 122, for example, the absolute value of the element voltage Vd1 may be 10 times or less of the absolute value of the first negative peak voltage Vn1. For example, the absolute value of the element voltage Ve1 may be 8 times or less of the absolute value of the first negative peak voltage Vn1. For example, the absolute value of the element voltage Vd1 may be 10 times or less of the absolute value of the first positive peak voltage Vp1. For example, the absolute value of the element voltage Ve1 may be 8 times or less of the absolute value of the first positive peak voltage Vp1.

In the magnetic head 122, for example, the absolute value of the first voltage may be 4 times or less of the absolute value of the first positive peak voltage Vp1. For example, the absolute value of the first voltage may be 3 times or less of the absolute value of the first positive peak voltage Vp1. For example, the absolute value of the first voltage may be 4 times or less of the absolute value of the second positive peak voltage Vp2. For example, the absolute value of the first voltage may be three times or less of the absolute value of the second positive peak voltage Vp2.

Figure 20:
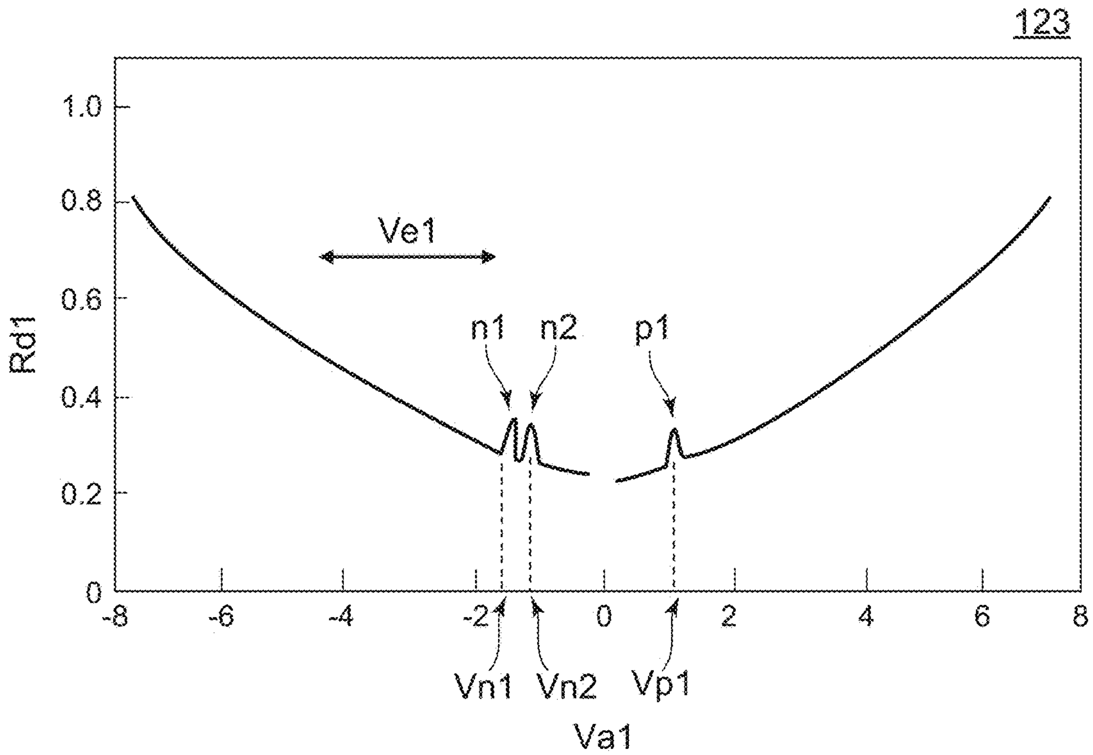
FIG. 20 is a graph illustrating characteristics of the magnetic head according to the second embodiment.

FIG. 20 is a graph illustrating characteristics of the magnetic head according to the second embodiment.

FIG. 20 corresponds to the magnetic head 123. As shown in FIG. 20, in the magnetic head 123, the differential electrical resistance Rd1 of the magnetic element 20 when the voltage Va1 is changed includes the first negative peak n1, the second negative peak n2 and the first positive peak p1. The voltage Va1 corresponding to the first negative peak n1 is the first negative peak voltage Vn1. The voltage Va1 corresponding to the second negative peak n2 is the second negative peak voltage Vn2. The voltage Va1 corresponding to the first positive peak p1 is the first positive peak voltage Vp1.

The first negative peak voltage Vn1 and the second negative peak voltage Vn2 are negative. The first positive peak voltage Vp1 is positive. The second negative peak voltage Vn2 is higher than the first negative peak voltage Vn1 and lower than the first positive peak voltage Vp1. In the magnetic head 123, the absolute value of the element voltage Ve1 being negative is greater than or equal to the absolute value of the negative first negative peak voltage Vn1. A stable and high-intensity oscillation can be obtained.

In the magnetic head 123, the "first peak" is, for example, the first negative peak n1. The "second peak" is, for example, the second negative peak n2. The "third peak" is, for example, the first positive peak p1. The first negative peak voltage Vn1 is, for example, a first voltage. The second negative peak voltage Vn2 is, for example, a second voltage. The first positive peak voltage Vp1 is, for example, a third voltage. The second voltage is between the first voltage and the third voltage. The absolute value of the element voltage Vd1 being negative is not less than the absolute value of the first voltage being negative.

Thus, the element voltage Ve1 may satisfy a fourth condition. In the fourth condition, the first voltage, the second voltage and the element voltage Ve1 are negative. The third voltage is positive. In the fourth condition, the absolute value of the element voltage Ve1 is greater than or equal to the absolute value of the first voltage.

In the magnetic head 123, for example, the absolute value of the element voltage Ve1 may be 10 times or less the absolute value of the second negative peak voltage Vn2. The absolute value of the element voltage Ve1 may be 8 times or less the absolute value of the second negative peak voltage Vn2. For example, the absolute value of the element voltage Ve1 may be 10 times or less the absolute value of the first positive peak voltage Vp1. The absolute value of the element voltage Ve1 may be 8 times or less the absolute value of the first positive peak voltage Vp1.

In the magnetic head 123, for example, the absolute value of the first voltage may be 4 times or less the absolute value of the first positive peak voltage Vp1. For example, the absolute value of the first voltage may be 3 times or less the absolute value of the first positive peak voltage Vp1. For example, the absolute value of the first voltage may be 4 times or less the absolute value of the second negative peak voltage Vn2. For example, the absolute value of the first voltage may be 3 times or less the absolute value of the second negative peak voltage Vn2.

In the magnetic head 123, the tail of the first negative peak n1 may overlap the second negative peak n2. The tail of the second negative peak n2 may overlap the first negative peak n1.

Figure 21:
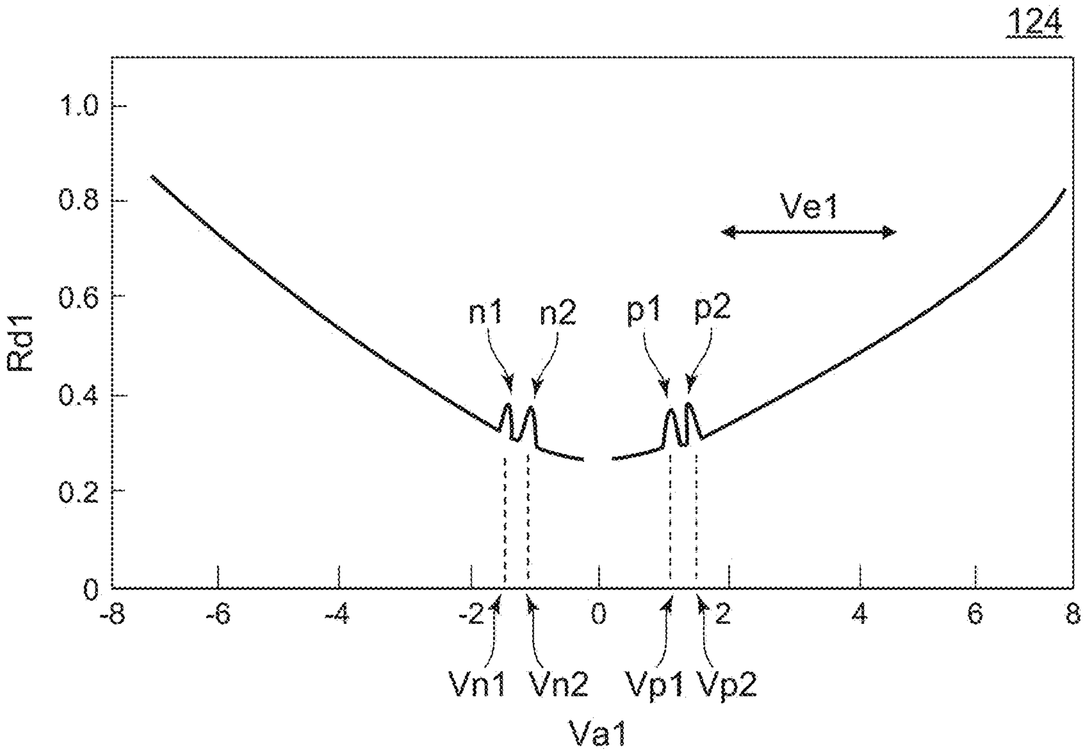
FIG. 21 is a graph illustrating characteristics of the magnetic head according to the second embodiment.

FIG. 21 is a graph illustrating characteristics of the magnetic head according to the second embodiment.

FIG. 21 corresponds to the magnetic head 124. As shown in FIG. 21, in the magnetic head 124, the differential electrical resistance Rd1 of the magnetic element 20 when the voltage Va1 is changed includes the first negative peak n1, the second negative peak n2, the first positive peak p1 and the second Includes positive peak p2. The voltage Va1 corresponding to the first negative peak n1 is the first negative peak voltage Vn1 being negative. The voltage Va1 corresponding to the second negative peak n2 is the second negative peak voltage Vn2 being negative. The voltage Va1 corresponding to the first positive peak p1 is the first positive peak voltage Vp1 being positive. The voltage Va1 corresponding to the second positive peak p2 is the second positive peak voltage Vp2 being positive. The second negative peak voltage Vn2 is between the first negative peak voltage Vn1 and the second positive peak voltage Vp2. The first positive peak voltage Vp1 is between the second negative peak voltage Vn2 and the second positive peak voltage Vp2.

The element voltage Ve1 satisfies a fifth condition. In the fifth condition, the element voltage Ve1 is positive. In the fifth condition, the element voltage Ve1 is equal to or higher than the second positive peak voltage Vp2. A stable and high-intensity oscillation can be obtained.

In the magnetic head 124, for example, the absolute value of the element voltage Ve1 may be 10 times or less the absolute value of the first positive peak voltage Vp1. The absolute value of the element voltage Ve1 may be 8 times or less the absolute value of the first positive peak voltage Vp1. For example, the absolute value of the element voltage Ve1 may be 10 times or less the absolute value of the second negative peak voltage Vn2. The absolute value of the element voltage Ve1 may be 8 times or less the absolute value of the second negative peak voltage Vn2.

In the magnetic head 124, for example, the absolute value of the second positive peak voltage Vp2 may be 4 times or less the absolute value of the first positive peak voltage Vp1. For example, the absolute value of the second positive peak voltage Vp2 may be 3 times or less the absolute value of the first positive peak voltage Vp1. For example, the absolute value of the second positive peak voltage Vp2 may be 4 times or less the absolute value of the second negative peak voltage Vn2. For example, the absolute value of the second positive peak voltage Vp2 may be 3 times or less the absolute value of the second negative peak voltage Vn2.

Figure 22:
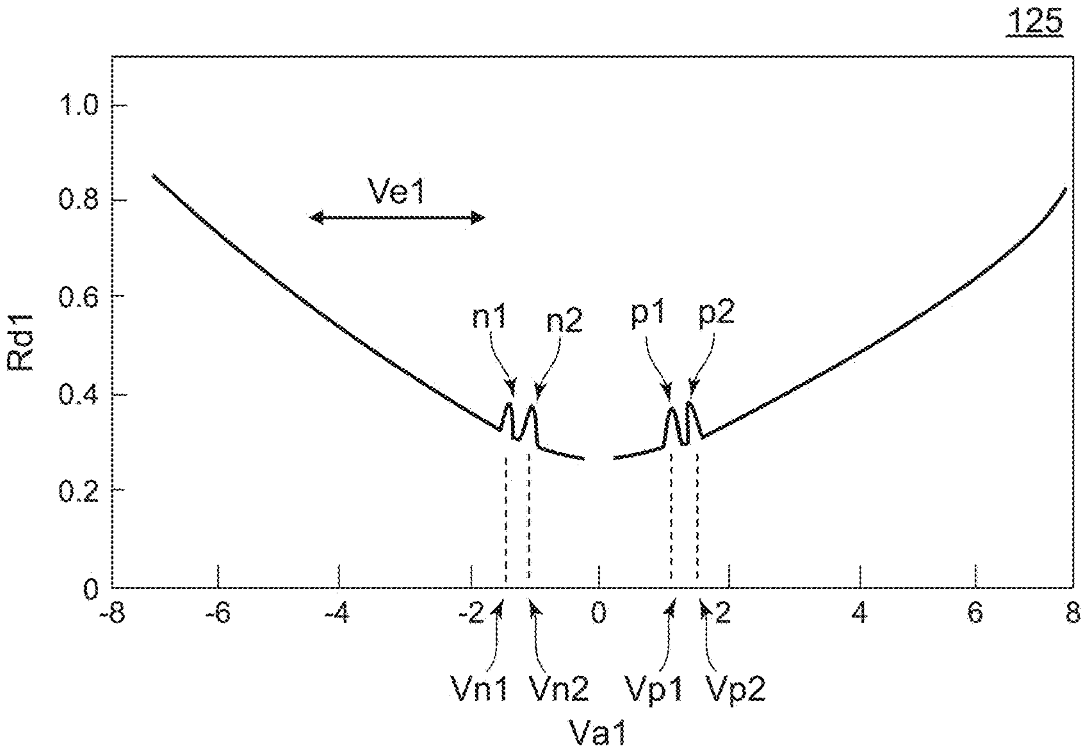
FIG. 22 is a graph illustrating characteristics of the magnetic head according to the second embodiment.

FIG. 22 is a graph illustrating characteristics of the magnetic head according to the second embodiment.

FIG. 22 corresponds to the magnetic head 125. As shown in FIG. 22, in the magnetic head 125, the differential electrical resistance Rd1 of the magnetic element 20 when the voltage Va1 is changed includes the first negative peak n1, the second negative peak n2, the first positive peak p1 and the second Includes positive peak p2. The voltage Va1 corresponding to the first negative peak n1 is the first negative peak voltage Vn1 being negative. The voltage Va1 corresponding to the second negative peak n2 is the second negative peak voltage Vn2 being negative. The voltage Va1 corresponding to the first positive peak p1 is the first positive peak voltage Vp1 being positive. The voltage Va1 corresponding to the second positive peak p2 is the second positive peak voltage Vp2 being positive.

The element voltage Ve1 satisfies a sixth condition. In the sixth condition, the element voltage Ve1 is negative. In the sixth condition, the absolute value of the element voltage Ve1 is greater than or equal to the absolute value of the first negative peak voltage Vn1. A stable and high-intensity oscillation can be obtained.

In the magnetic head 125, for example, the absolute value of the element voltage Ve1 may be 10 times or less the absolute value of the first positive peak voltage Vp1. The absolute value of the element voltage Ve1 may be 8 times or less the absolute value of the first positive peak voltage Vp1. For example, the absolute value of the element voltage Ve1 may be 10 times or less the absolute value of the second negative peak voltage Vn2. The absolute value of the element voltage Ve1 may be 8 times or less the absolute value of the second negative peak voltage Vn2.

In the magnetic head 125, for example, the absolute value of the first negative peak voltage Vn1 may be 4 times or less the absolute value of the first positive peak voltage Vp1. For example, the absolute value of the first negative peak voltage Vn1 may be 3 times or less the absolute value of the first positive peak voltage Vp1. For example, the absolute value of the first negative peak voltage Vn1 may be 4 times or less the absolute value of the second negative peak voltage Vn2. For example, the absolute value of the first negative peak voltage Vn1 may be 3 times or less the absolute value of the second negative peak voltage Vn2.

In the magnetic head 124 and the magnetic head 125, the tail of the first positive peak p1 may overlap the second positive peak p2. The tail of the second positive peak p2 may overlap the first positive peak p1. The tail of the first negative peak n1 may overlap the second negative peak n2. The tail of the second negative peak n2 may overlap the first negative peak n1.

The second embodiments may include the following configurations (for example, technical proposals).

Configuration B1

A magnetic head, comprising:

a first magnetic pole;

a second magnetic pole; and a magnetic element provided between the first magnetic pole and the second magnetic pole, the magnetic element including a first magnetic layer, a second magnetic layer provided between the first magnetic layer and the second magnetic pole, a third magnetic layer provided between the second magnetic layer and the second magnetic pole, a fourth magnetic layer provided between the third magnetic layer and the second magnetic pole, a fifth magnetic layer provided between the fourth magnetic layer and the second magnetic pole, a first non-magnetic layer provided between the first magnetic pole and the first magnetic layer, a second non-magnetic layer provided between the first magnetic layer and the second magnetic layer, a third non-magnetic layer provided between the second magnetic layer and the third magnetic layer, a fourth non-magnetic layer provided between the third magnetic layer and the fourth magnetic layer, a fifth non-magnetic layer provided between the fourth magnetic layer and the fifth magnetic layer, and a sixth non-magnetic layer provided between the fifth magnetic layer and the second magnetic pole, the sixth non-magnetic layer including at least one selected from the group consisting of Ru, Ir, Ta, Rh, Pd, Pt and W.

Configuration B2

The magnetic head according to Configuration B1, wherein the first non-magnetic layer includes at least one selected from the group consisting of Ru, Ir, Ta, Rh, Pd, Pt and W, and the fourth non-magnetic layer includes at least one selected from the group consisting of Ru, Ir, Ta, Rh, Pd, Pt and W.

Configuration B3

The magnetic head according to Configuration B2, wherein the second non-magnetic layer includes at least one selected from the group consisting of Cu, Au, Cr, Al, V and Ag, the third non-magnetic layer includes at least one selected from the group consisting of Cu, Au, Cr, Al, V and Ag, and the fifth non-magnetic layer includes at least one selected from the group consisting of Cu, Au, Cr, Al, V and Ag.

Configuration B4

The magnetic head according to Configuration B3, wherein a second thickness of the second magnetic layer in a first direction from the first magnetic pole to the second magnetic pole is thicker than a first thickness of the first magnetic layer in the first direction, and the second thickness is thicker than a third thickness of the third magnetic layer in the first direction.

Configuration B5

The magnetic head according to Configuration B4, wherein a fourth thickness of the fourth magnetic layer in the first direction is thinner than a fifth thickness of the fifth magnetic layer in the first direction.

Configuration B6

The magnetic head according to Configuration B4, wherein a fourth thickness of the fourth magnetic layer in the first direction is thicker than a fifth thickness of the fifth magnetic layer in the first direction.

Configuration B7

The magnetic head according to Configuration B4, wherein the magnetic element further includes:

a sixth magnetic layer, and a seventh non-magnetic layer, the sixth magnetic layer is provided between the fifth magnetic layer and the sixth non-magnetic layer, and the seventh non-magnetic layer is provided between the fifth magnetic layer and the sixth magnetic layer.

Configuration B8

The magnetic head according to Configuration B7, wherein the seventh non-magnetic layer includes at least one selected from the group consisting of Cu, Au, Cr, Al, V and Ag, a fifth thickness of the fifth magnetic layer in the first direction is thicker than a fourth thickness of the fourth magnetic layer in the first direction, and the fifth thickness is thicker than a sixth thickness of the sixth magnetic layer in the first direction.

Configuration B9

The magnetic head according to Configuration B8, wherein the first non-magnetic layer contacts the first magnetic pole and the first magnetic layer, the second non-magnetic layer contacts the first magnetic layer and the second magnetic layer, the third non-magnetic layer contacts the second magnetic layer and the third magnetic layer, the fourth non-magnetic layer contacts the third magnetic layer and the fourth magnetic layer, the fifth non-magnetic layer contacts the fourth magnetic layer and the fifth magnetic layer, the seventh non-magnetic layer contacts the fifth magnetic layer and the sixth magnetic layer, and the sixth non-magnetic layer contacts the sixth magnetic layer and the second magnetic pole.

Configuration B10

The magnetic head according to Configuration B4, wherein the first non-magnetic layer contacts the first magnetic pole and the first magnetic layer, the second non-magnetic layer contacts the first magnetic layer and the second magnetic layer, the third non-magnetic layer contacts the second magnetic layer and the third magnetic layer, the fourth non-magnetic layer contacts the third magnetic layer and the fourth magnetic layer, the fifth non-magnetic layer contacts the fourth magnetic layer and the fifth magnetic layer, and the sixth non-magnetic layer contacts the fifth magnetic layer and the second magnetic pole.

Configuration B11

The magnetic head according to any one of Configurations B1-B10, wherein one end of the magnetic element is electrically connected to the first magnetic pole, another end of the magnetic element is electrically connected to the second magnetic pole, and a differential electrical resistance of the magnetic element when a voltage between the first magnetic pole and the second magnetic pole is changed includes 3 or more peaks.

Configuration B12

A magnetic recording device, comprising:

the magnetic head according to any one of Configurations 1-6; and a controller including an element circuit, one end of the magnetic element being electrically connected to the first magnetic pole, another end of the magnetic element being electrically connected to the second magnetic pole, and the element circuit being configured to apply an element voltage between the first magnetic pole and the second magnetic pole.

Configuration B13

The magnetic recording device according to Configuration B12, wherein a differential electric resistance of the magnetic element when a voltage between the first magnetic pole and the second magnetic pole is changed includes a first peak, a second peak and a third peak, when the voltage is positive, a potential of the first magnetic pole is lower than a potential of the second magnetic pole, when the voltage is negative, the potential of the first magnetic pole is higher than the potential of the second magnetic pole, the voltage corresponding to the first peak is a first voltage, the voltage corresponding to the second peak is a second voltage, the voltage corresponding to the third peak is a third voltage, the second voltage is between the first voltage and the third voltage, the element voltage satisfies one of the first condition, the second condition, the third condition and the fourth condition, in the first condition, the first voltage is negative, the second voltage, the third voltage and the element voltage are positive, and the element voltage is equal to or higher than the third voltage, in the second condition, the first voltage and the second voltage are negative, the third voltage and the element voltage are positive, and the element voltage is equal to or higher than the third voltage, in the third condition, the first voltage and the element voltage are negative, the second voltage and the third voltage are positive, and the absolute value of the element voltage is equal to or greater than the absolute value of the first voltage, and in the fourth condition, the first voltage, the second voltage, and the element voltage are negative, the third voltage is positive, and the absolute value of the element voltage is equal to or greater than the first voltage.

Configuration B14

A magnetic recording device, comprising:

the magnetic head according to any one of Configurations B7-B10; and a controller including an element circuit, one end of the magnetic element being electrically connected to the first magnetic pole, another end of the magnetic element being electrically connected to the second magnetic pole, and the element circuit being configured to apply an element voltage between the first magnetic pole and the second magnetic pole.

Configuration B15

The magnetic recording device according to Configuration B14, wherein a differential electric resistance of the magnetic element when a voltage between the first magnetic pole and the second magnetic pole is changed includes a first negative peak, a second negative peak, a first positive peak and a second positive peak, when the voltage is positive, a potential of the first magnetic pole is lower than a potential of the second magnetic pole, when the voltage is negative, the potential of the first magnetic pole is higher than the potential of the second magnetic pole, the voltage corresponding to the first negative peak is a first negative peak voltage being negative, the voltage corresponding to the second negative peak is a second negative peak voltage being negative, the voltage corresponding to the first positive peak is a first positive peak voltage being positive, the voltage corresponding to the second positive peak is a second positive peak voltage being positive, the second negative peak voltage is between the first negative peak voltage and the second positive peak voltage, the first positive peak voltage is between the second negative peak voltage and the second positive peak voltage, the element voltage satisfies one of the fifth condition and the sixth condition, in the fifth condition, the element voltage is positive, the element voltage is equal to or higher than the second positive peak voltage, and in the sixth condition, the element voltage is negative, and the absolute value of the element voltage is greater than or equal to the absolute value of the first negative peak voltage.

Third Embodiment

Figure 23:
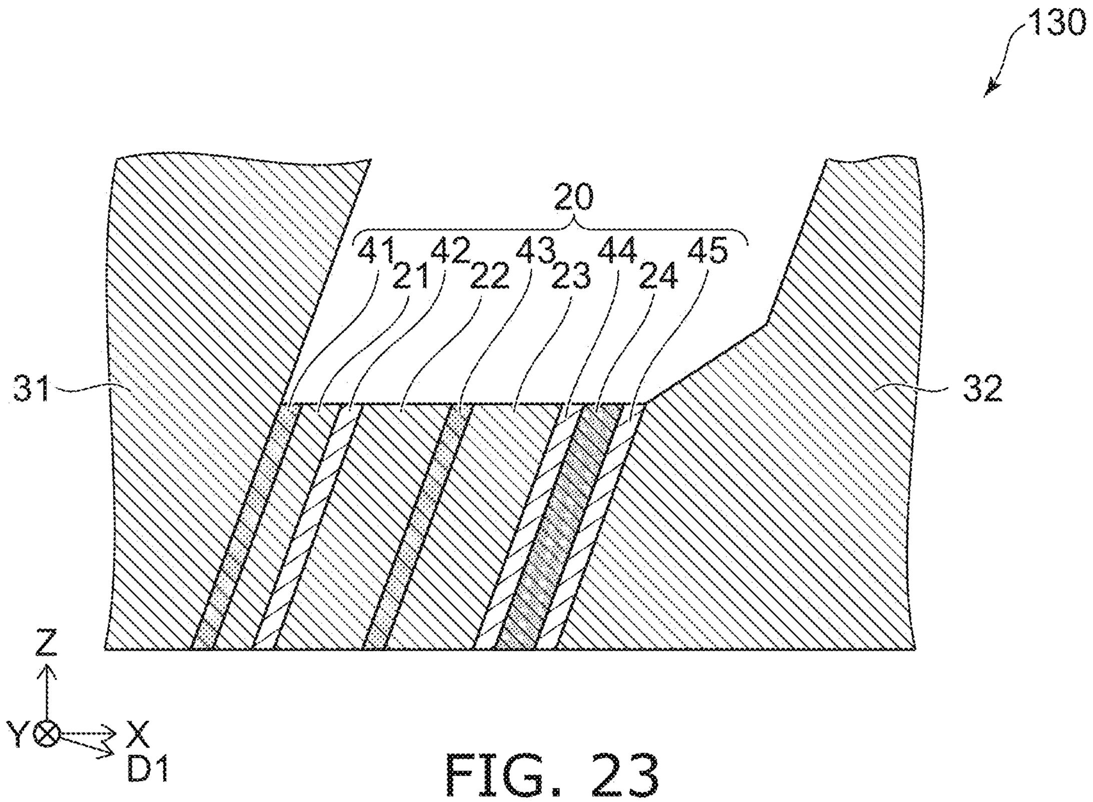
FIG. 23 is a schematic cross-sectional view illustrating a magnetic head according to a third embodiment.

FIG. 23 is a schematic cross-sectional view illustrating a magnetic head according to a third embodiment.

Figure 24:
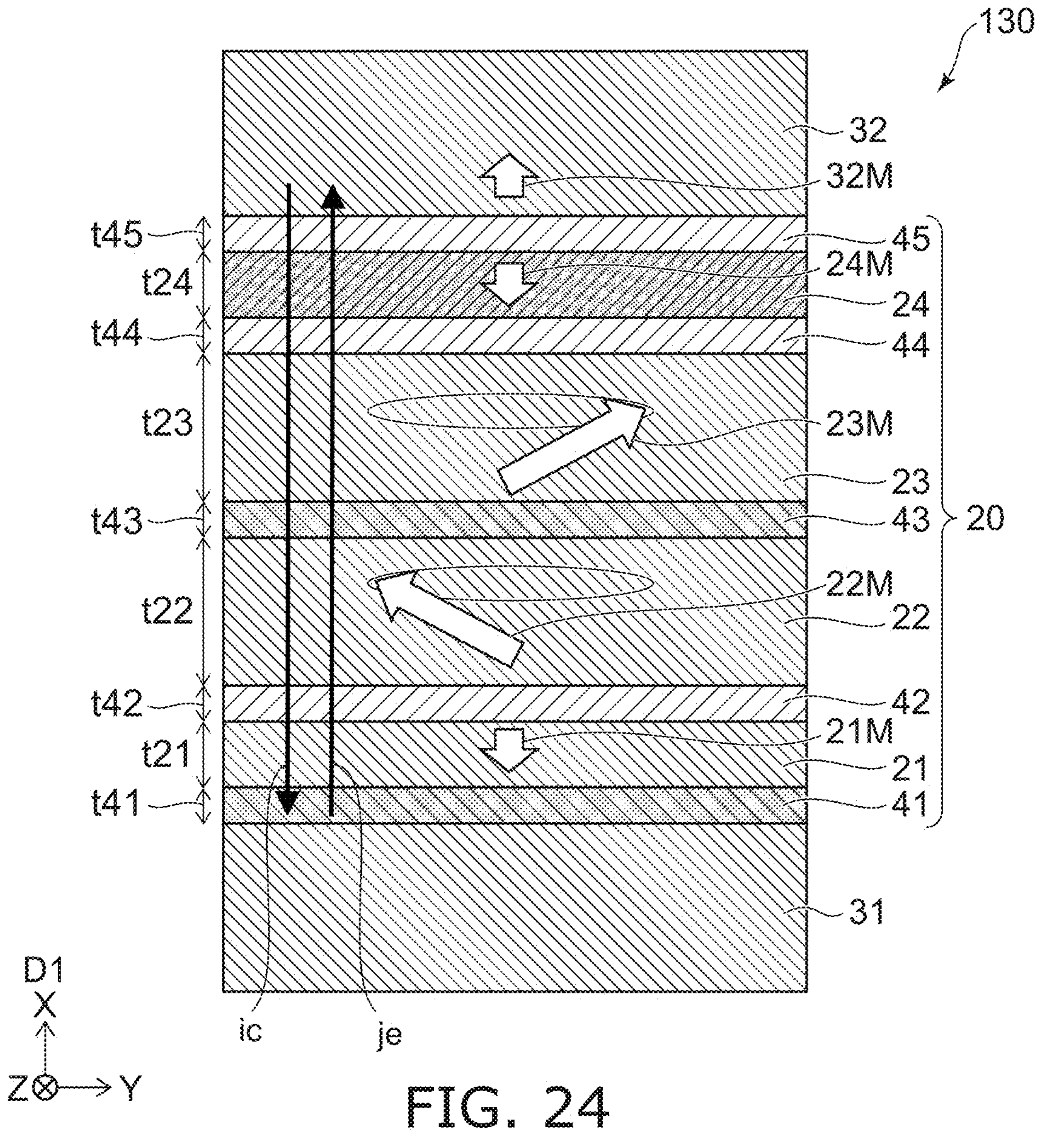
FIG. 24 is a schematic plan view illustrating the magnetic head according to the third embodiment.

FIG. 24 is a schematic plan view illustrating the magnetic head according to the third embodiment.

Figure 25:
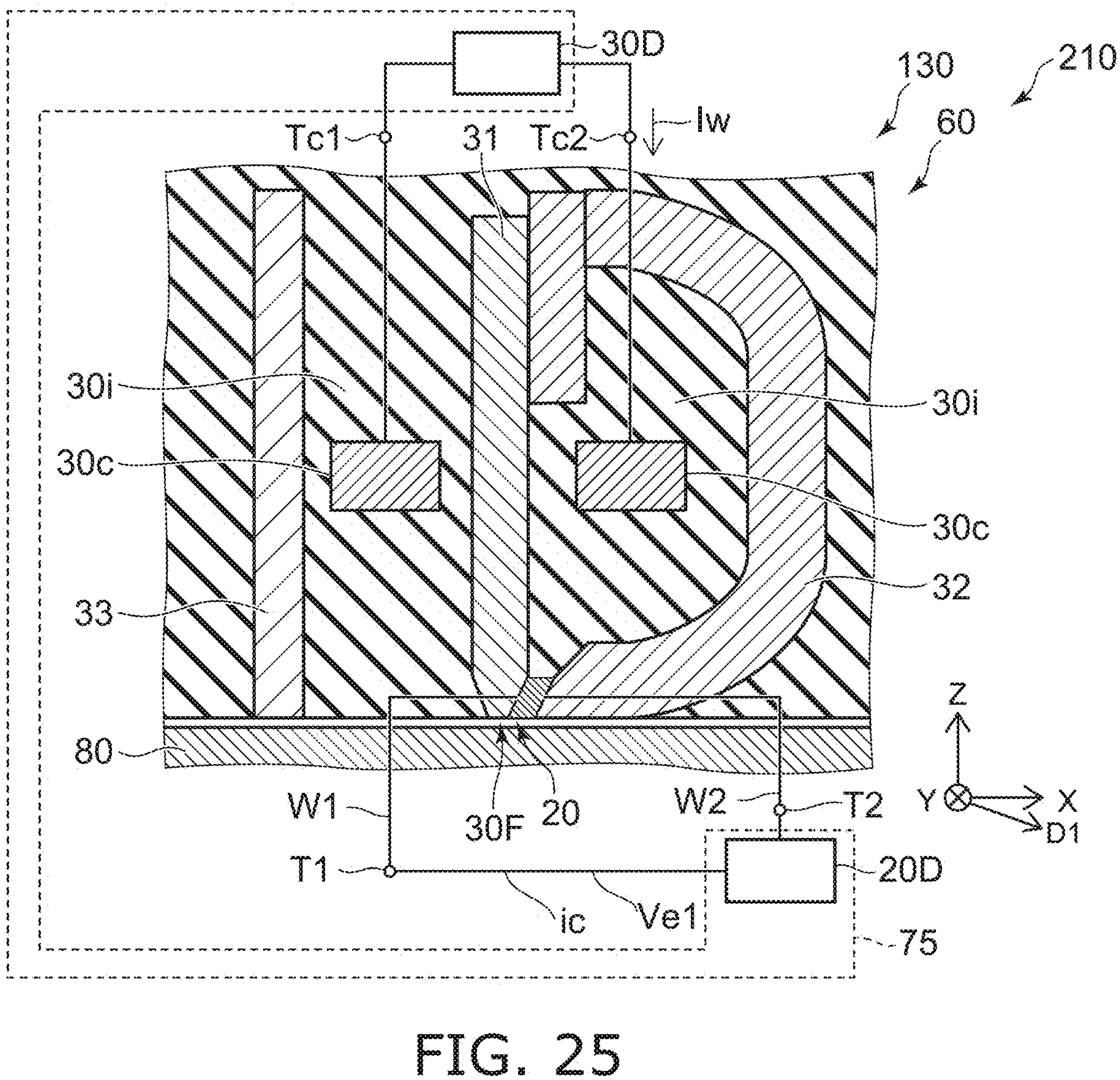
FIG. 25 is a schematic cross-sectional view illustrating the magnetic recording device including the magnetic head according to the third embodiment.

FIG. 25 is a schematic cross-sectional view illustrating the magnetic recording device including the magnetic head according to the third embodiment.

As shown in FIG. 25, the magnetic recording device 210 according to the embodiment includes a magnetic head 130 according to the third embodiment and the controller 75.

The magnetic head 130 includes the first magnetic pole 31, the second magnetic pole 32 and the magnetic element 20. The magnetic head 130 may include the coil 30*c*. The magnetic element 20 is provided between the first magnetic pole 31 and the second magnetic pole 32. The configuration described for the magnetic head 110 may be appropriately applied to the magnetic head 130. In the magnetic head 130, for example, the magnetic element 20 generates the alternating magnetic field (for example, a high frequency magnetic field). For example, MAMR can be implemented.

FIG. 24 corresponds to a plan view of the medium facing surface 30F viewed from the magnetic recording medium 80.

As shown in FIGS. 23 and 24, in the magnetic head 130, the magnetic element 20 includes a first magnetic layer 21, a second magnetic layer 22, a third magnetic layer 23, a fourth magnetic layer 24, a first non-magnetic layer 41, a second non-magnetic layer 42, a third non-magnetic layer 43, a fourth non-magnetic layer 44 and a fifth non-magnetic layer 45.

The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32.

The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the fourth magnetic layer 24. The fifth non-magnetic layer 45 is provided between the fourth magnetic layer 24 and the second magnetic pole 32.

In the third embodiment, the fourth magnetic layer includes at least one of Fe, Co or Ni, and a first element including at least one selected from the group consisting of Cr, V, Mn, Ti, N and Sc. The fourth non-magnetic layer 44 includes at least one selected from the group consisting of Cu, Au, Cr, Al, V and Ag. The fifth non-magnetic layer 45 includes at least one selected from the group consisting of Cu, Au, Cr, Al, V and Ag.

The fourth magnetic layer has, for example, negative polarization. On the other hand, the first magnetic layer 21, the second magnetic layer 22 and the third magnetic layer 23 include at least one of Fe, Co or Ni. The first magnetic layer 21, the second magnetic layer 22 and the third magnetic layer 23 do not include the first element. Alternatively, a concentration of the first element in the first magnetic layer 21, the second magnetic layer 22 and the third magnetic layer 23 is lower than a concentration of the first element in the fourth magnetic layer 24. For example, the first magnetic layer 21, the second magnetic layer 22 and the third magnetic layer 23 have positive polarization.

The fourth non-magnetic layer 44 contacts the fourth magnetic layer 24. The fifth non-magnetic layer 45 contacts the fourth magnetic layer 24 and the second magnetic pole 32.

The magnetization of the magnetic pole (e.g., the second magnetic pole 32) is not always stable and may oscillate. Even if the magnetization of the second magnetic pole 32 is unstable, it is preferable that stable oscillation be obtained in the magnetic element 20. In the magnetic head 130 according to the embodiment, by the magnetic element 20 including the fourth magnetic layer 24, stable oscillation can be obtained even when the magnetization of the second magnetic pole 32 is unstable.

For example, non-magnetic layer (the fourth non-magnetic layer 44 and the fifth non-magnetic layer 45) is provided on both sides of the fourth magnetic layer 24. Thereby, the spin torque of the fourth magnetic layer 24 acts on the second magnetic pole 32. For example, the magnetization 32M of the second magnetic pole 32 is easily stabilized. For example, the orientation of the component of the magnetization 24M of the fourth magnetic layer 24 along the first direction D1 is opposite to the orientation of the component of the magnetization 32M of the second magnetic pole 32 along the first direction D1.

For example, spin torque of the fourth magnetic layer 24 acts on the third magnetic layer 23. Thereby, the magnetization 23M of the third magnetic layer 23 becomes easy to oscillate. A high oscillation efficiency is obtained in the third magnetic layer 23. According to the magnetic element 20 in the magnetic head 130, highly efficient and stable oscillation can be obtained. According to the embodiments, it is possible to provide a magnetic head capable of improving the recording density. An example of simulation results of the characteristics of the magnetic element will be described below.

Figure 26A:
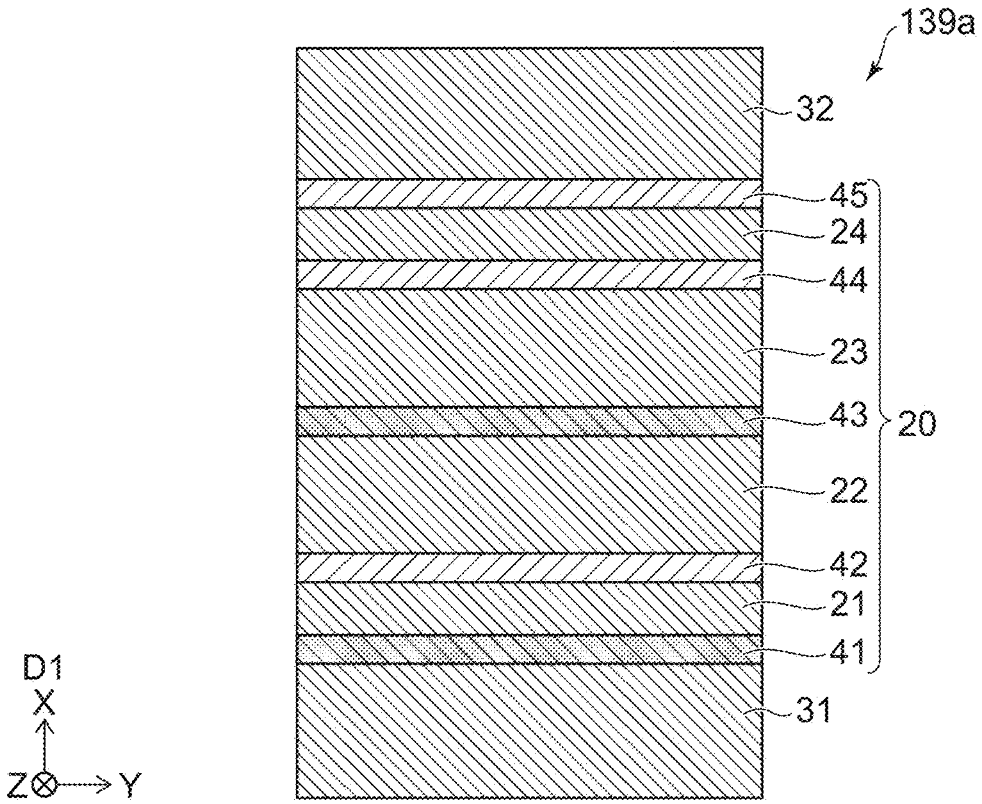
FIGS. 26A and 26B are schematic plan views illustrating magnetic heads of reference examples.
Figure 26B:
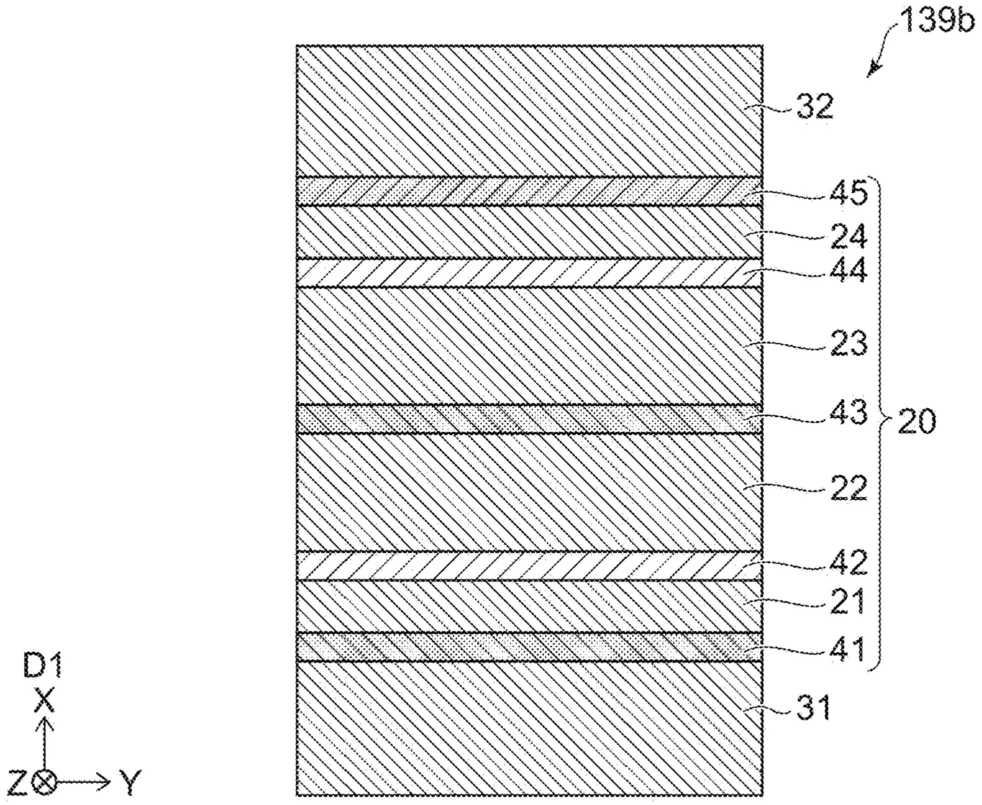

FIGS. 26A and 26B are schematic plan views illustrating magnetic heads of reference examples.

FIG. 26A shows a magnetic head 139*a* of a reference example. FIG. 26B shows a magnetic head 139*b* of a reference example. In the magnetic heads 139*a* and 139*b*, the fourth magnetic layer 24 does not include the first element (at least one selected from the group consisting of Cr, V, Mn, Ti, N and Sc). The spin torque of the fourth magnetic layer 24 acts on the second magnetic pole 32 in the magnetic head 139*a*. In the magnetic head 139*a*, the fifth non-magnetic layer 45 includes Cu. The spin torque of the fourth magnetic layer 24 does not act on the second magnetic pole 32 in the magnetic head 139*b*. In the magnetic head 139*b*, the fifth non-magnetic layer 45 includes Ru.

Figure 27:
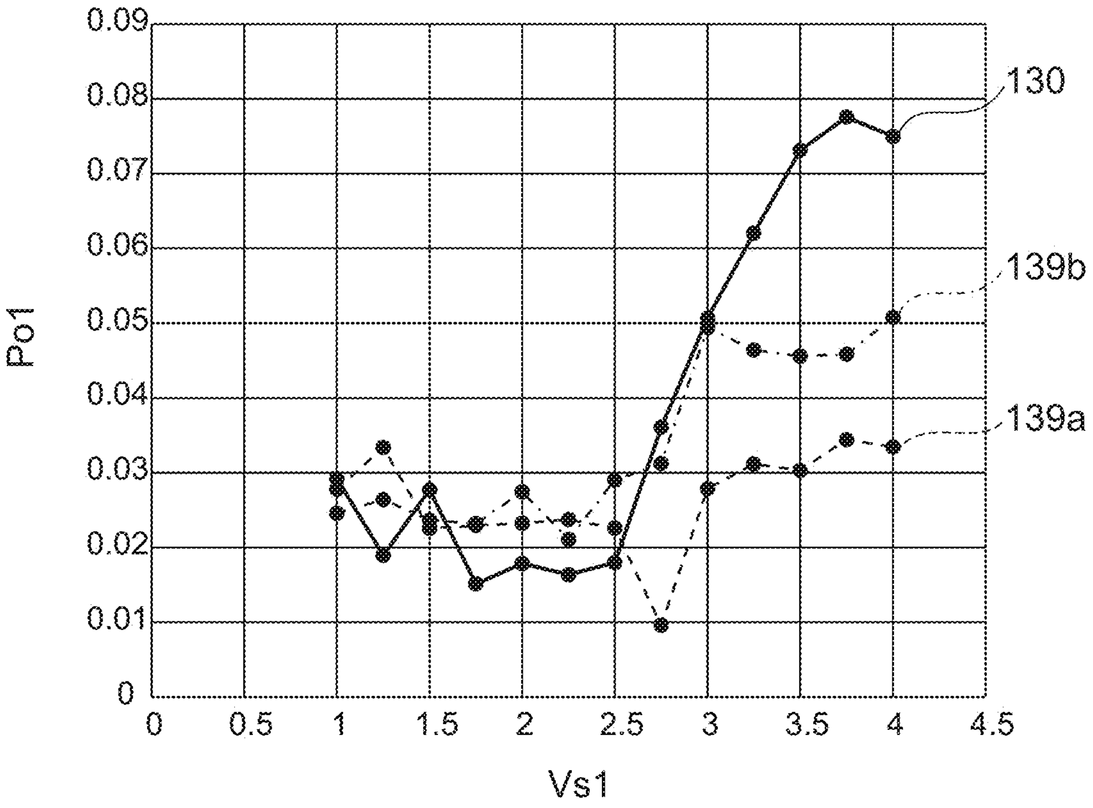
FIG. 27 is a graph illustrating characteristics of the magnetic heads.

FIG. 27 is a graph illustrating characteristics of the magnetic heads.

FIG. 27 illustrates simulation results of the characteristics of the magnetic heads 130, 139*a* and 139*b*. In the simulation model, the magnetization of the second magnetic pole 32 is movable. The horizontal axis of FIG. 27 is the normalized applied voltage Vs1. The applied voltage Vs1 is applied between one end of the magnetic element 20 and the other end. The vertical axis is the oscillation parameter Pol. The higher the oscillation parameter Pol, the higher the intensity of stable oscillation.

As shown in FIG. 27, in the region where the applied voltage Vs1 is high, the oscillation parameter Pol of the magnetic head 130 is higher than the oscillation parameter Pol of the magnetic heads 139*a* and 139*b* of the reference example. Similar tendencies are obtained when the thicknesses of the magnetic layers are changed in the configuration of the magnetic heads 139*a* and 139*b*. In the configuration of the magnetic head 130, high intensity oscillation can be obtained. According to the embodiments, it is possible to provide a magnetic head capable of improving the recording density.

In the magnetic head 130, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W.

As shown in FIG. 24, a thickness of the first magnetic layer 21 in the first direction D1 is defined as a first thickness t21. The first direction D1 is a direction from the first magnetic pole 31 to the second magnetic pole 32. A thickness of the second magnetic layer 22 in the first direction D1 is defined as a second thickness t22. A thickness of the third magnetic layer 23 in the first direction D1 is defined as a third thickness t23. A thickness of the fourth magnetic layer 24 in the first direction D1 is defined as a fourth thickness t24.

In the magnetic head 130, the second thickness t22 is thicker than the first thickness t21. The third thickness t23 is thicker than the first thickness t21. The fourth thickness t24 is thinner than the third thickness t23. The second thickness t22 is thinner than the fourth thickness t24.

In the magnetic head 130, for example, the second magnetic layer 22 and the third magnetic layer 23 function as oscillation layers. The first magnetic layer 21 and the fourth magnetic layer 24 function as spin injection layers.

As shown in FIG. 24, when the magnetic head 130 is in operation, an element current ic equal to or higher than the threshold value is supplied to the magnetic element 20. The element current ic flows in the direction from the second magnetic pole 32 to the first magnetic pole 31, for example. An electron flow je corresponding to the element current ic flows in the direction from the first magnetic pole 31 to the second magnetic pole 32. The element current ic flows in the direction from fifth non-magnetic layer 45 to first non-magnetic layer 41. An element voltage Ve1 is applied to the magnetic element 20 in the operation. The potential of the first magnetic pole 31 is lower than the potential of the second magnetic pole 32 when the element voltage Ve1 is applied.

In the magnetic head 130, for example, the orientation of the component of the magnetization 24M of the fourth magnetic layer 24 along the first direction D1 is opposite to the orientation of the component of the magnetization 32M of the second magnetic pole 32 along the first direction D1. The orientation of the component of the magnetization 21M of the first magnetic layer 21 along the first direction D1 is the same as the orientation of the component of the magnetization 24M of the fourth magnetic layer 24 along the first direction D1. The magnetization 22M of the second magnetic layer 22 oscillates. The magnetization 23M of the third magnetic layer 23 oscillates.

Figure 28:
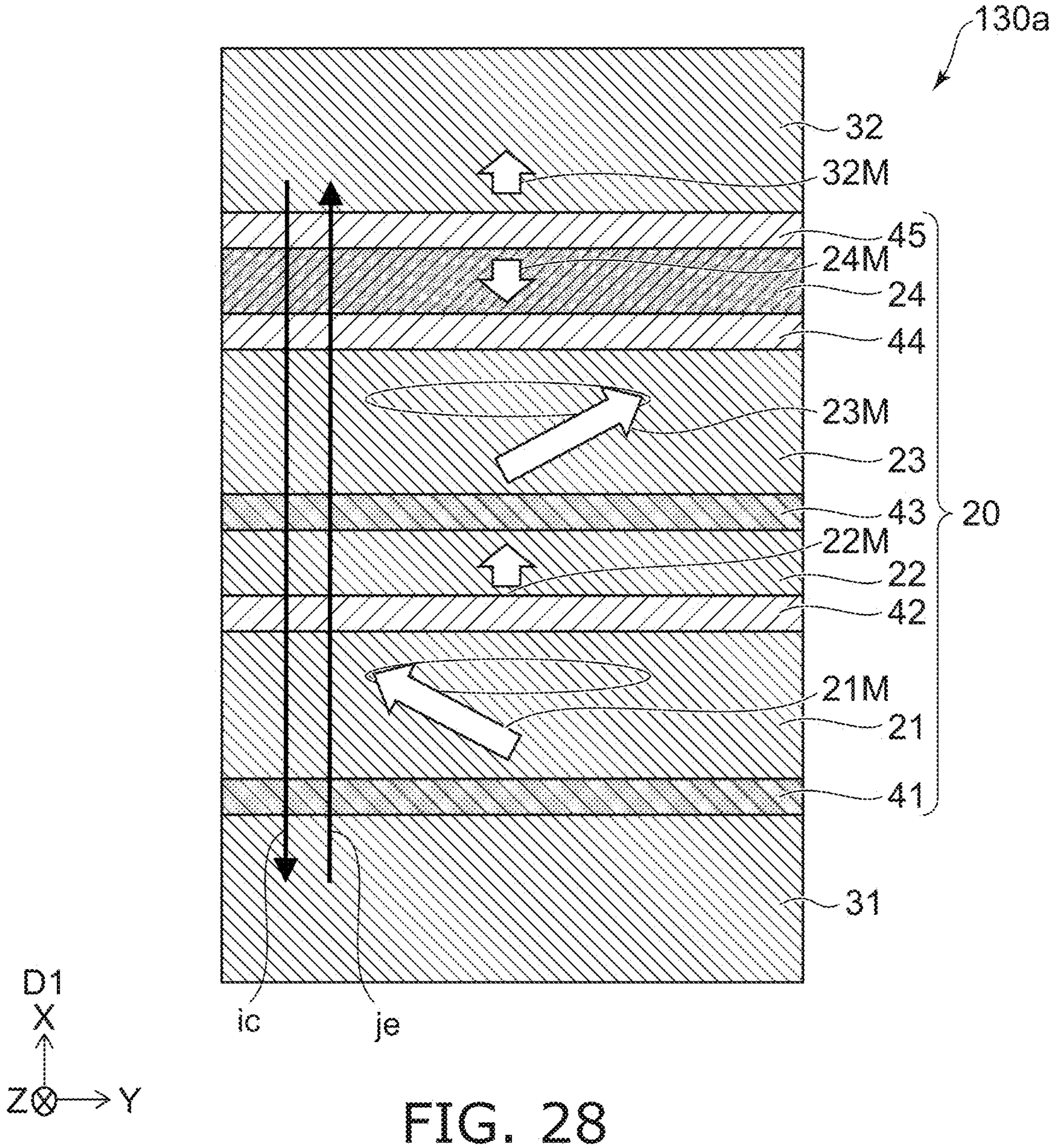
FIG. 28 is a schematic plan view illustrating a magnetic head according to the third embodiment.

FIG. 28 is a schematic plan view illustrating a magnetic head according to the third embodiment.

As shown in FIG. 28, in a magnetic head 130*a* according to the embodiment, the relationship between the first thickness t21 and the second thickness t22 is different from that in the magnetic head 130. Other configurations of the magnetic head 130*a* are the same as the configurations of the magnetic head 130.

In the magnetic head 130*a*, the first thickness t21 is thicker than the second thickness t22. The third thickness t23 is thicker than the second thickness t22. The fourth thickness t24 is thinner than the third thickness t23. High-intensity oscillation is also obtained in the magnetic head 130*a*.

Figure 29:
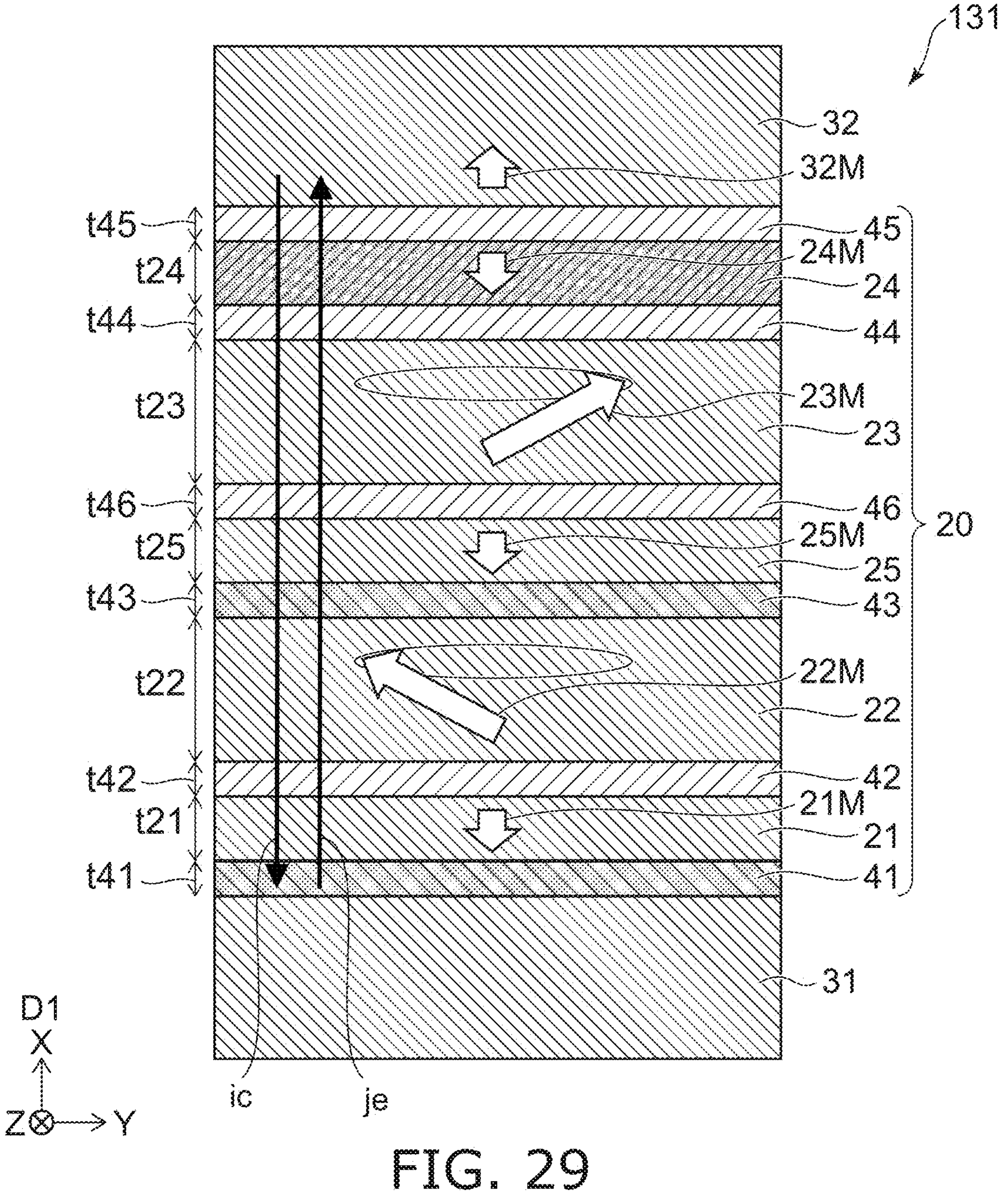
FIG. 29 is a schematic plan view illustrating a magnetic head according to the first embodiment.

FIG. 29 is a schematic plan view illustrating a magnetic head according to the first embodiment.

As shown in FIG. 29, in a magnetic head 131 according to the embodiment, the magnetic element 20 further includes a fifth magnetic layer 25 and a sixth non-magnetic layer 46. Other configurations of the magnetic head 131 may be the same as the configurations of the magnetic head 130.

In the magnetic head 131, the fifth magnetic layer 25 is provided between the third non-magnetic layer 43 and the third magnetic layer 23. The sixth non-magnetic layer 46 is provided between the fifth magnetic layer 25 and the third magnetic layer 23. In this example, the fifth magnetic layer 25 contacts the third non-magnetic layer 43. The sixth non-magnetic layer 46 contacts the fifth magnetic layer 25 and the third magnetic layer 23.

In the magnetic head 131, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W. The sixth non-magnetic layer 46 includes at least one selected from the group consisting of Cu, Au, Cr, Al, V and Ag.

A thickness of the fifth magnetic layer 25 in the first direction D1 is defined as a fifth thickness t25. In the magnetic head 130, the second thickness t22 is thicker than the first thickness t21. The third thickness t23 is thicker than the first thickness t21. The fourth thickness t24 is thinner than the third thickness t23. The fifth thickness t25 is thinner than the third thickness t23.

Figure 30:
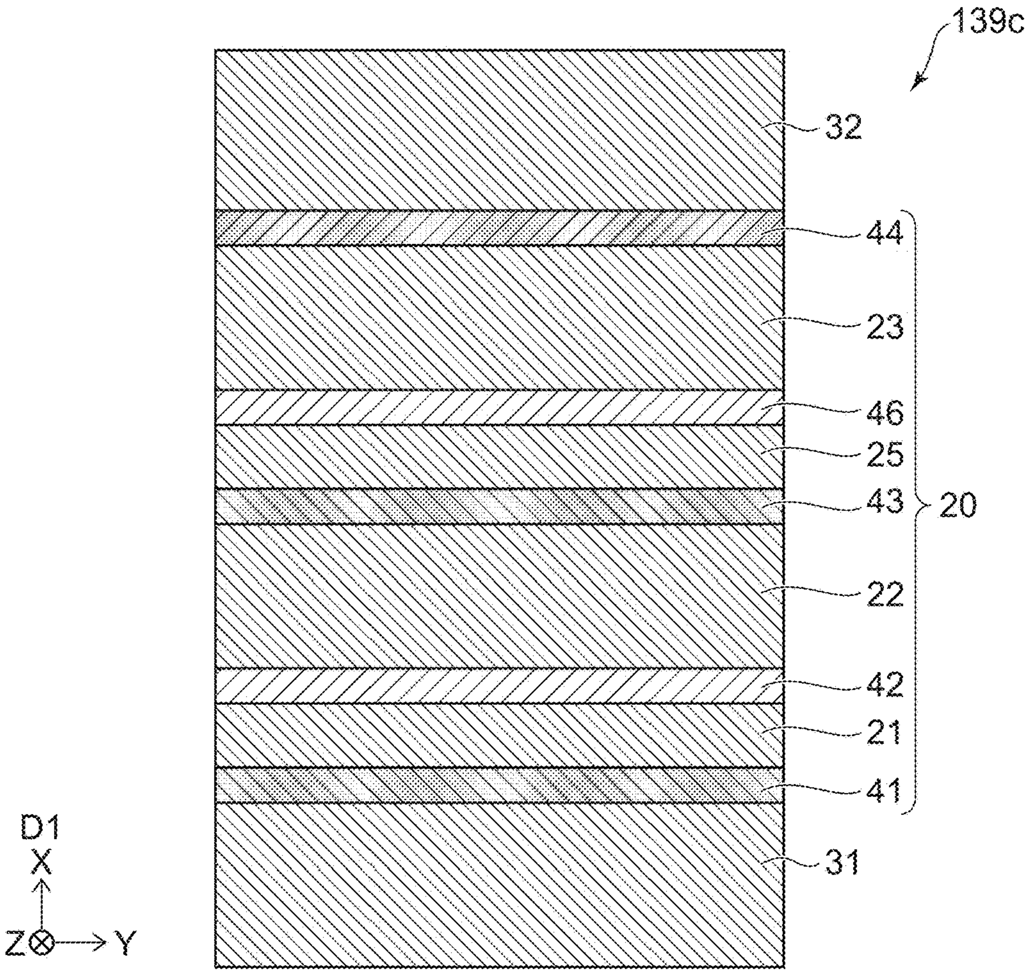
FIG. 30 is a schematic plan view illustrating a magnetic head of a reference example.

FIG. 30 is a schematic plan view illustrating a magnetic head of a reference example.

As shown in FIG. 30, in the magnetic head 139*c* of the reference example, the fourth magnetic layer 24 and the fifth non-magnetic layer 45 are not provided. The fourth nonmagnetic layer 44 includes Ru. Other configurations are the same as the configurations of the magnetic head 131.

Figure 31:
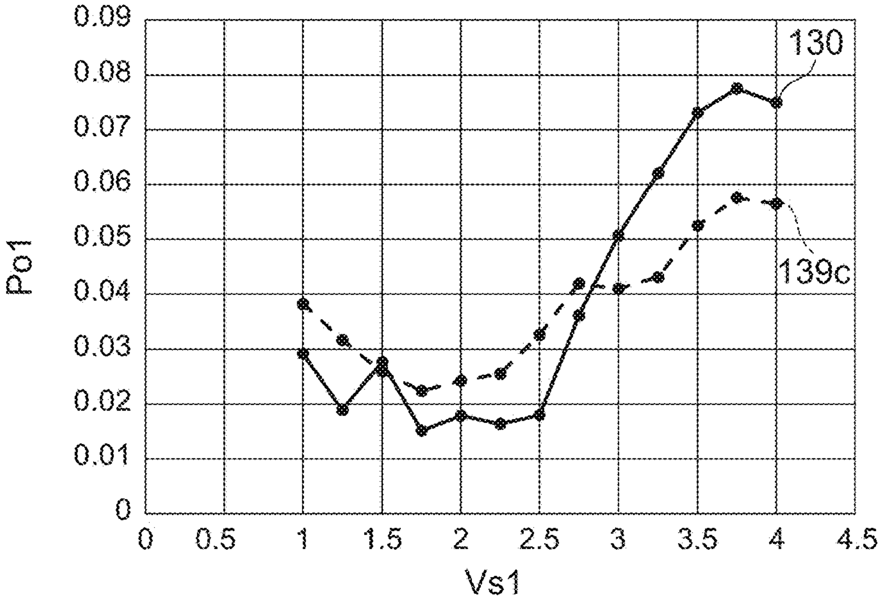
FIG. 31 is a graph illustrating characteristics of the magnetic heads.

FIG. 31 is a graph illustrating characteristics of the magnetic heads.

FIG. 31 illustrates simulation results of the characteristics of the magnetic heads 131 and 139*c*. In the simulation model, the magnetization of the second magnetic pole 32 is movable. As shown in FIG. 31, the oscillation parameter Pol of the magnetic head 131 is higher than the oscillation parameter Pol of the magnetic head 139*c* of the reference example. Similar tendencies are obtained when the thicknesses of the magnetic layers are changed in the structure of the magnetic head 139*c*. In the configuration of the magnetic head 131, high-intensity oscillation can be obtained.

Figure 32:
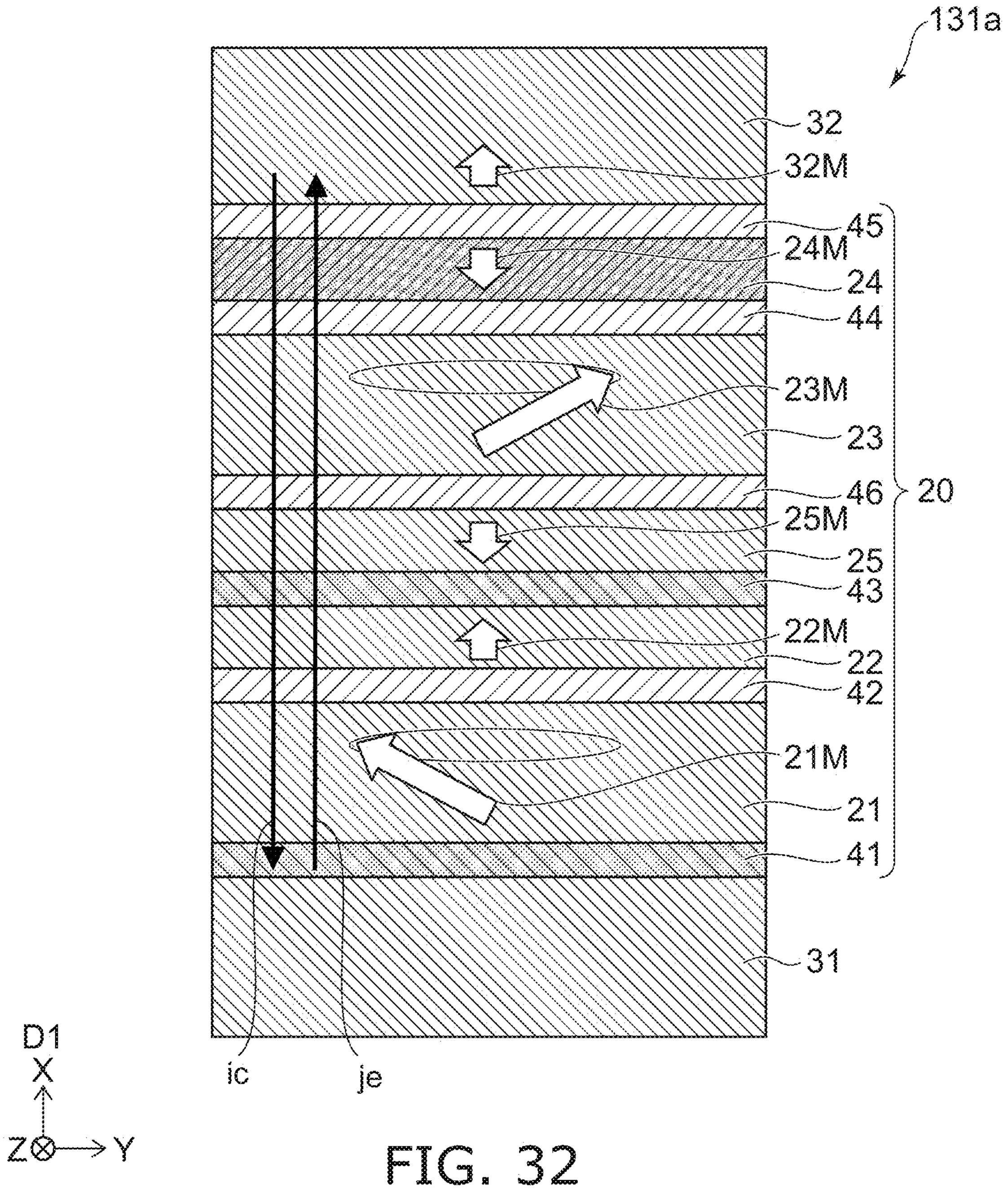
FIG. 32 is a schematic plan view illustrating a magnetic head according to the third embodiment.

FIG. 32 is a schematic plan view illustrating a magnetic head according to the third embodiment.

As shown in FIG. 32, in a magnetic head 131*a* according to the embodiment, the relationship between the first thickness t21 and the second thickness t22 is different from that in the magnetic head 131. Other configurations of the magnetic head 131*a* are the same as the configurations of the magnetic head 131. In the configuration of the magnetic head 131*a*, high-intensity oscillation is also obtained.

In the magnetic head 131*a*, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W. The sixth non-magnetic layer 46 includes at least one selected from the group consisting of Cu, Au, Cr, Al, V and Ag.

In the magnetic head 131*a*, the first thickness t21 is thicker than the second thickness t22. The third thickness t23 is thicker than the second thickness t22. The fourth thickness t24 is thinner than the third thickness t23. The fifth thickness t25 is thinner than the third thickness t23.

Figure 33:
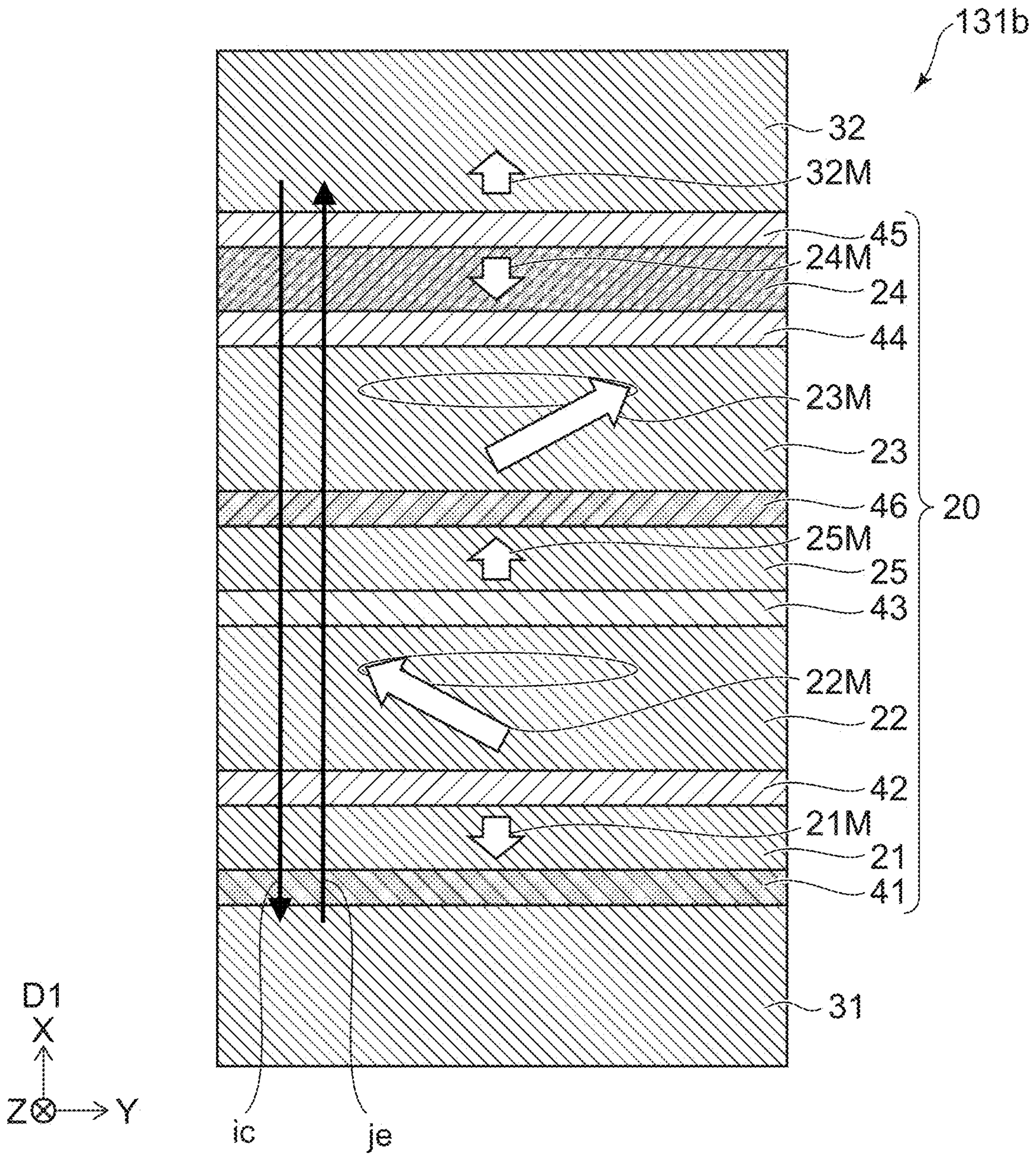
FIG. 33 is a schematic plan view illustrating a magnetic head according to the third embodiment.

FIG. 33 is a schematic plan view illustrating a magnetic head according to the third embodiment.

As shown in FIG. 33, in the magnetic head 131*b* according to the embodiment, the materials of the third non-magnetic layer 43 and the sixth non-magnetic layer 46 are different from the materials of the third non-magnetic layer 43 and the sixth non-magnetic layer 46 in the magnetic head 131. Other than this, the configuration of the magnetic head 131*a* is the same as the configuration of the magnetic head 131. In the configuration of the magnetic head 131*a*, high intensity oscillation is also obtained.

In the magnetic head 131*b*, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Cu, Au, Cr, Al, V and Ag. The sixth non-magnetic layer 46 includes at least one selected from the group consisting of Ru, Ir, Ta, Rh, Pd, Pt and W.

In the magnetic head 131*b*, the second thickness t22 is thicker than the first thickness t21. The third thickness t23 is thicker than the first thickness t21. The fourth thickness t24 is thinner than the third thickness t23. The fifth thickness t25 is thinner than the third thickness t23.

Figure 34:
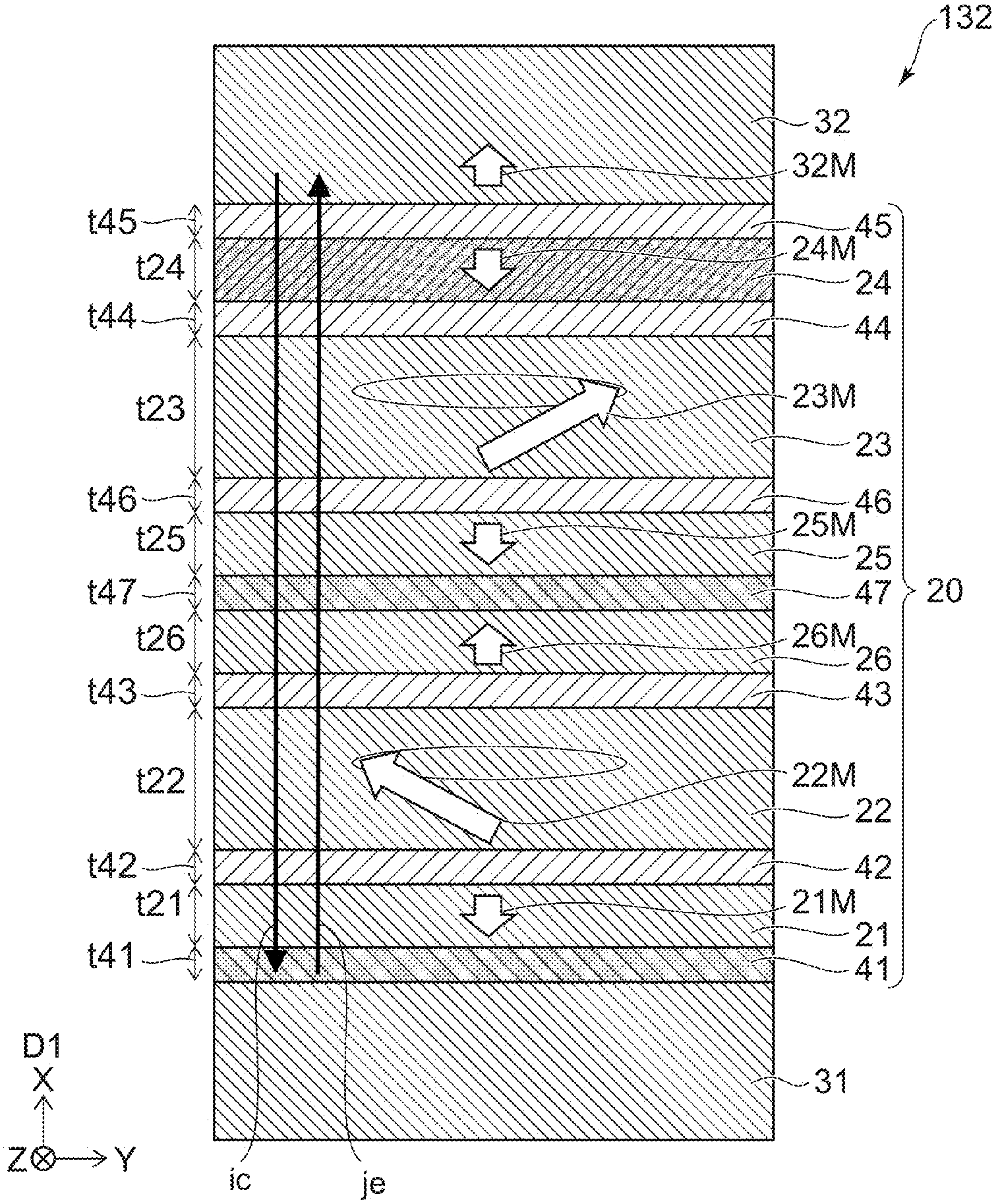
FIG. 34 is a schematic plan view illustrating a magnetic head according to the third embodiment.

FIG. 34 is a schematic plan view illustrating a magnetic head according to the third embodiment.

As shown in FIG. 34, in a magnetic head 132 according to the embodiment, the magnetic element 20 further includes a sixth magnetic layer 26 and a seventh non-magnetic layer 47. Other configurations of the magnetic head 132 may be the same as the configurations of the magnetic head 131. In the configuration of the magnetic head 132, high-intensity oscillation is also obtained.

In the magnetic head 132, the sixth magnetic layer 26 is provided between the third non-magnetic layer 43 and the fifth magnetic layer 25. The seventh non-magnetic layer 47 is provided between the sixth magnetic layer 26 and the fifth magnetic layer 25.

In the magnetic head 132, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Cu, Au, Cr, Al, V and Ag. The sixth non-magnetic layer 46 includes at least one selected from the group consisting of Cu, Au, Cr, Al, V and Ag. The seventh non-magnetic layer 47 includes at least one selected from the group consisting of Ru, Ir, Ta, Rh, Pd, Pt and W.

A thickness of the sixth magnetic layer 26 in the first direction D1 is defined as a sixth thickness t26. In the magnetic head 132, the second thickness t22 is thicker than the first thickness t21. The third thickness t23 is thicker than the first thickness t21. The fourth thickness t24 is thinner than the third thickness t23. The fifth thickness t25 is thinner than the third thickness t23. The sixth thickness t26 is thinner than the second thickness t22.

In the third embodiment, as shown in FIG. 24, a thickness of the first non-magnetic layer 41 in the first direction D1 is defined as a first non-magnetic layer thickness t41. A thickness of the second non-magnetic layer 42 in the first direction D1 is defined as a second non-magnetic layer thickness t42. A thickness of the third non-magnetic layer 43 in the first direction D1 is defined as a third non-magnetic layer thickness t43. A thickness of the fourth non-magnetic layer 44 in the first direction D1 is defined as a fourth non-magnetic layer thickness t44. A thickness of the fifth non-magnetic layer 45 in the first direction D1 is defined as a fifth nonmagnetic layer thickness t45. A thickness of the sixth non-magnetic layer 46 in the first direction D1 is defined as a sixth non-magnetic layer thickness t46. A thickness of the seventh non-magnetic layer 47 in the first direction D1 is defined as a seventh non-magnetic layer thickness t47.

In the third embodiment, the first non-magnetic layer thickness t41 may be, for example, not less than 1 nm and not more than 10 nm. The second non-magnetic layer thickness t42 may be, for example, not less than 0.5 nm and not more than 6 nm. The third non-magnetic layer thickness t43 may be, for example, not less than 0.5 nm and not more than 6 nm. The fourth non-magnetic layer thickness t44 may be, for example, not less than 0.5 nm and not more than 6 nm. The fifth non-magnetic layer thickness t45 may be, for example, not less than 0.5 nm and not more than 6 nm. The sixth non-magnetic layer thickness t46 may be, for example, not less than 0.5 nm and not more than 6 nm. The seventh non-magnetic layer thickness t47 may be, for example, not less than 1 nm and not more than 10 nm.

In the operation, the element current ic greater than or equal to the threshold value is supplied to the magnetic element 20. The element voltage Ve1 is applied to the magnetic element 20 in the operation. The element current ic and the element voltage Ve1 are supplied by the element circuit 20D. For example, one end of the magnetic element 20 is electrically connected to the first magnetic pole 31. The other end of the magnetic element 20 is electrically connected to the second magnetic pole 32. The element circuit 20D is configured to apply the element voltage Ve1 between the first magnetic pole 31 and the second magnetic pole 32. In the magnetic heads 130, 130*a*, 131, 131*a*, 131*b* and 132, the potential of the first magnetic pole 31 is lower than the potential of the second magnetic pole 32 when the element voltage Ve1 is applied.

FIGS. 35 to 40 are graphs illustrating characteristics of the magnetic heads according to the third embodiment.

These figures illustrate a differential electrical resistance of the magnetic element 20 when a voltage Vat applied to the magnetic element 20 is changed. The horizontal axis is the voltage Vat. The vertical axis is the differential electrical resistance Rd1. The voltage Va1 may be the voltage between the first terminal T1 and the second terminal T2. For example, a voltage corresponding to voltage Vat is applied to the magnetic element 20. FIGS. 35-40 correspond to magnetic heads 130, 130*a*, 131, 131*a*, 131*b* and 132.

Figure 35:
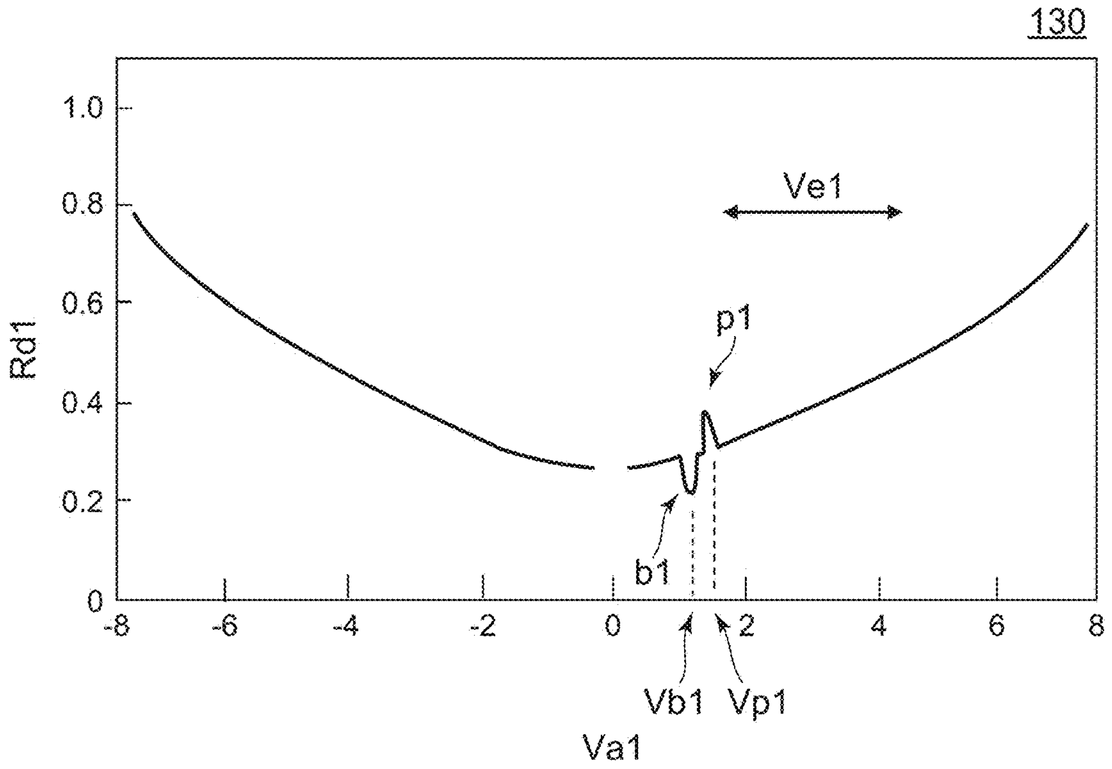
FIG. 35 is a graph illustrating characteristics of the magnetic head according to the third embodiment.

As shown in FIG. 35, in the magnetic head 130, the differential electrical resistance Rd1 includes a first positive bottom b1 and a first positive peak p1. The first positive bottom b1 is, for example, a negative peak. The voltage Va1 corresponding to the first positive bottom b1 is a first positive bottom voltage Vb1. The voltage Va1 corresponding to the first positive peak p1 is a first positive peak voltage Vp1. The first positive bottom voltage Vb1, the first positive peak voltage Vp1, and the element voltage Ve1 are positive. The potential of the first magnetic pole 31 is lower than the potential of the second magnetic pole 32 when the voltage Va1 being positive is applied. In this example, the first positive peak voltage Vp1 is higher than the first positive bottom voltage Vb1. The first positive peak voltage Vp1 may be lower than the first positive bottom voltage Vb1. The element voltage Ve1 is higher than the first positive peak voltage Vp1 and higher than the first positive bottom voltage Vb1.

Thus, the differential electrical resistance Rd1 includes at least one peak and at least one bottom. In this example, the at least one peak is the first positive peak p1. At least one bottom is the first positive bottom b1. It is considered that the peaks and bottoms correspond to discontinuous changes in electrical resistance accompanying reversal of magnetization of multiple magnetic layers included in the magnetic element 20.

The voltage Va1 corresponding to at least one peak is the peak voltage (in this example, the first positive peak voltage Vp1). The voltage Va1 corresponding to at least one bottom is the bottom voltage (in this example, the first positive bottom voltage Vb1). The element voltage Ve1 is higher than the peak voltage and higher than the bottom voltage. Thereby, stable and high-intensity oscillation can be obtained.

Figure 36:
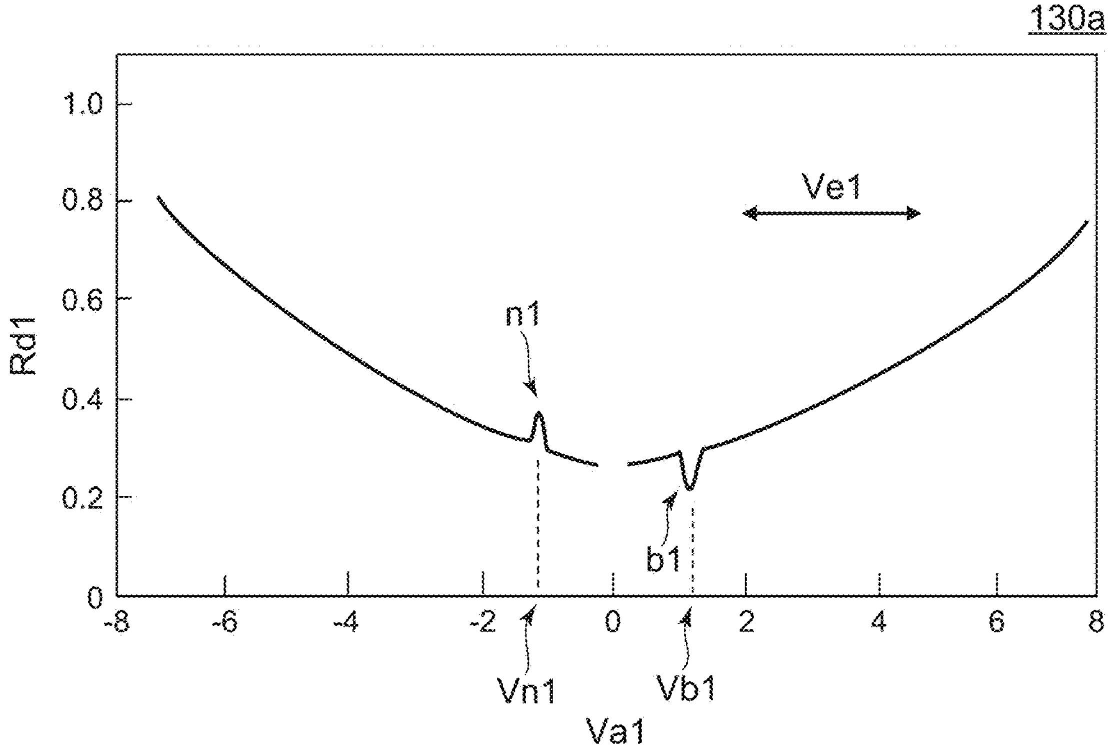
FIG. 36 is a graph illustrating characteristics of the magnetic head according to the third embodiment.

As shown in FIG. 36, in the magnetic head 130*a*, the differential electrical resistance Rd1 includes a first negative peak n1 and the first positive bottom b1. The voltage Va1 corresponding to the first negative peak n1 is a first negative peak voltage Vn1. The first negative peak voltage Vn1 is negative. The potential of the first magnetic pole 31 is higher than the potential of the second magnetic pole 32 when the negative voltage Va1 is applied. The element voltage Ve1 is higher than the peak voltage (first negative peak voltage Vn1) and higher than the bottom voltage (first positive bottom voltage Vb1). A stable and high-intensity oscillation can be obtained.

Figure 37:
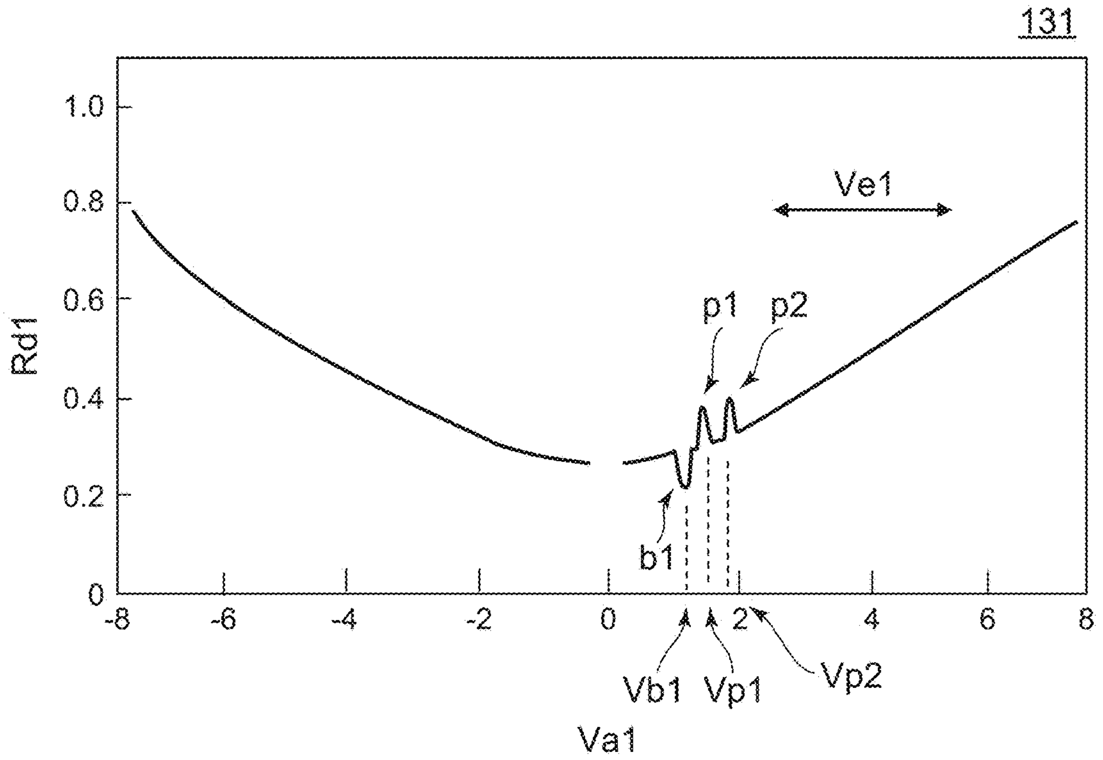
FIG. 37 is a graph illustrating characteristics of the magnetic head according to the third embodiment.
Figure 38:
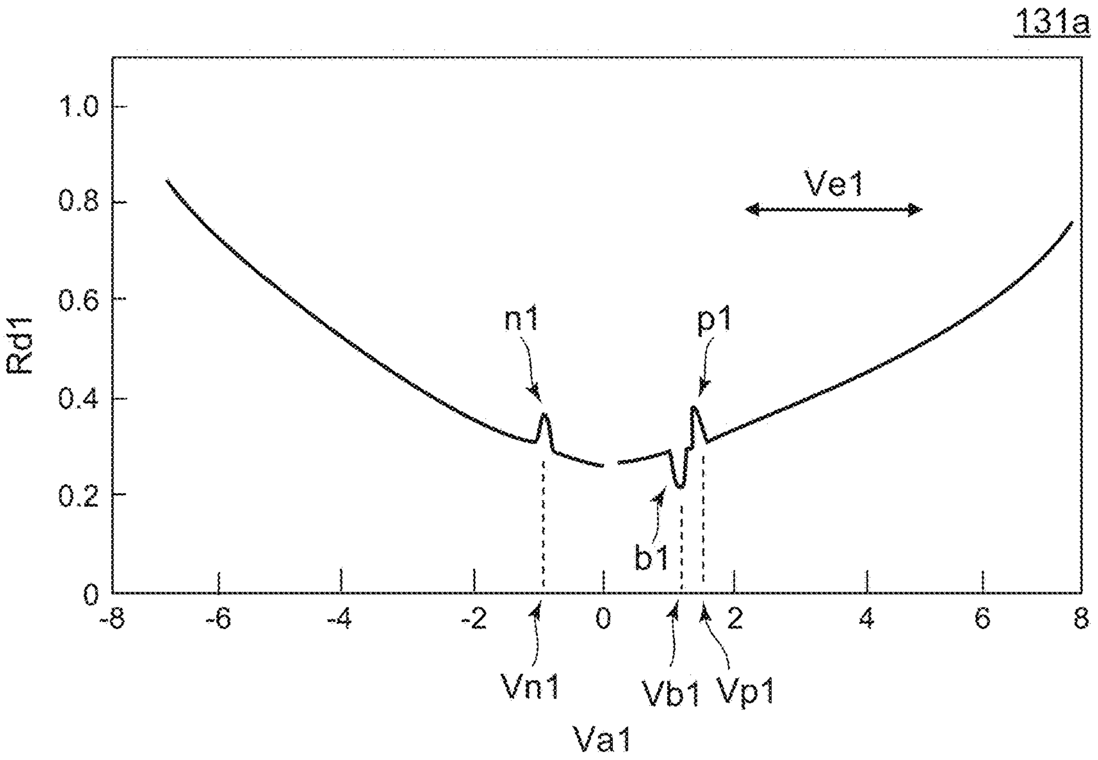
FIG. 38 is a graph illustrating characteristics of the magnetic head according to the third embodiment.

As shown in FIG. 37, in the magnetic head 131, the differential electrical resistance Rd1 includes the first positive bottom b1, the first positive peak p1 and a second positive peak p2. The voltage Va1 corresponding to the second positive peak p2 is a second positive peak voltage Vp2. The first positive bottom voltage Vb1, the first positive peak voltage Vp1 and the second positive peak voltage Vp2 are positive. The element voltage Ve1 is higher than the peak voltage (the first positive peak voltage Vp1 and the second positive peak voltage Vp2) and higher than the bottom voltage (the first positive bottom voltage Vb1). A stable and high-intensity oscillation can be obtained.

As shown in FIG. 28, in the magnetic head 131*a*, the differential electrical resistance Rd1 includes the first negative peak n1, the first positive bottom b1 and the first positive peak p1. The element voltage Ve1 is higher than the peak voltage (first negative peak voltage Vn1 and first positive peak voltage Vp1) and higher than the bottom voltage (first positive bottom voltage Vb1). A stable and high-intensity oscillation can be obtained.

Figure 39:
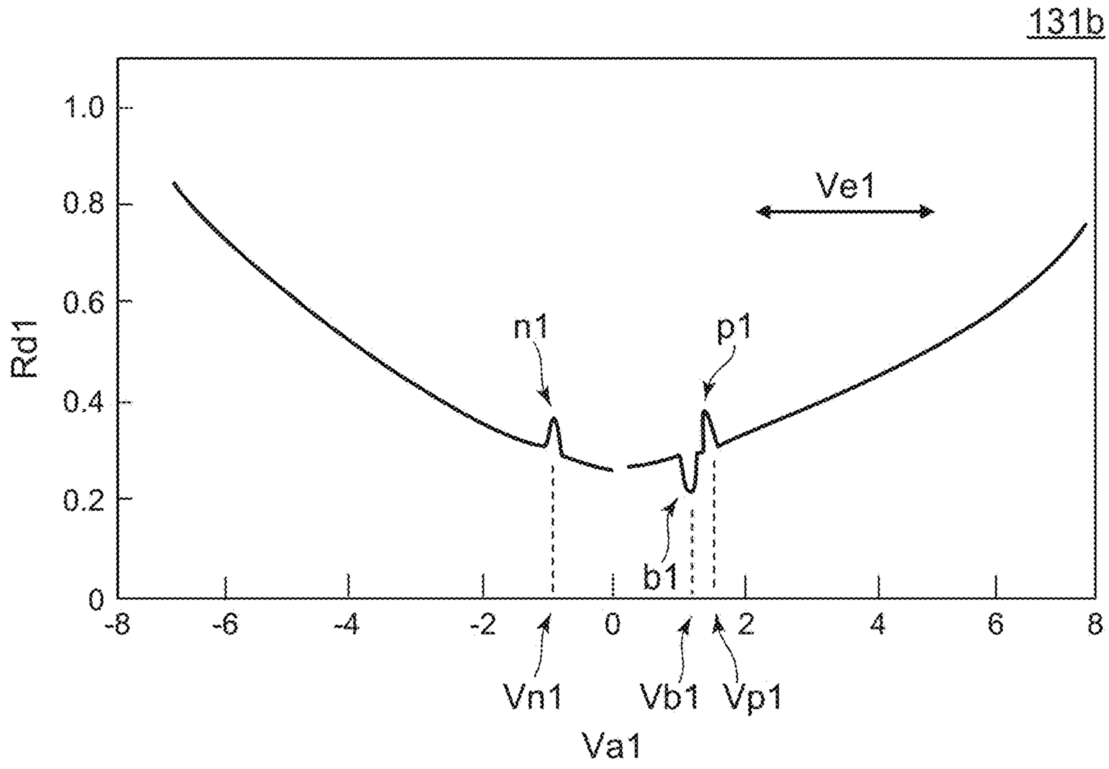
FIG. 39 is a graph illustrating characteristics of the magnetic head according to the third embodiment.

As shown in FIG. 39, in the magnetic head 131*b*, the differential electrical resistance Rd1 includes the first negative peak n1, the first positive bottom b1 and the first positive peak p1. The element voltage Ve1 is higher than the peak voltage (first negative peak voltage Vn1 and first positive peak voltage Vp1) and higher than the bottom voltage (first positive bottom voltage Vb1). A stable and high-intensity oscillation can be obtained.

Figure 40:
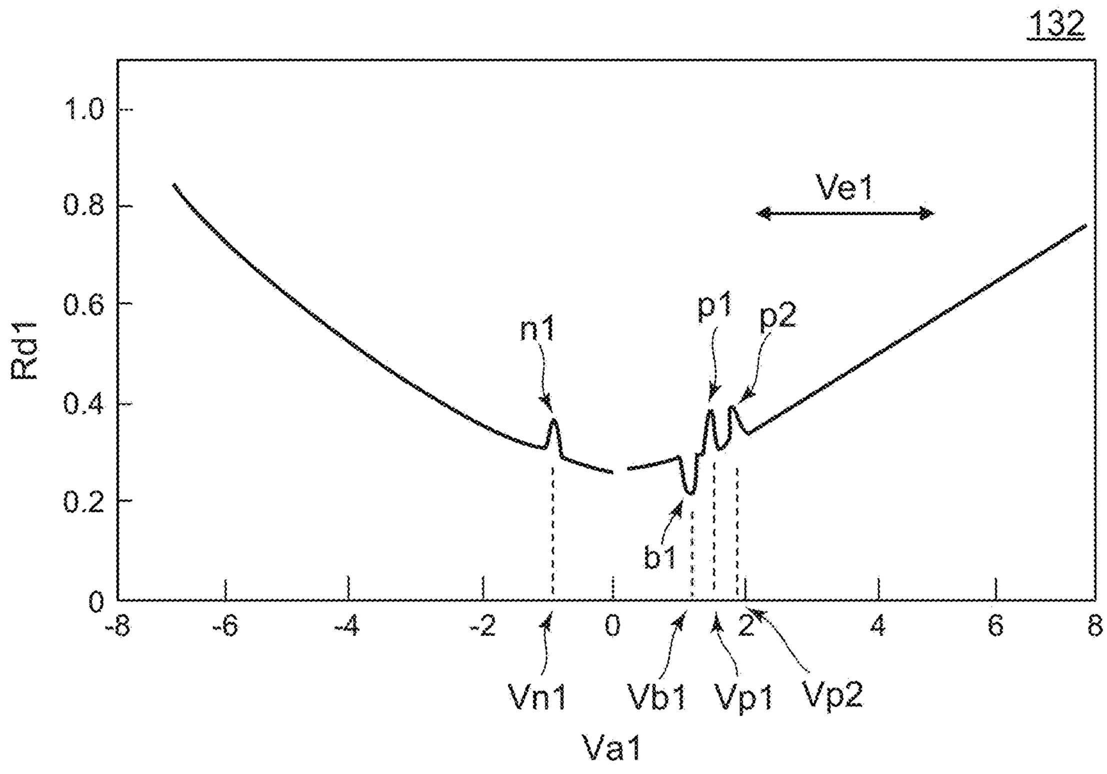
FIG. 40 is a graph illustrating characteristics of the magnetic head according to the third embodiment.

As shown in FIG. 40, in the magnetic head 132, the differential electrical resistance Rd1 includes the first negative peak n1, the first positive bottom b1, the first positive peak p1 and the second positive peak p2. The element voltage Ve1 is higher than the peak voltages (first negative peak voltage Vn1, first positive peak voltage Vp1, and second positive peak voltage Vp2) and higher than the bottom voltage (first positive bottom voltage Vb1). A stable and high-intensity oscillation can be obtained.

In the magnetic heads 130, 130*a*, 131, 131*a*, 131*b*, and 132, the absolute value of the element voltage Ve1 is 10 times or less the absolute value of the peak voltage, which is the reference for setting the element voltage Ve1. The absolute value of the element voltage Ve1 is 10 times or less the absolute value of the bottom voltage, which is the reference for setting the element voltage Ve1. The absolute value of the element voltage Ve1 may be 8 times or less of the absolute value of the peak voltage, which is the reference for setting the element voltage Ve1. The absolute value of the element voltage Ve1 may be eight times or less of the absolute value of the bottom voltage, which is the reference for setting the element voltage Ve1.

In third embodiments, the tail of one peak may overlap the adjacent peak. The tail of one peak may overlap one bottom. The tail of one bottom may overlap adjacent peaks. The tail of one bottom may overlap adjacent bottom.

In the magnetic heads 131, 131*a*, 131*b*, and 132, the absolute value of the peak voltage, which is the reference for setting the element voltage Ve1, may be 4 times or less than the absolute value of the other peak voltages. The absolute value of the above peak voltage, which is the reference for setting the element voltage Ve1, may be 3 times or less the absolute value of the other peak voltages.

The third embodiments may include the following configurations (for example, technical proposals).

Configuration C1

A magnetic head, comprising:

a first magnetic pole;

a second magnetic pole; and a magnetic element provided between the first magnetic pole and the second magnetic pole, the magnetic element including a first magnetic layer, a second magnetic layer provided between the first magnetic layer and the second magnetic pole, a third magnetic layer provided between the second magnetic layer and the second magnetic pole, a fourth magnetic layer provided between the third magnetic layer and the second magnetic pole, a first non-magnetic layer provided between the first magnetic pole and the first magnetic layer, a second non-magnetic layer provided between the first magnetic layer and the second magnetic layer, a third non-magnetic layer provided between the second magnetic layer and the third magnetic layer, a fourth non-magnetic layer provided between the third magnetic layer and the fourth magnetic layer, and a fifth non-magnetic layer provided between the fourth magnetic layer and the fifth magnetic layer, the fourth magnetic layer including a first element and at least one of Fe, Co or Ni, the first element including at least one selected from the group consisting of Cr, V, Mn, Ti, N and Sc, the fourth non-magnetic layer including at least one selected from the group consisting of Cu, Au, Cr, Al, V and Ag, and the fifth non-magnetic layer including at least one selected from the group consisting of Cu, Au, Cr, Al, V and Ag.

Configuration C2

The magnetic head according to Configuration C1, wherein the first magnetic layer, the second magnetic layer and the third magnetic layer include at least one of Fe, Co or Ni, and the first magnetic layer, the second magnetic layer, and the third magnetic layer do not include the first element, or a concentration of the first element in the first magnetic layer, the second magnetic layer, and the third magnetic layer is lower than a concentration of the first element in the fourth magnetic layer.

Configuration C3

The magnetic head according to Configuration C2, wherein the fourth non-magnetic layer contacts the fourth magnetic layer, and the fifth non-magnetic layer contacts the fourth magnetic layer and the second magnetic pole.

Configuration C4

The magnetic head according to Configuration C3, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, and the third non-magnetic layer includes at least one selected from the group consisting of Ru, Ir, Ta, Rh, Pd, Pt and W.

Configuration C5

The magnetic head according to Configuration C4, wherein a second thickness of the second magnetic layer in a first direction from the first magnetic pole to the second magnetic pole is thicker than a first thickness of the first magnetic layer in the first direction, a third thickness of the third magnetic layer in the first direction is thicker than the first thickness, and a fourth thickness of the fourth magnetic layer in the first direction is thinner than the third thickness.

Configuration C6

The magnetic head according to Configuration C4, wherein a first thickness of the first magnetic layer in a first direction from the first magnetic pole to the second magnetic pole is thicker than a second thickness of the second magnetic layer in the first direction, a third thickness of the third magnetic layer in the first direction is thicker than the second thickness, and a fourth thickness of the fourth magnetic layer in the first direction is thinner than the third thickness.

Configuration C7

The magnetic head according to Configuration C3, wherein the magnetic element further includes a fifth magnetic layer and a sixth non-magnetic layer, the fifth magnetic layer is provided between the third non-magnetic layer and the third magnetic layer, and the sixth non-magnetic layer is provided between the fifth magnetic layer and the third magnetic layer.

Configuration C8

The magnetic head according to Configuration C7, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Cu, Au, Cr, Al, V and Ag, the sixth non-magnetic layer includes at least one selected from the group consisting of Ru, Ir, Ta, Rh, Pd, Pt and W, a second thickness of the second magnetic layer in a first direction from the first magnetic pole to the second magnetic pole is thicker than a first thickness of the first magnetic layer in the first direction, a third thickness of the third magnetic layer in the first direction is thicker than the first thickness, a fourth thickness of the fourth magnetic layer in the first direction is thinner than the third thickness, and a fifth thickness of the fifth magnetic layer in the first direction is thinner than the third thickness.

Configuration C9

The magnetic head according to Configuration C7, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the sixth non-magnetic layer includes at least one selected from the group consisting of Cu, Au, Cr, Al, V and Ag, a first thickness of the first magnetic layer in a first direction from the first magnetic pole to the second magnetic pole is thicker than a second thickness of the second magnetic layer in the first direction, a third thickness of the third magnetic layer in the first direction is thicker than the second thickness, a fourth thickness of the fourth magnetic layer in the first direction is thinner than the third thickness, and a fifth thickness of the fifth magnetic layer in the first direction is thinner than the third thickness.

Configuration C10

The magnetic head according to Configuration C7, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the sixth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a third thickness of the third magnetic layer in the first direction is thicker than the first thickness, a fourth thickness of the fourth magnetic layer in the first direction is thinner than the third thickness, and the fifth thickness of the fifth magnetic layer in the first direction is thinner than the third thickness.

Configuration C11

The magnetic head according to Configuration C7, wherein the magnetic element further includes a sixth magnetic layer and a seventh non-magnetic layer, the sixth magnetic layer is provided between the third non-magnetic layer and the fifth magnetic layer, and the seventh non-magnetic layer is provided between the sixth magnetic layer and the fifth magnetic layer.

Configuration C12

The magnetic head according to Configuration C11, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Cu, Au, Cr, Al, V and Ag, the sixth non-magnetic layer includes at least one selected from the group consisting of Cu, Au, Cr, Al, V and Ag, the seventh non-magnetic layer includes at least one selected from the group consisting of Ru, Ir, Ta, Rh, Pd, Pt and W, a second thickness of the second magnetic layer in a first direction from the first magnetic pole to the second magnetic pole is thicker than a first thickness of the first magnetic layer in the first direction, a third thickness of the third magnetic layer in the first direction is thicker than the first thickness, a fourth thickness of the fourth magnetic layer in the first direction is thinner than the third thickness, a fifth thickness of the fifth magnetic layer in the first direction is thinner than the third thickness, and a sixth thickness of the sixth magnetic layer in the first direction is thinner than the second thickness.

Configuration C13

The magnetic head according to any one of Configurations C1-C12, wherein one end of the magnetic element is electrically connected to the first magnetic pole, another end of the magnetic element is electrically connected to the second magnetic pole, and a differential electrical resistance of the magnetic element when changing a voltage between the first magnetic pole and the second magnetic pole includes at least one peak and at least one bottom.

Configuration C14

A magnetic recording device, comprising:

the magnetic head according to any one of Configurations C1-C12; and a controller including an element circuit, one end of the magnetic element being electrically connected to the first magnetic pole, another end of the magnetic element being electrically connected to the second magnetic pole, the element circuit being configured to apply an element voltage between the first magnetic pole and the second magnetic pole, when the element voltage being applied, a potential of the first magnetic pole being lower than a potential of the second magnetic pole.

Configuration C15

The magnetic recording device according to Configuration C14, wherein a differential electrical resistance of the magnetic element when a voltage between the first magnetic pole and the second magnetic pole is changed includes at least one peak and at least one bottom, the voltage corresponding to the at least one peak is a peak voltage, the voltage corresponding to the at least one bottom is a bottom voltage, and the element voltage is higher than the peak voltage and higher than the bottom voltage.

Fourth Embodiment

Figure 41:
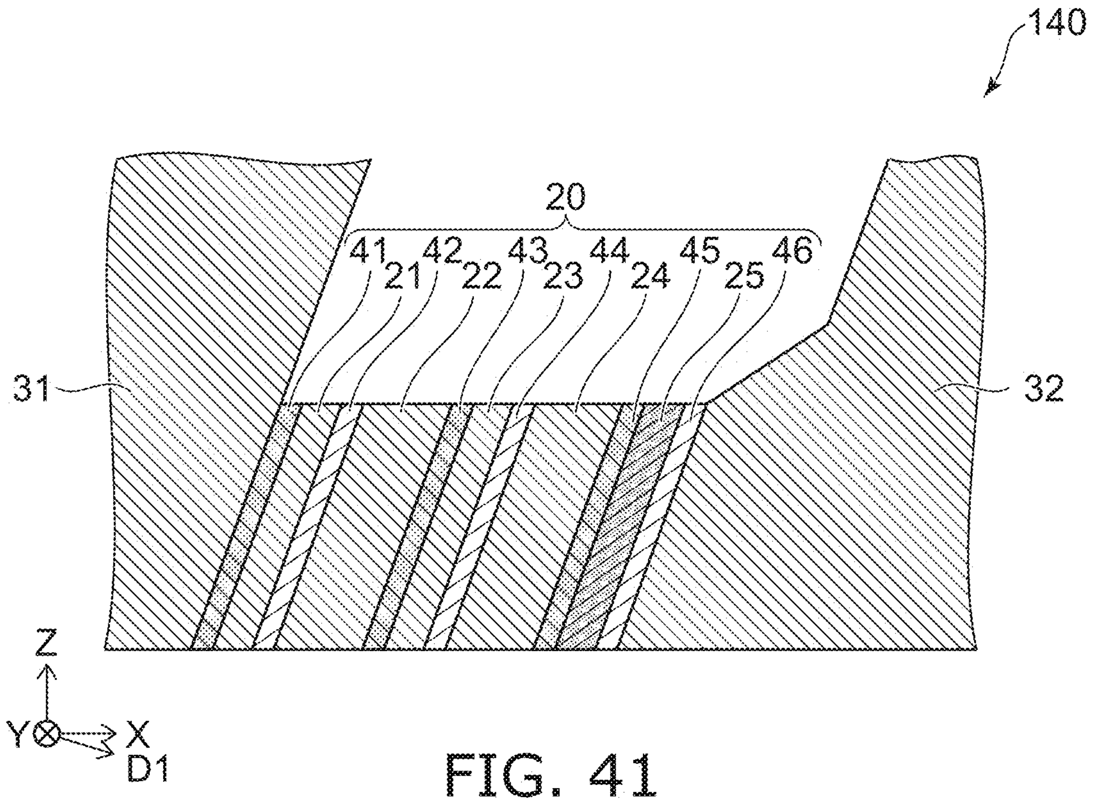
FIG. 41 is a schematic cross-sectional view illustrating a magnetic head according to a fourth embodiment.

FIG. 41 is a schematic cross-sectional view illustrating a magnetic head according to a fourth embodiment.

Figure 42:
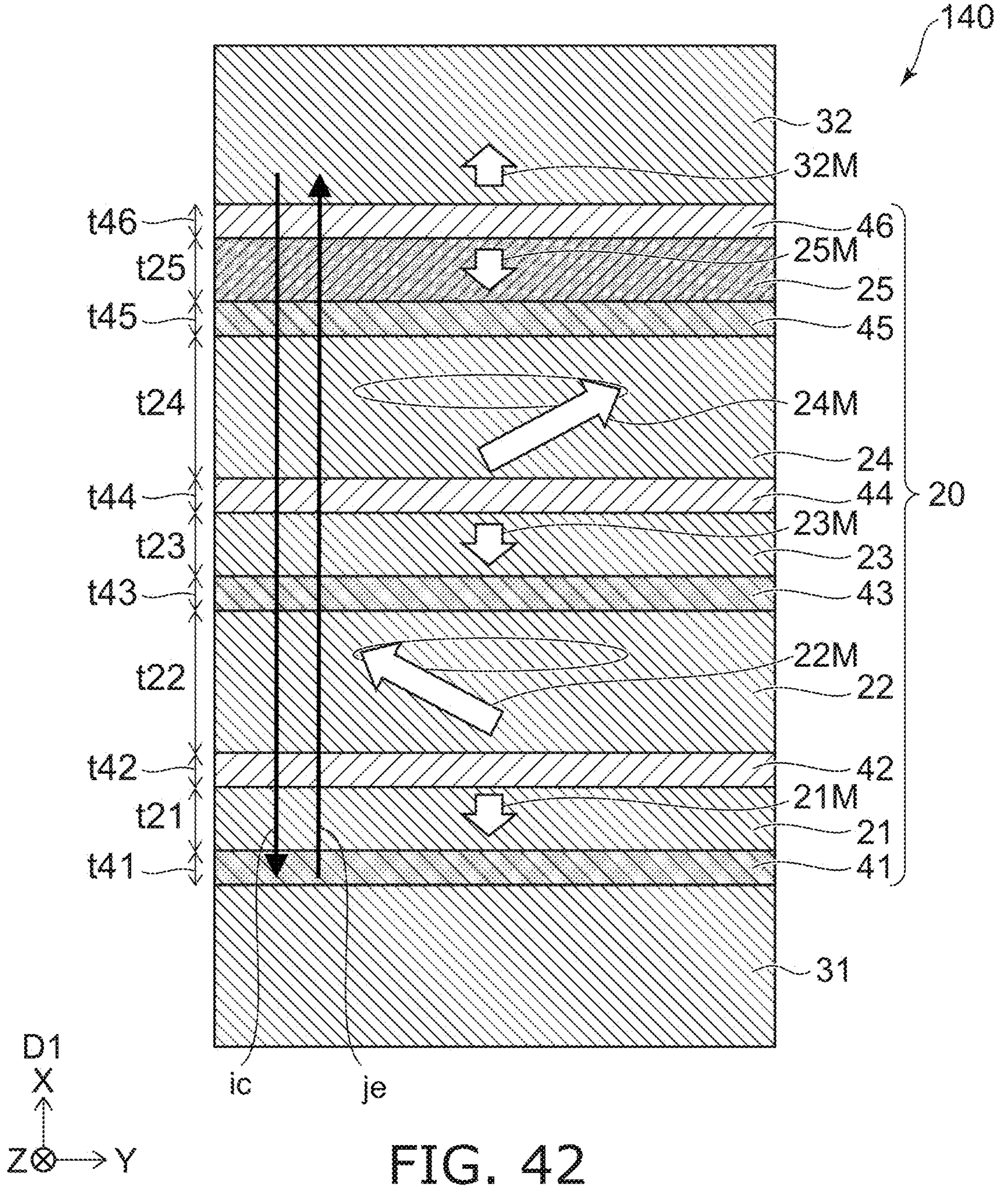
FIG. 42 is a schematic plan view illustrating the magnetic head according to the fourth embodiment.

FIG. 42 is a schematic plan view illustrating the magnetic head according to the fourth embodiment.

Figure 43:
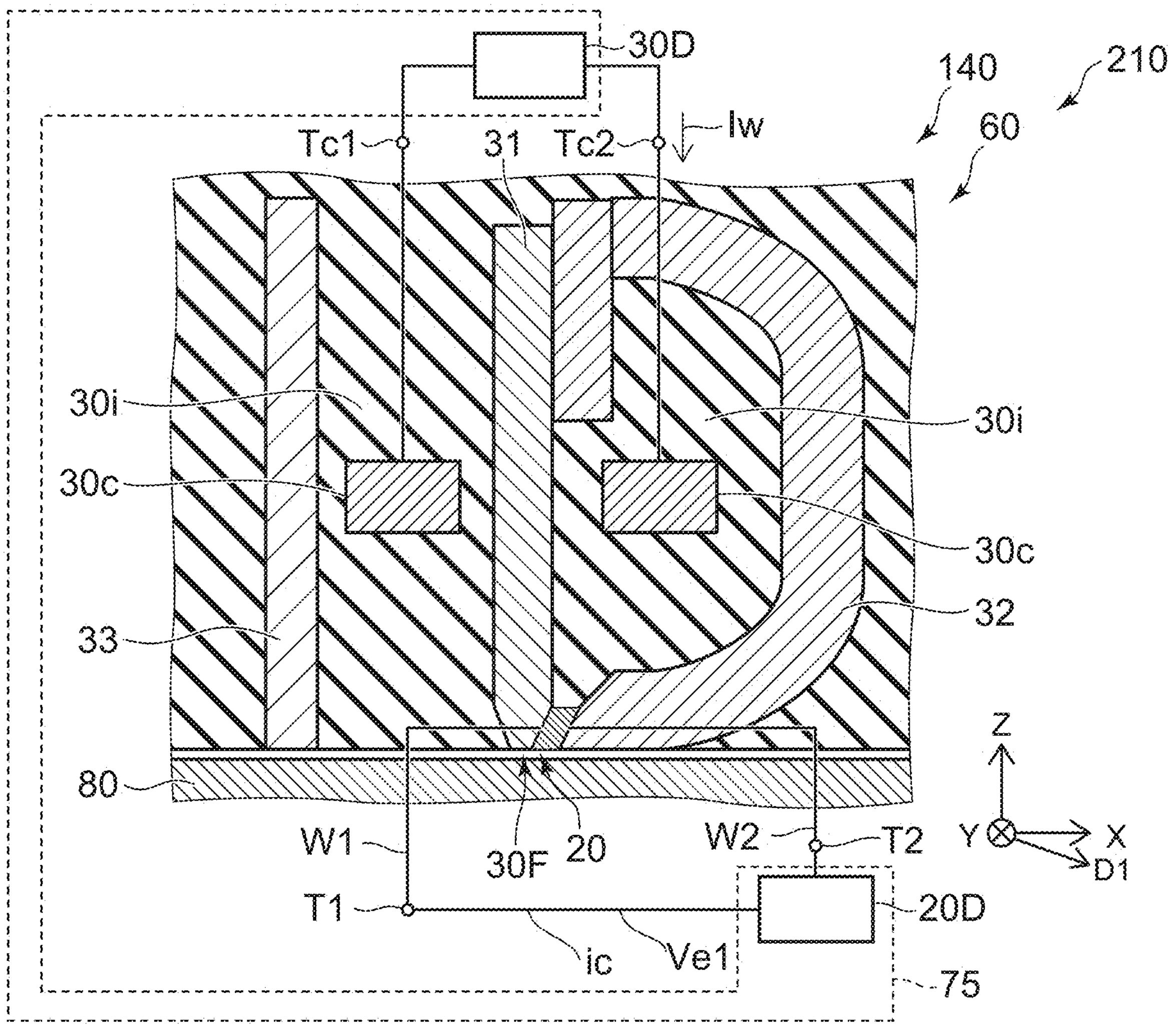
FIG. 43 is a schematic cross-sectional view illustrating the magnetic recording device including the magnetic head according to the fourth embodiment.

FIG. 43 is a schematic cross-sectional view illustrating the magnetic recording device including the magnetic head according to the fourth embodiment.

As shown in FIG. 43, the magnetic recording device 210 according to the embodiment includes a magnetic head 140 according to the fourth embodiment and a controller 75.

The magnetic head 140 includes the first magnetic pole 31, the second magnetic pole 32 and the magnetic element 20. The magnetic head 140 may include the coil 30*c*. The magnetic element 20 is provided between the first magnetic pole 31 and the second magnetic pole 32.

The configuration described for the magnetic head 110 may be appropriately applied to the magnetic head 140. In the magnetic head 140, for example, the magnetic element 20 generates the alternating magnetic field (for example, a high frequency magnetic field). For example, MAMR can be performed.

FIG. 42 corresponds to a plan view of the medium facing surface 30F viewed from the magnetic recording medium 80.

As shown in FIGS. 41 and 42, in the magnetic head 140, the magnetic element 20 includes a first magnetic layer 21, a second magnetic layer 22, a third magnetic layer 23, a fourth magnetic layer 24, a fifth magnetic layer 25, a first non-magnetic layer 41, a second non-magnetic layer 42, a third non-magnetic layer 43, a fourth non-magnetic layer 44, a fifth non-magnetic layer 45 and a sixth non-magnetic layer 46.

The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the fifth magnetic layer 25. The fifth magnetic layer 25 is provided between the fourth magnetic layer 24 and the second magnetic pole 32.

The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the fourth magnetic layer 24. The fifth non-magnetic layer 45 is provided between the fourth magnetic layer 24 and the fifth magnetic layer 25. The sixth non-magnetic layer 46 is provided between the fifth magnetic layer 25 and the second magnetic pole 32.

In the fourth embodiment, the fifth magnetic layer 25 includes at least one of Fe, Co or Ni and a first element including at least one selected from the group consisting of Cr, V, Mn, Ti, N and Sc. The fifth non-magnetic layer 45 includes at least one selected from the group consisting of Ru, Ir, Ta, Rh, Pd, Pt and W. The sixth non-magnetic layer 46 includes at least one selected from the group consisting of Cu, Au, Cr, Al, V and Ag.

The fifth magnetic layer 25 has, for example, negative polarization. On the other hand, the first magnetic layer 21, the second magnetic layer 22, the third magnetic layer 23 and the fourth magnetic layer 24 include at least one of Fe, Co or Ni. The first magnetic layer 21, the second magnetic layer 22, the third magnetic layer 23, and the fourth magnetic layer 24 do not include the first element. Alternatively, a concentration of the first element in the first magnetic layer 21, the second magnetic layer 22, the third magnetic layer 23 and the fourth magnetic layer 24 is lower than a concentration of the first element in the fifth magnetic layer 25. For example, the first magnetic layer 21, the second magnetic layer 22, the third magnetic layer 23, and the fourth magnetic layer 24 have positive polarization.

As described above, in the fourth embodiment, the fifth non-magnetic layer 45 includes at least one selected from the group consisting of Ru, Ir, Ta, Rh, Pd, Pt and W. Thereby, for example, spin transfer torque from the fourth magnetic layer 24 is suppressed from acting on the fifth magnetic layer 25. Thereby, the magnetization 25M of the fifth magnetic layer 25 is stabilized. By stabilizing the magnetization 25M of the fifth magnetic layer 25, the magnetization 24M of the fourth magnetic layer 24 efficiently oscillates. A strong oscillation is obtained. Thereby, it becomes possible to provide a magnetic head capable of improving the recording density.

The magnetization of the magnetic pole (e.g., the second magnetic pole 32) is not always stable and may oscillate. Even when the magnetization of the second magnetic pole 32 is unstable, it is preferable that stable oscillation is obtained in the magnetic element 20. In the magnetic head 140 according to the embodiment, the combination of the fifth non-magnetic layer 45 and the fifth magnetic layer 25 is applied in the magnetic element 20. Thereby, the magnetization 25M of the fifth magnetic layer 25 is stabilized even when the magnetization of the second magnetic pole 32 is unstable. Efficient oscillation is obtained in the fourth magnetic layer 24 due to the fifth magnetic layer 25 being stable. Examples of simulation results of the characteristics of the magnetic element will be described below.

Figure 44:
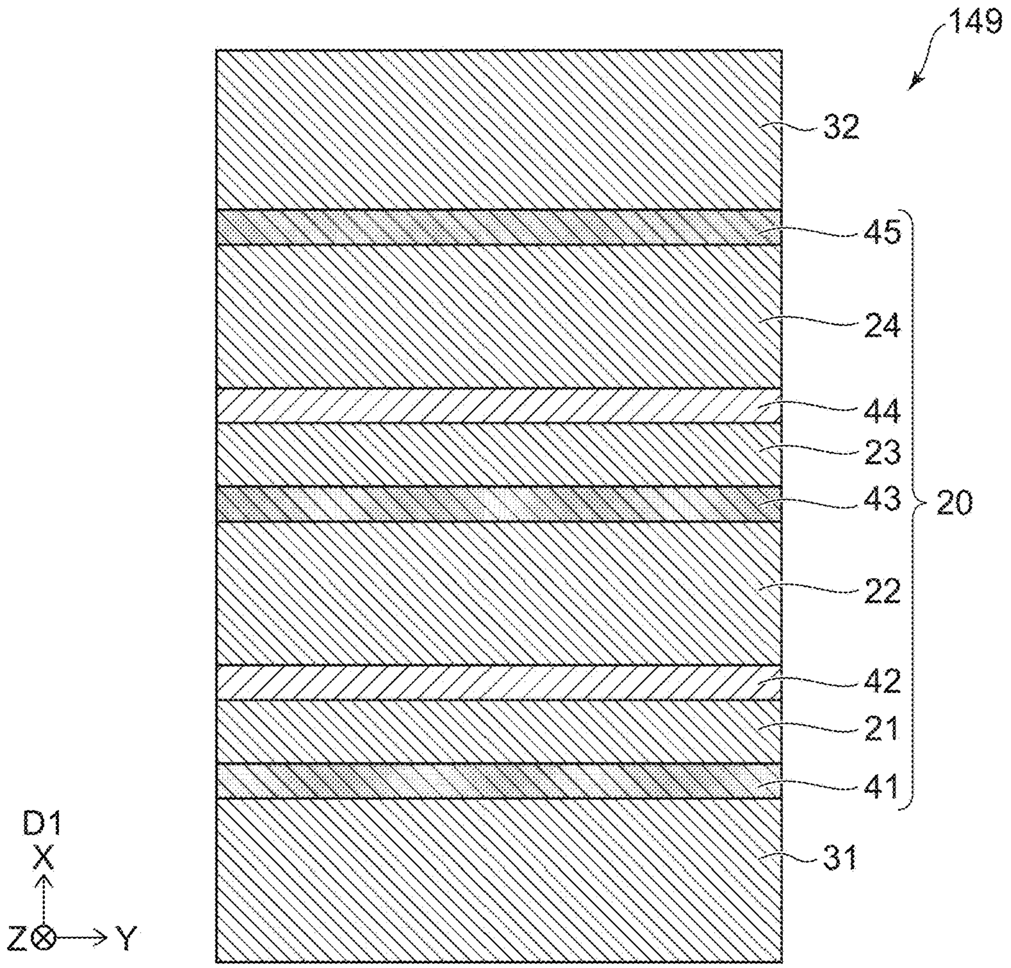
FIG. 44 is a schematic plan view illustrating a magnetic head of a reference example.

FIG. 44 is a schematic plan view illustrating a magnetic head of a reference example.

FIG. 44 shows a magnetic head 149 of a reference example. In the magnetic head 149, the fifth magnetic layer 25 and the sixth non-magnetic layer 46 are not provided.

Figure 45:
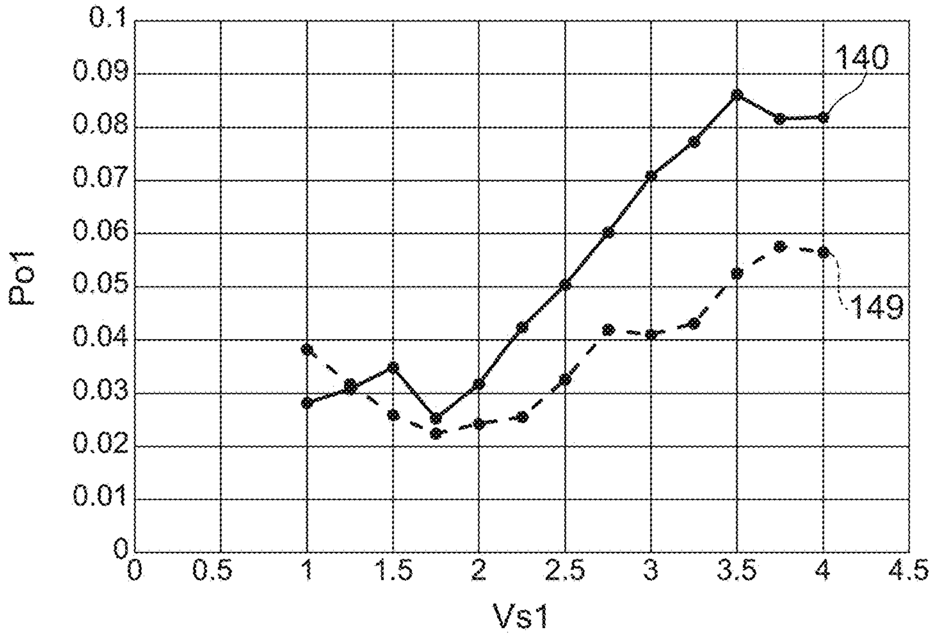
FIG. 45 is a graph illustrating characteristics of the magnetic heads.

FIG. 45 is a graph illustrating characteristics of the magnetic heads.

FIG. 45 illustrates simulation results of the characteristics of the magnetic heads 140 and 149. In the simulation model, the magnetization of the second magnetic pole 32 is movable. The horizontal axis of FIG. 45 is the applied voltage Vs1 being normalized. The applied voltage Vs1 is applied between one end of the magnetic element 20 and the other end. The vertical axis is an oscillation parameter Pol. The higher the oscillation parameter Pol, the higher the intensity of stable oscillation.

As shown in FIG. 45, in the region where the applied voltage Vs1 is high, the oscillation parameter Pol of the magnetic head 140 is higher than the oscillation parameter Pol of the magnetic head 149 of the reference example. Similar tendencies are obtained when the thicknesses of the magnetic layers is changed in the configuration of the magnetic head 149. In the configuration of the magnetic head 140, high intensity oscillation is obtained. According to the embodiments, it is possible to provide a magnetic head capable of improving the recording density.

In the magnetic head 140, the fifth non-magnetic layer 45 contacts the fifth magnetic layer 25. The sixth non-magnetic layer 46 contacts the fifth magnetic layer 25 and the second magnetic pole 32.

In the magnetic head 140, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag.

As shown in FIG. 42, a thickness of the first magnetic layer 21 in the first direction D1 is defined as a first thickness t21. The first direction D1 is a direction from the first magnetic pole 31 to the second magnetic pole 32. A thickness of the second magnetic layer 22 in the first direction D1 is defined as a second thickness t22. A thickness of the third magnetic layer 23 in the first direction D1 is defined as a third thickness t23. A thickness of the fourth magnetic layer 24 in the first direction D1 is defined as a fourth thickness t24. A thickness of the fifth magnetic layer 25 in the first direction D1 is defined as a fifth thickness t25.

In the magnetic head 140, the second thickness t22 is thicker than the first thickness t21. The third thickness t23 is thicker than the first thickness t21. The fourth thickness t24 is thicker than the third thickness t23. The fifth thickness t25 is thinner than the fourth thickness t24.

In the magnetic head 140, for example, the second magnetic layer 22 and the fourth magnetic layer 24 function as oscillation layers. The first magnetic layer 21, the third magnetic layer 23, and the fifth magnetic layer 25 function, for example, as spin injection layers. The magnetization 22M of the second magnetic layer 22 oscillates. The magnetization 24M of the fourth magnetic layer 24 oscillates.

For example, an orientation of the component of the magnetization 25M of the fifth magnetic layer 25 along the first direction D1 is opposite to an orientation of the component of the magnetization 32M of the second magnetic pole 32 along the first direction D1. An orientation of the component of the magnetization 23M of the third magnetic layer 23 along the first direction D1 is the same as the orientation of the component of the magnetization 25M along the first direction D1. An orientation of the component of the magnetization 21M of the first magnetic layer 21 along the first direction D1 is the same as the orientation of the component of the magnetization 25M along the first direction D1.

As shown in FIG. 42, when the magnetic head 140 is in operation, an element current ic equal to or higher than the threshold value is supplied to the magnetic element 20. The element current ic flows in the direction from the second magnetic pole 32 to the first magnetic pole 31, for example. An electron flow je corresponding to the device current ic flows in the direction from the first magnetic pole 31 to the second magnetic pole 32. The element current ic flows in the direction from the sixth non-magnetic layer 46 to the first non-magnetic layer 41. An element voltage Ve1 is applied to the magnetic element 20 in the operation. The potential of the first magnetic pole 31 is lower than the potential of the second magnetic pole 32 when the element voltage Ve1 is applied.

Figure 46:
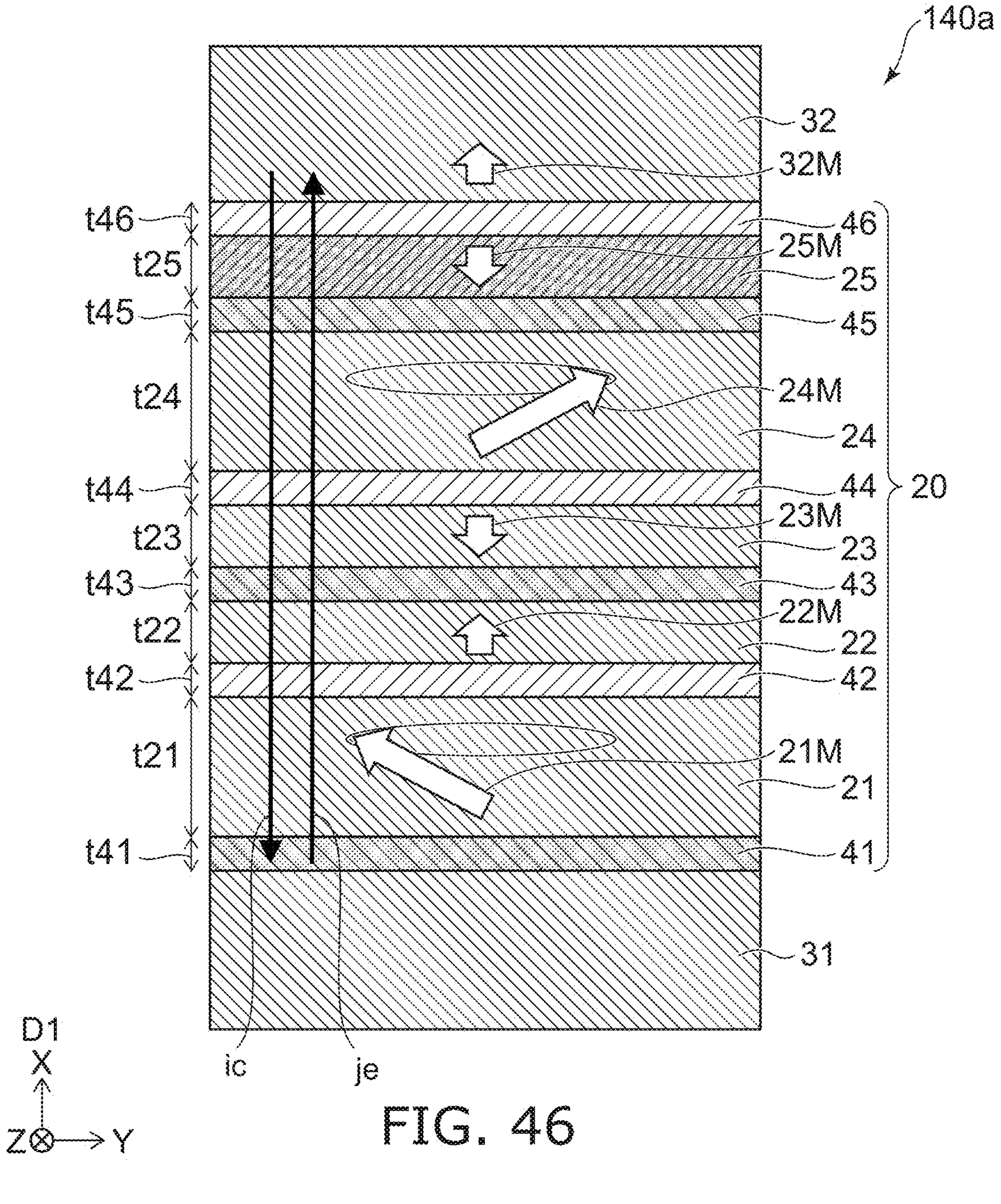
FIG. 46 is a schematic plan view illustrating a magnetic head according to the fourth embodiment.

FIG. 46 is a schematic plan view illustrating a magnetic head according to the fourth embodiment.

As shown in FIG. 46, in a magnetic head 140*a* according to the embodiment, the relationship between the first thickness t21 and the second thickness t22 is different from the relation in the magnetic head 140. Other configurations of the magnetic head 140*a* are the same as the configurations of the magnetic head 140.

In the magnetic head 140*a*, the second thickness t22 is thinner than the first thickness t21. The third thickness t23 is thinner than the first thickness t21. The fourth thickness t24 is thicker than the third thickness t23. The fifth thickness t25 is thinner than the fourth thickness t24.

In the magnetic head 140*a*, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. High-intensity oscillation is also obtained in the magnetic head 140*a*.

Figure 47:
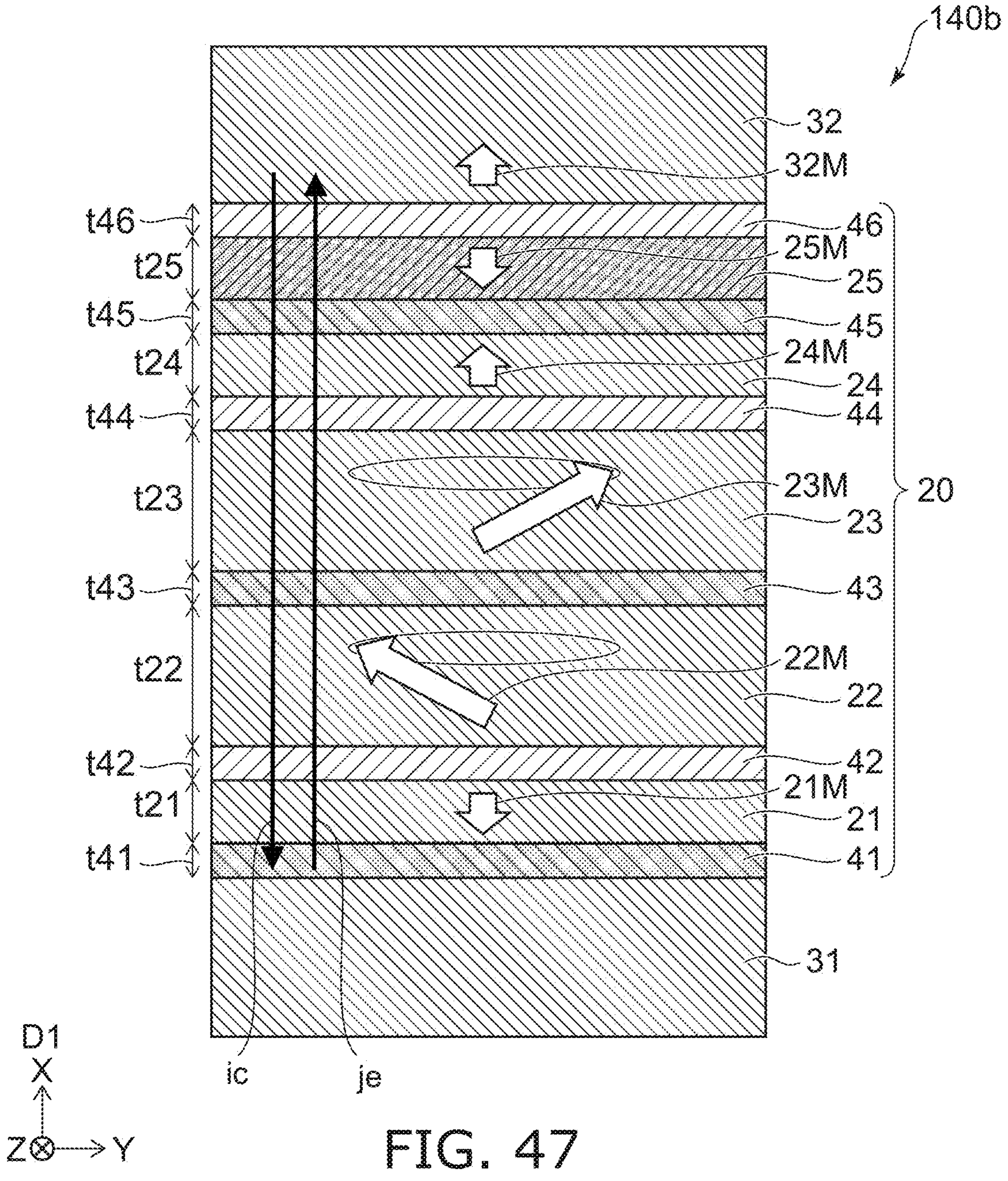
FIG. 47 is a schematic plan view illustrating a magnetic head according to the fourth embodiment.

FIG. 47 is a schematic plan view illustrating a magnetic head according to the fourth embodiment.

As shown in FIG. 47, in a magnetic head 140*b* according to the embodiment, the configurations of the third magnetic layer 23 and the fourth magnetic layer 24 are different from the configurations of the magnetic head 140. Other configurations of the magnetic head 140*b* may be the same as the configuration of the magnetic head 140.

In the magnetic head 140*b*, the second thickness t22 is thicker than the first thickness t21. The third thickness t23 is thicker than the first thickness t21. The fourth thickness t24 is thinner than the third thickness t23. The fifth thickness t25 is thinner than the third thickness t23.

In the magnetic head 140*b*, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. A high-intensity oscillation is also obtained in the magnetic head 140*b*.

Figure 48:
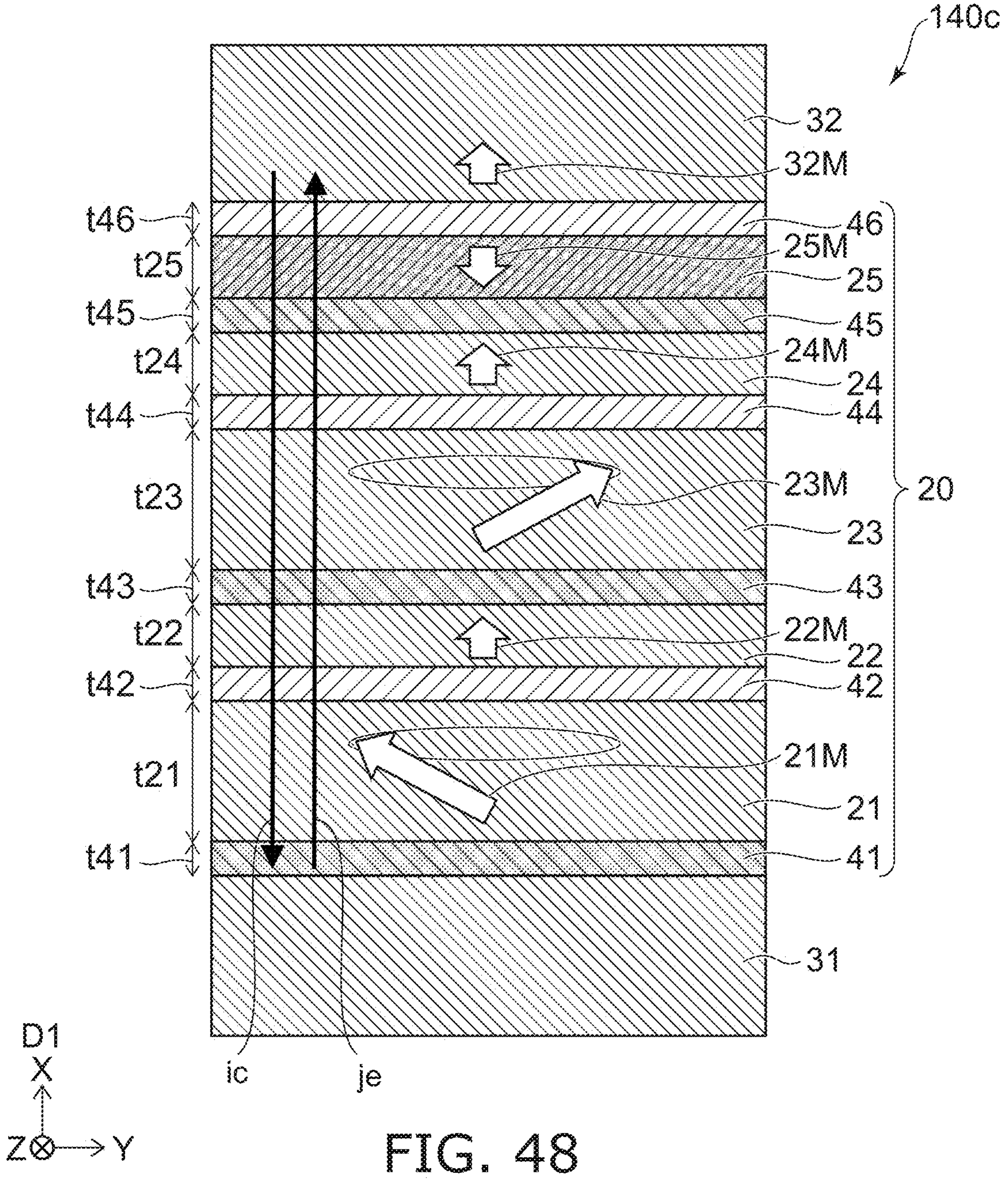
FIG. 48 is a schematic plan view illustrating a magnetic head according to the fourth embodiment.

FIG. 48 is a schematic plan view illustrating a magnetic head according to the fourth embodiment.

As shown in FIG. 48, in the magnetic head 140*c* according to the embodiment, the configurations of the first magnetic layer 21, the second magnetic layer 22, the third magnetic layer 23, and the fourth magnetic layer 24 are different from the configurations of the magnetic head 140. Other configurations of the magnetic head 140*a* may be the same as the configurations of the magnetic head 140.

In the magnetic head 140*c*, the second thickness t22 is thinner than the first thickness t21. The third thickness t23 is thicker than the second thickness t22. The fourth thickness t24 is thinner than the third thickness t23. The fifth thickness t25 is thinner than the third thickness t23.

In the magnetic head 140*c*, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. A high-intensity oscillation is also obtained in the magnetic head 140*b*.

In the magnetic heads 140, 140*a*, 140*b* and 140*c*, the first non-magnetic layer 41 contacts the first magnetic pole 31 and the first magnetic layer 21. The second non-magnetic layer 42 contacts the first magnetic layer 21 and the second magnetic layer 22. The third non-magnetic layer 43 is contacts the second magnetic layer 22 and the third magnetic layer 23. The fourth non-magnetic layer 44 contacts with the third magnetic layer 23 and the fourth magnetic layer 24. The fifth non-magnetic layer 45 contacts the fourth magnetic layer 24 and the fifth magnetic layer 25. The sixth non-magnetic layer 46 contacts the fifth magnetic layer 25 and the second magnetic pole 32.

Figure 49:
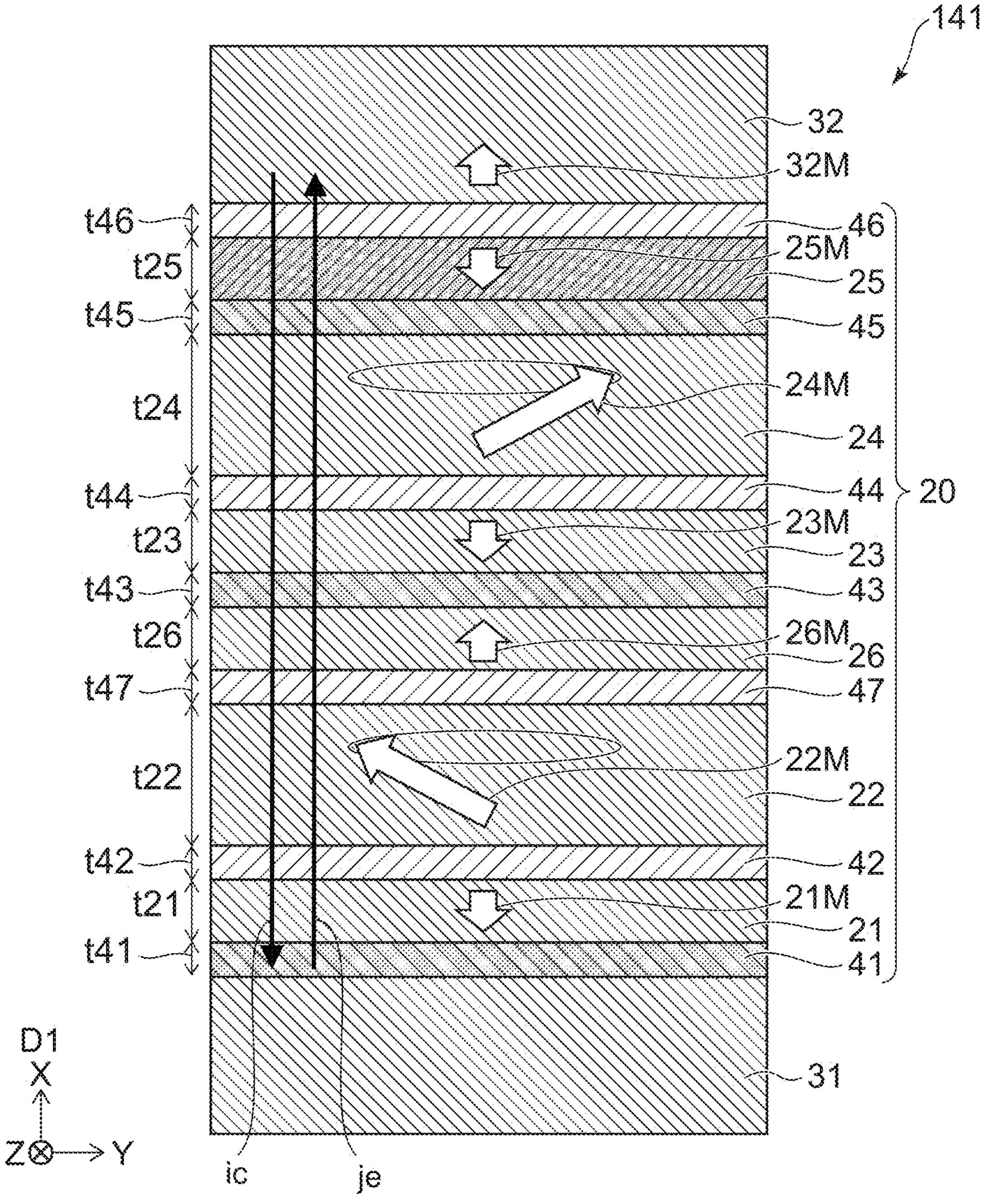
FIG. 49 is a schematic plan view illustrating a magnetic head according to the fourth embodiment.

FIG. 49 is a schematic plan view illustrating a magnetic head according to the fourth embodiment.

As shown in FIG. 49, in a magnetic head 141 according to the embodiment, the magnetic element 20 further includes a sixth magnetic layer 26 and a seventh non-magnetic layer 47. Other configurations of the magnetic head 141 may be the same as the configurations of the magnetic head 140.

In the magnetic head 141, the sixth magnetic layer 26 is provided between the second magnetic layer 22 and the third magnetic layer 23. The seventh non-magnetic layer 47 is provided between the second magnetic layer 22 and the sixth magnetic layer 26. A thickness of the sixth magnetic layer 26 in the first direction D1 is defined as a sixth thickness t26.

In the magnetic head 141, the second thickness t22 is thicker than the first thickness t21. The sixth thickness t26 is thinner than the second thickness t22. The third thickness t23 is thinner than the second thickness t22. The fourth thickness t24 is thicker than the third thickness t23. The fifth thickness t25 is thinner than the fourth thickness t24.

In the magnetic head 141, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The seventh non-magnetic layer 47 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. A high-intensity oscillation is also obtained in the magnetic head 140*b*.

Figure 50:
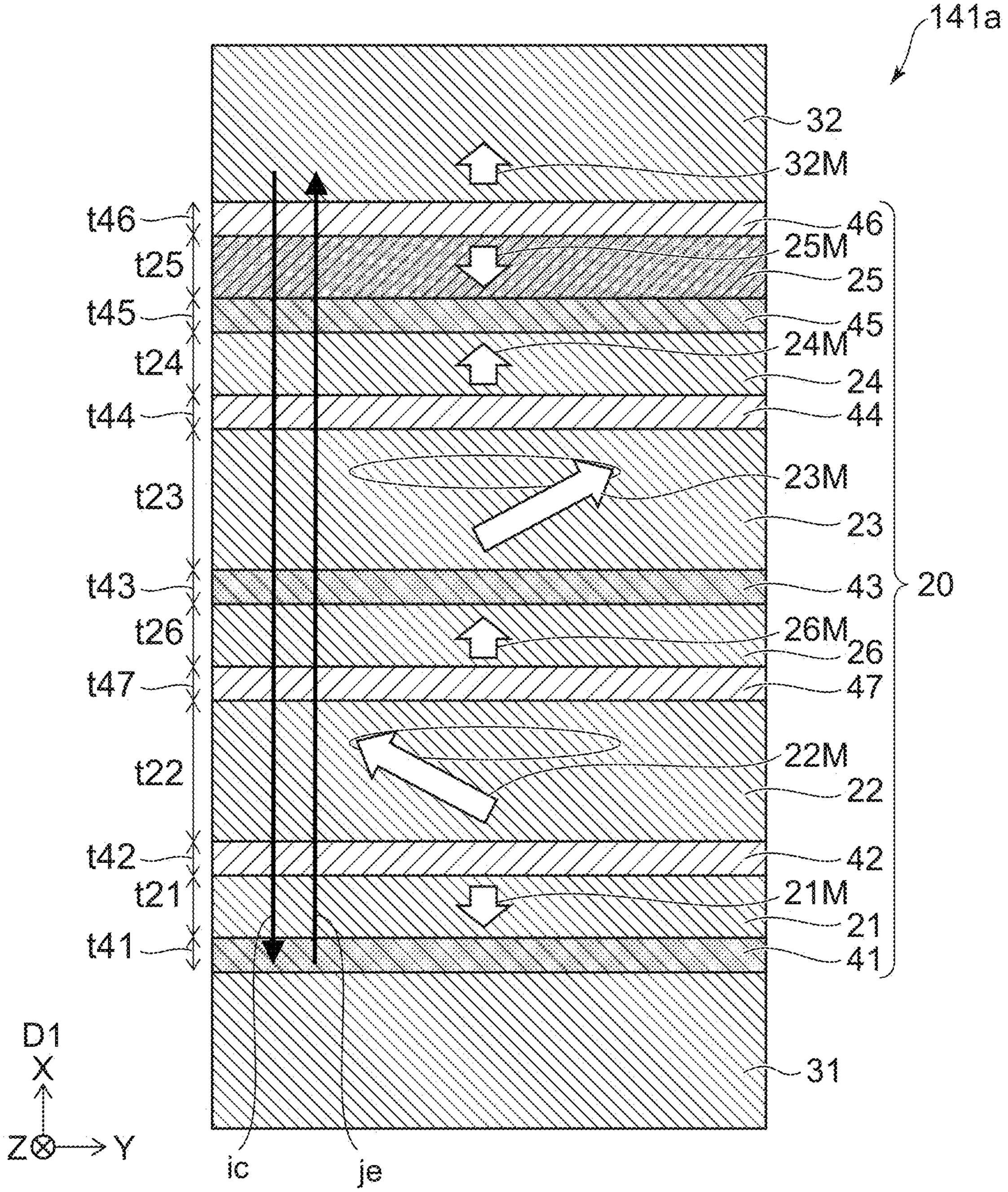
FIG. 50 is a schematic plan view illustrating a magnetic head according to the fourth embodiment.

FIG. 50 is a schematic plan view illustrating a magnetic head according to the fourth embodiment.

As shown in FIG. 50, in a magnetic head 141*a* according to the embodiment, the configurations of the third magnetic layer 23 and the fourth magnetic layer 24 are different from the configurations of the magnetic head 141. Other configurations of the magnetic head 141*a* may be the same as the configurations of the magnetic head 141.

In the magnetic head 141*a*, the second thickness t22 is thicker than the first thickness t21. The sixth thickness t26 is thinner than the second thickness t22. The third thickness t23 is thicker than the first thickness t21. The fourth thickness t24 is thinner than the third thickness t23. The fifth thickness t25 is thinner than the third thickness t23.

In the magnetic head 141*a*, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The seventh non-magnetic layer includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. A high-intensity oscillation is also obtained in the magnetic head 141*a*.

Figure 51:
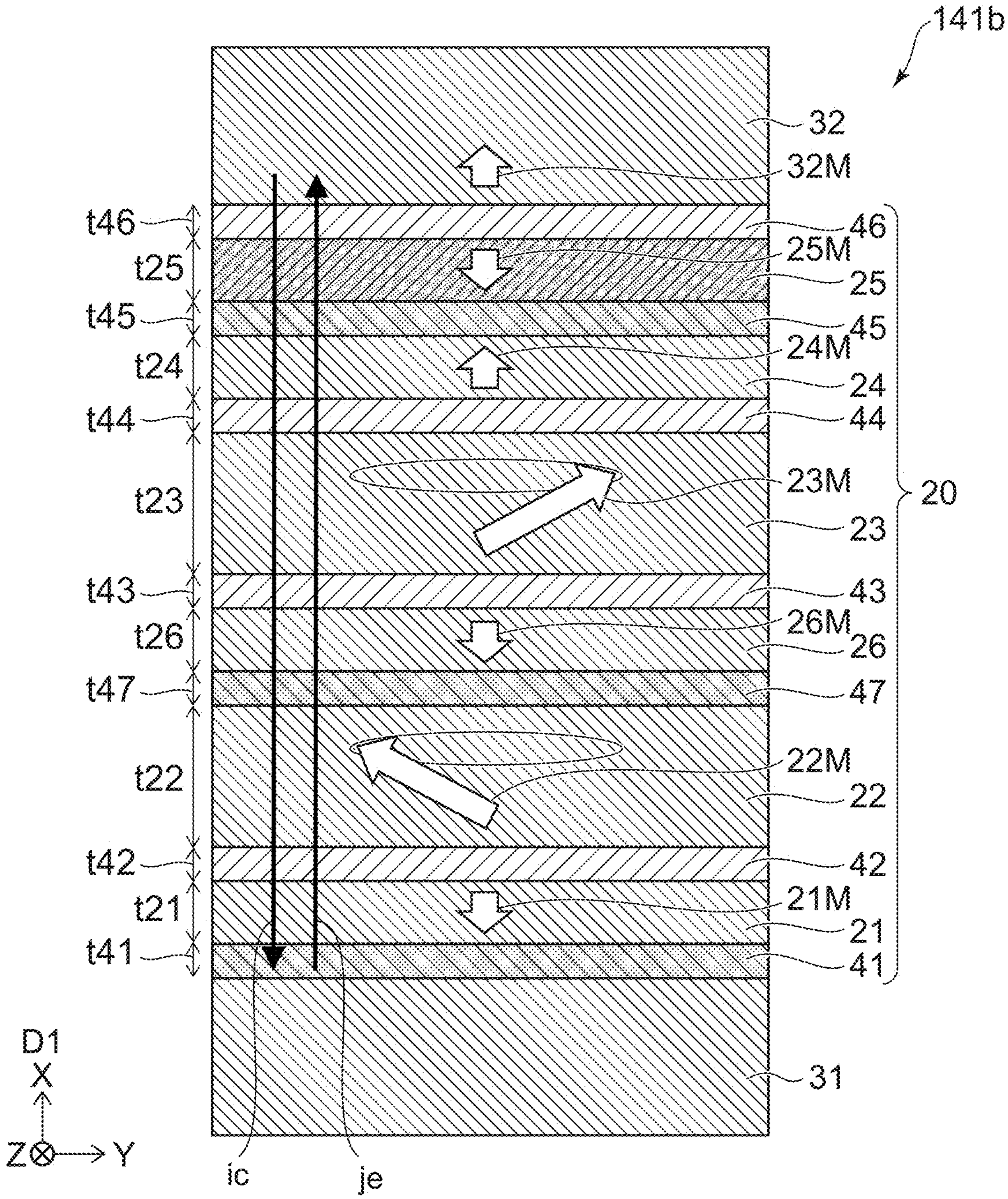
FIG. 51 is a schematic plan view illustrating a magnetic head according to the fourth embodiment.

FIG. 51 is a schematic plan view illustrating a magnetic head according to the fourth embodiment.

As shown in FIG. 51, in a magnetic head 141*b* according to the embodiment, the configurations of the third non-magnetic layer 43 and the seventh non-magnetic layer 47 are different from the configurations of the magnetic head 141*a*. Other configuration of the magnetic head 141*b* may be the same as the configurations of the magnetic head 141*a*.

In the magnetic head 141*b*, the second thickness t22 is thicker than the first thickness t21. The sixth thickness t26 is thinner than the second thickness t22. The third thickness t23 is thicker than the first thickness t21. The fourth thickness t24 is thinner than the third thickness t23. The fifth thickness t25 is thinner than the third thickness t23.

In the magnetic head 141*b*, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The seventh non-magnetic layer 47 includes at least one selected from the group consisting of Ru, Ir, Ta, Rh, Pd, Pt and W. The third non-magnetic layer 43 includes at least one selected from the group consisting of Cu, Au, Cr, Al, V and Ag. The fourth non-magnetic layer 44 includes at least one selected from the group consisting of Cu, Au, Cr, Al, V and Ag. A high-intensity oscillation is also obtained in the magnetic head 141*b*.

Figure 52:
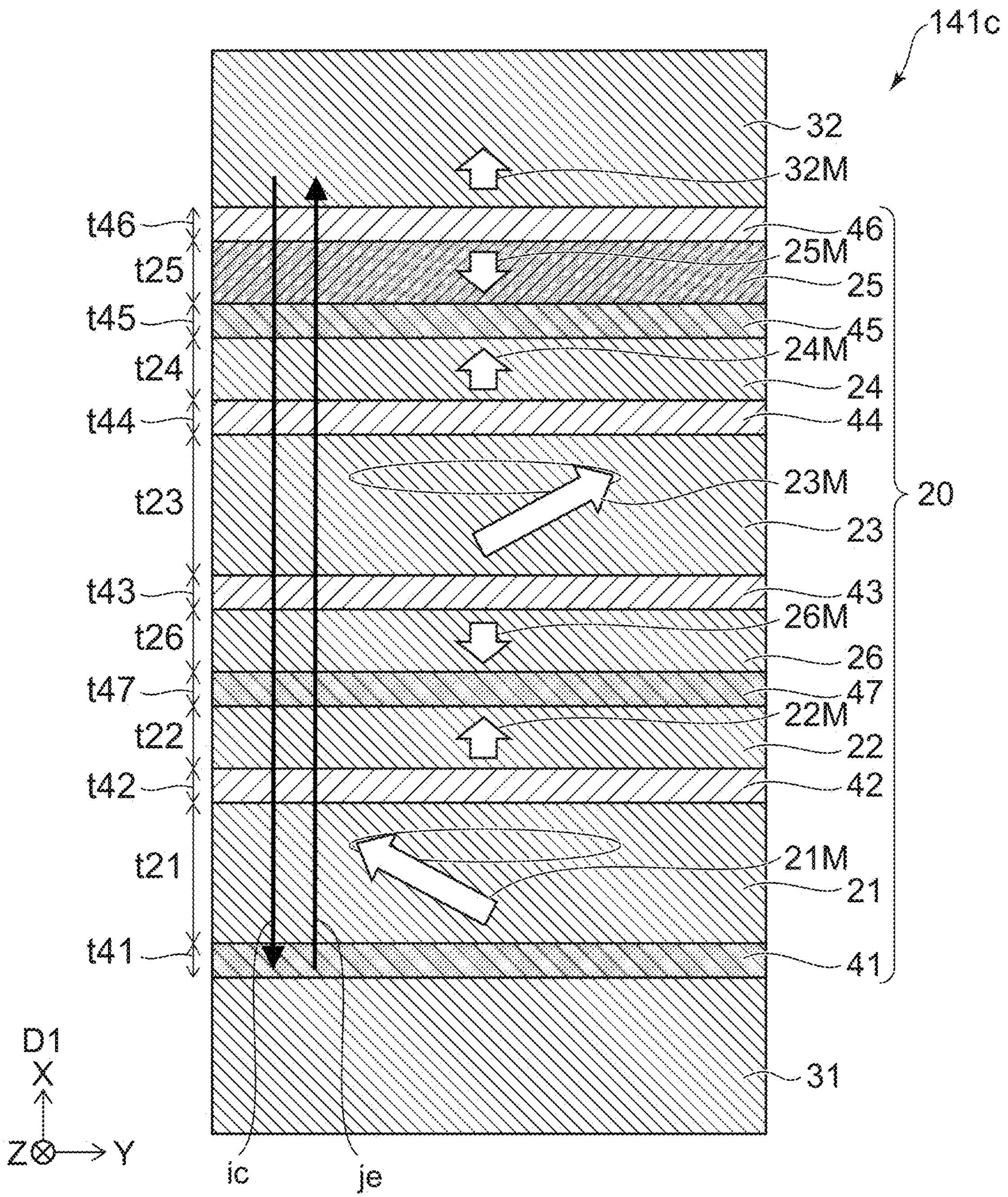
FIG. 52 is a schematic plan view illustrating a magnetic head according to the fourth embodiment.

FIG. 52 is a schematic plan view illustrating a magnetic head according to the fourth embodiment.

As shown in FIG. 52, in a magnetic head 141*c* according to the embodiment, the configurations of the first magnetic layer 21 and the second magnetic layer 22 are different from the configurations of the magnetic head 141*b*. Other configurations of the magnetic head 141*c* may be the same as the configurations of the magnetic head 141*b*.

In the magnetic head 141*c*, the second thickness t22 is thinner than the first thickness t21. The sixth thickness t26 is thinner than the first thickness t21. The third thickness t23 is thicker than the second thickness t22. The fourth thickness t24 is thinner than the third thickness t23. The fifth thickness t25 is thinner than the third thickness t23.

In the magnetic head 141*c*, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The seventh non-magnetic layer 47 includes at least one selected from the group consisting of Ru, Ir, Ta, Rh, Pd, Pt and W. The third non-magnetic layer 43 includes at least one selected from the group consisting of Cu, Au, Cr, Al, V and Ag. The fourth non-magnetic layer 44 includes at least one selected from the group consisting of Cu, Au, Cr, Al, V and Ag. A high-intensity oscillation is also obtained in the magnetic head 141*c*.

Figure 53:
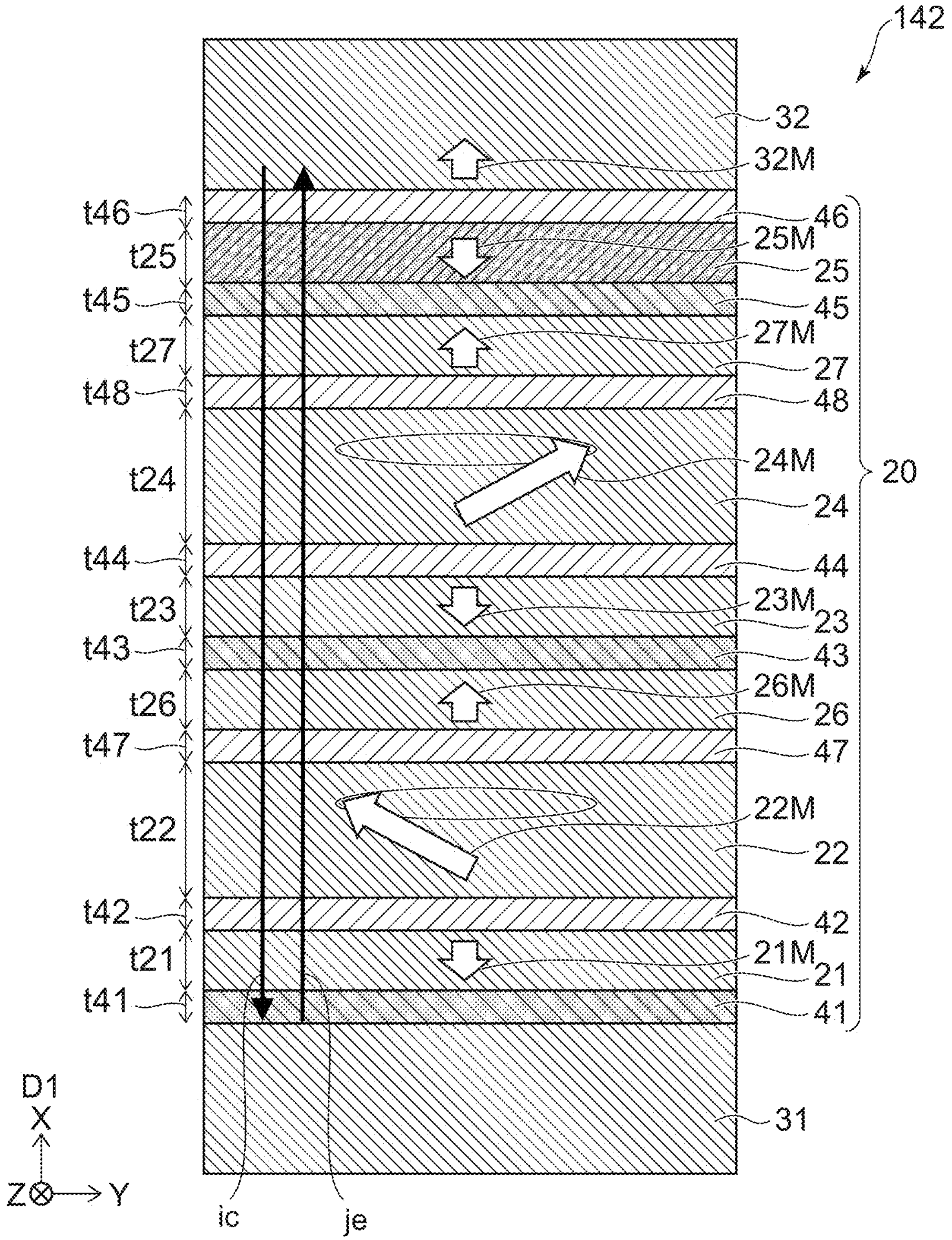
FIG. 53 is a schematic plan view illustrating a magnetic head according to the fourth embodiment.

FIG. 53 is a schematic plan view illustrating a magnetic head according to the fourth embodiment.

As shown in FIG. 53, in a magnetic head 142 according to the embodiment, the magnetic element 20 includes a sixth magnetic layer 26, a seventh magnetic layer 27, a seventh non-magnetic layer 47 and an eighth non-magnetic layer. Other configurations of the magnetic head 142 may be the same as the configurations of the magnetic head 140.

In the magnetic head 142, the sixth magnetic layer 26 is provided between the second magnetic layer 22 and the third magnetic layer 23. The seventh non-magnetic layer 47 is provided between the second magnetic layer 22 and the sixth magnetic layer 26. The seventh magnetic layer 27 is provided between the fourth magnetic layer 24 and the fifth magnetic layer 25. The eighth non-magnetic layer 48 is provided between the fourth magnetic layer 24 and the seventh magnetic layer 27. A thickness of the seventh magnetic layer 27 in the first direction D1 is defined as a seventh thickness t27.

In the magnetic head 142, the second thickness t22 is thicker than the first thickness t21. The sixth thickness t26 is thinner than the second thickness t22. The third thickness t23 is thinner than the second thickness t22. The fourth thickness t24 is thicker than the third thickness t23. The seventh thickness t27 is thinner than the fourth thickness t24. The fifth thickness t25 is thinner than the fourth thickness t24.

In the magnetic head 142, the first non-magnetic layer 41 includes at least one selected from the group consisting of Ru, Ir, Ta, Rh, Pd, Pt and W. The second non-magnetic layer 42 includes at least one selected from the group consisting of Cu, Au, Cr, Al, V and Ag. The seventh non-magnetic layer 47 includes at least one selected from the group consisting of Cu, Au, Cr, Al, V and Ag. The third non-magnetic layer 43 includes at least one selected from the group consisting of Ru, Ir, Ta, Rh, Pd, Pt and W. The fourth non-magnetic layer 44 includes at least one selected from the group consisting of Cu, Au, Cr, Al, V and Ag. The eighth non-magnetic layer 48 includes at least one selected from the group consisting of Cu, Au, Cr, Al, V and Ag. A high-intensity oscillation can be obtained in the magnetic head 142 as well.

In the magnetic head 142, for example, the component of the magnetization 27M of the seventh magnetic layer 27 along the first direction D1 is opposite to the component of the magnetization 25M of the fifth magnetic layer 25 along the first direction D1.

In the fourth embodiment, the first non-magnetic layer thickness t41 may be, for example, not less than 1 nm and not more than 10 nm. The second non-magnetic layer thickness t42 may be, for example, not less than 0.5 nm and not more than 6 nm. The third non-magnetic layer thickness t43 may be, for example, not less than 0.5 nm and not more than 10 nm. The fourth non-magnetic layer thickness t44 may be, for example, not less than 0.5 nm and not more than 6 nm. The fifth non-magnetic layer thickness t45 may be, for example, not less than 1 nm and not more than 10 nm. The sixth non-magnetic layer thickness t46 may be, for example, not less than 0.5 nm and not more than 6 nm. The seventh non-magnetic layer thickness t47 may be, for example, not less than 0.5 nm and not more than 10 nm. The eighth non-magnetic layer thickness t48 may be, for example, not less than 0.5 nm and not more than 6 nm or less.

In the operation, an element current ic greater than or equal to the threshold value is supplied to the magnetic element 20. The element voltage Ve1 is applied to the magnetic element 20 in the operation. The element current ic and the element voltage Ve1 are supplied by the element circuit 20D. For example, one end of the magnetic element 20 is electrically connected to the first magnetic pole 31. The other end of the magnetic element 20 is electrically connected to the second magnetic pole 32. The element circuit 20D is configured to apply the element voltage Ve1 between the first magnetic pole 31 and the second magnetic pole 32. The potential of the first magnetic pole 31 is lower than the potential of the second magnetic pole 32 when the element voltage Ve1 is applied.

FIGS. 54 to 62 are graphs illustrating characteristics of the magnetic heads according to the fourth embodiment.

These figures illustrate the differential electric resistance of the magnetic element 20 when a voltage Vat applied to the magnetic element 20 is changed. The horizontal axis is the voltage Vat. The vertical axis is the differential electric resistance Rd1. The voltage Va1 may be a voltage between the first terminal T1 and the second terminal T2. For example, a voltage corresponding to the voltage Vat is applied to the magnetic element 20. FIGS. 54 to 62 correspond to magnetic heads 140, 140*a*, 140*b*, 140*c*, 141, 141*a*, 141*b*, 141*c*, and 142.

Figure 54:
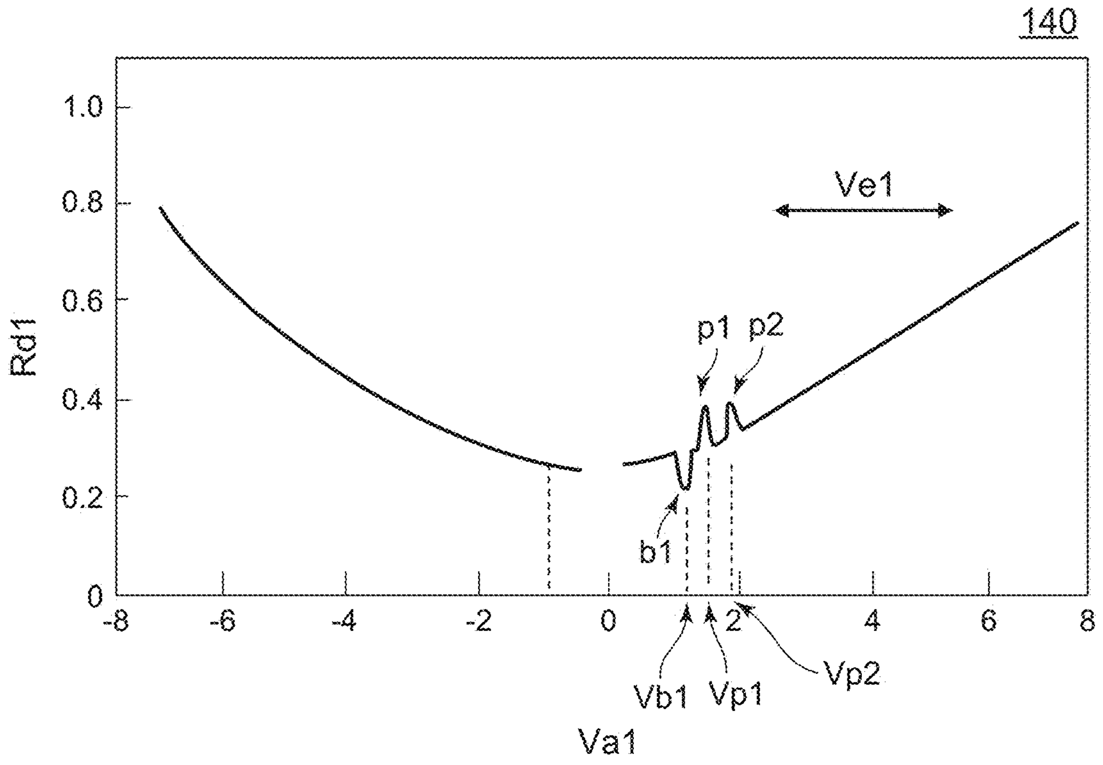
FIG. 54 is a graph illustrating characteristics of the magnetic head according to the fourth embodiment.

As shown in FIG. 54, in the magnetic head 140, the differential electrical resistance Rd1 includes a first positive bottom b1, a first positive peak p1 and a second positive peak p2. The first positive bottom b1 is, for example, a negative peak. The voltage Va1 corresponding to the first positive bottom b1 is a first positive bottom voltage Vb1. The voltage Va1 corresponding to the first positive peak p1 is a first positive peak voltage Vp1. The voltage Va1 corresponding to the second positive peak p2 is a second positive peak voltage Vp2. The first positive bottom voltage Vb1, the first positive peak voltage Vp1, the second positive peak voltage Vp2 and the element voltage Ve1 are positive. The potential of the first magnetic pole 31 is lower than the potential of the second magnetic pole 32 when the positive voltage Vat is applied. The element voltage Ve1 is higher than the first positive bottom voltage Vb1, higher than the first positive peak voltage Vp1, and higher than the second positive peak voltage Vp2.

Thus, the differential electrical resistance Rd1 includes at least one peak and at least one bottom. In this example, the at least one peak is the first positive peak p1 and the second positive peak p2. The at least one bottom is the first positive bottom b1. It is considered that the peaks and bottoms correspond to discontinuous changes in electrical resistance accompanying reversal of magnetization of multiple magnetic layers included in the magnetic element 20.

The voltage Va1 corresponding to the at least one peak is a peak voltage (in this example, the first positive peak voltage Vp1 or the second positive peak voltage Vp2). The voltage Va1 corresponding to the at least one bottom is a bottom voltage (in this example, the first positive bottom voltage Vb1). The element voltage Ve1 is higher than the peak voltage and higher than the bottom voltage. Thereby, a stable and high-intensity oscillation can be obtained.

Figure 55:
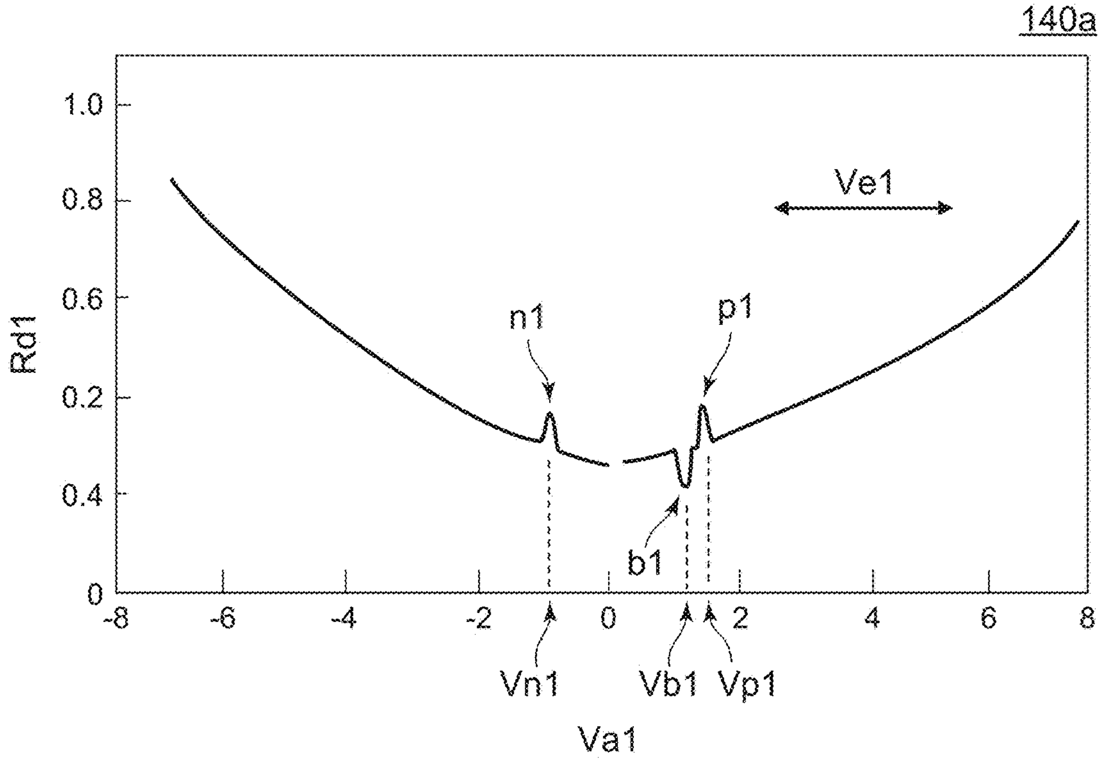
FIG. 55 is a graph illustrating characteristics of the magnetic head according to the fourth embodiment.

As shown in FIG. 55, in the magnetic head 140*a*, the differential electrical resistance Rd1 includes a first negative peak n1, the first positive bottom b1, and the first positive peak p1. The voltage Va1 corresponding to the first negative peak n1 is a first negative peak voltage Vn1. The first negative peak voltage Vn1 is negative. The potential of the first magnetic pole 31 is higher than the potential of the second magnetic pole 32 when the voltage Vat being negative is applied. The element voltage Ve1 is higher than the peak voltage (first negative peak voltage Vn1 and first positive peak voltage Vp1) and higher than the bottom voltage (first positive bottom voltage Vb1). A stable and high-intensity oscillation can be obtained.

Figure 56:
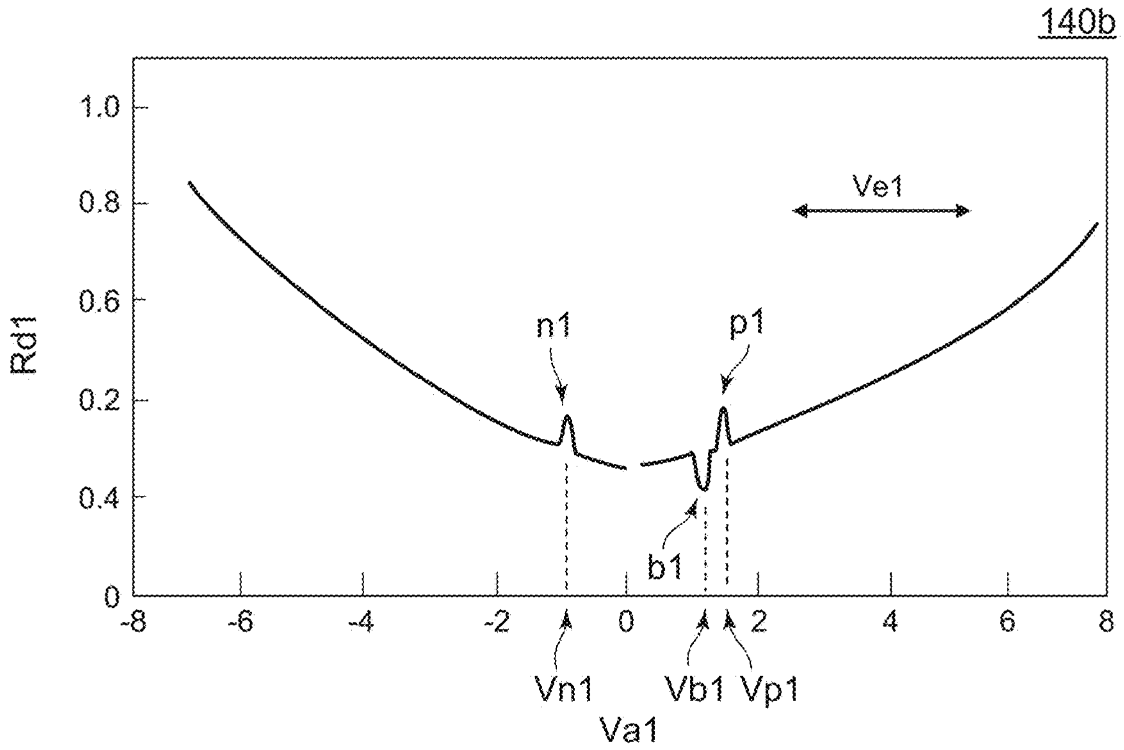
FIG. 56 is a graph illustrating characteristics of the magnetic head according to the fourth embodiment.

As shown in FIG. 56, in the magnetic head 140*b*, the differential electrical resistance Rd1 includes the first negative peak n1, the first positive bottom b1, and the first positive peak p1. The element voltage Ve1 is higher than the peak voltage (first negative peak voltage Vn1 and first positive peak voltage Vp1) and higher than the bottom voltage (first positive bottom voltage Vb1). A stable and high-intensity oscillation can be obtained.

Figure 57:
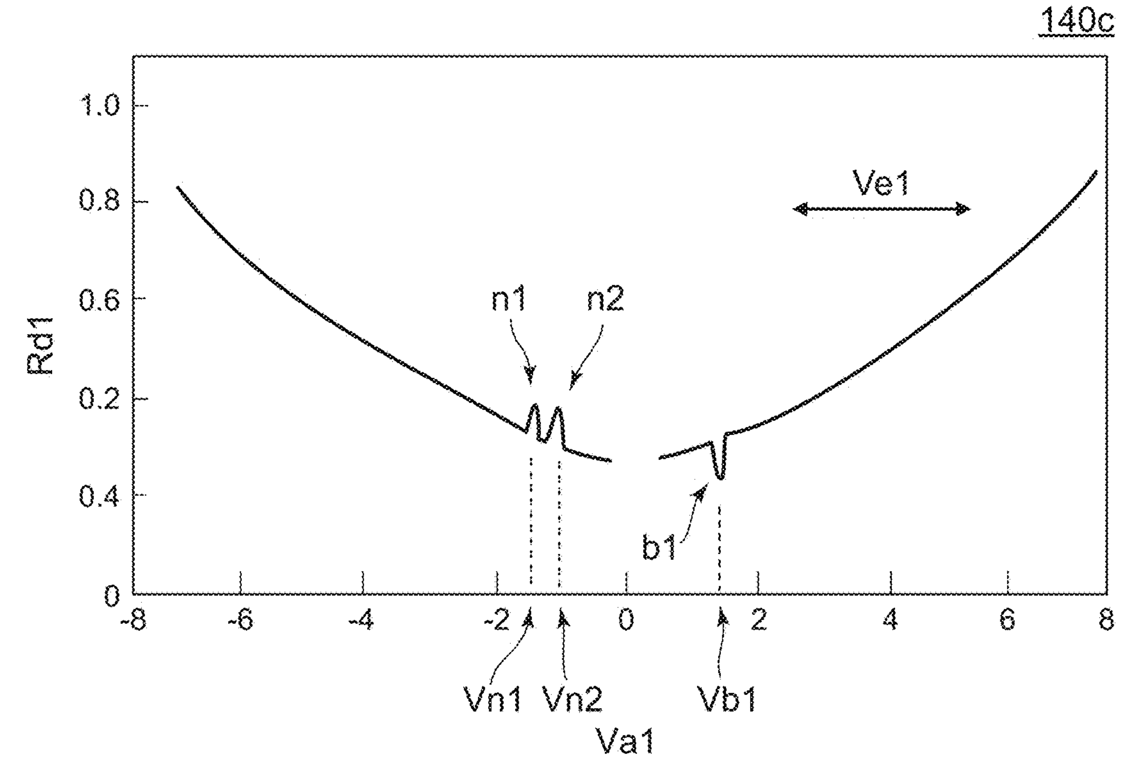
FIG. 57 is a graph illustrating characteristics of the magnetic head according to the fourth embodiment.

As shown in FIG. 57, in the magnetic head 140*c*, the differential electrical resistance Rd1 includes the first negative peak n1, a second negative peak n2, and the first positive bottom b1. The voltage Va1 corresponding to the second negative peak n2 is a second negative peak voltage Vn2. The second negative peak voltage Vn2 is negative. The element voltage Ve1 is higher than the peak voltage (the first negative peak voltage Vn1 and the second negative peak voltage Vn2) and higher than the bottom voltage (the first positive bottom voltage Vb1). A stable and high-intensity oscillation can be obtained.

Figure 58:
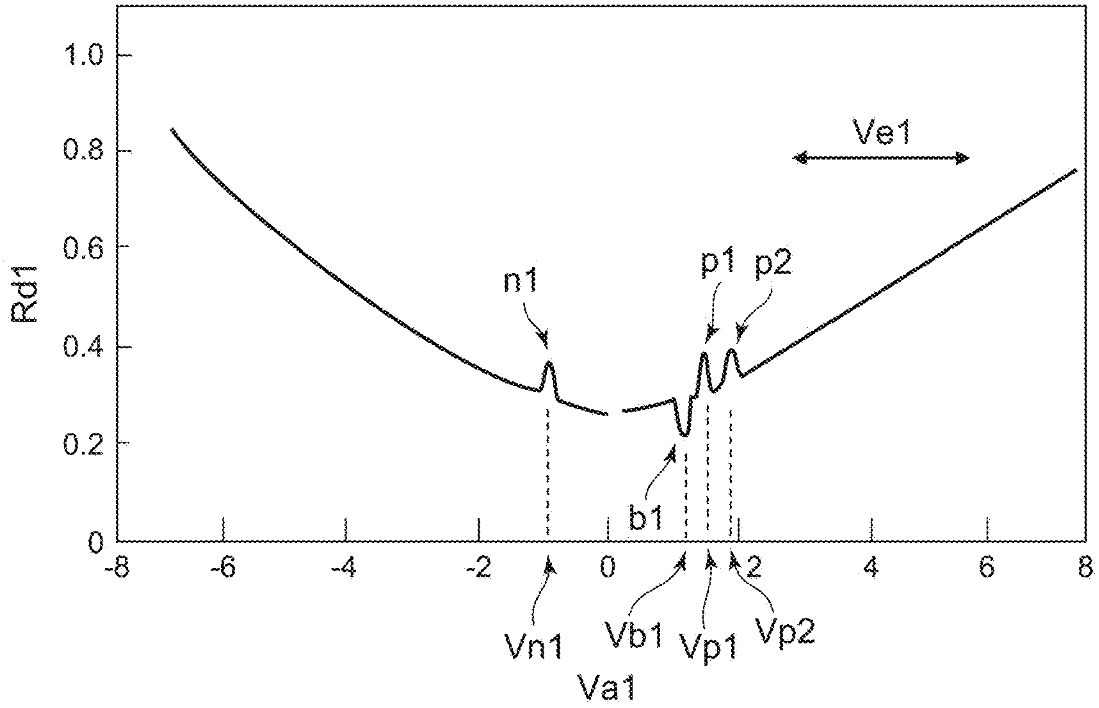
FIG. 58 is a graph illustrating characteristics of the magnetic head according to the fourth embodiment.

As shown in FIG. 58, in the magnetic head 141, the differential electrical resistance Rd1 includes the first negative peak n1, the first positive bottom b1, the first positive peak p1, and the second positive peak p2. The element voltage Ve1 is higher than the peak voltages (first negative peak voltage Vn1, first positive peak voltage Vp1, and second positive peak voltage Vp2) and higher than the bottom voltage (first positive bottom voltage Vb1). A stable and high-intensity oscillation can be obtained.

Figure 59:
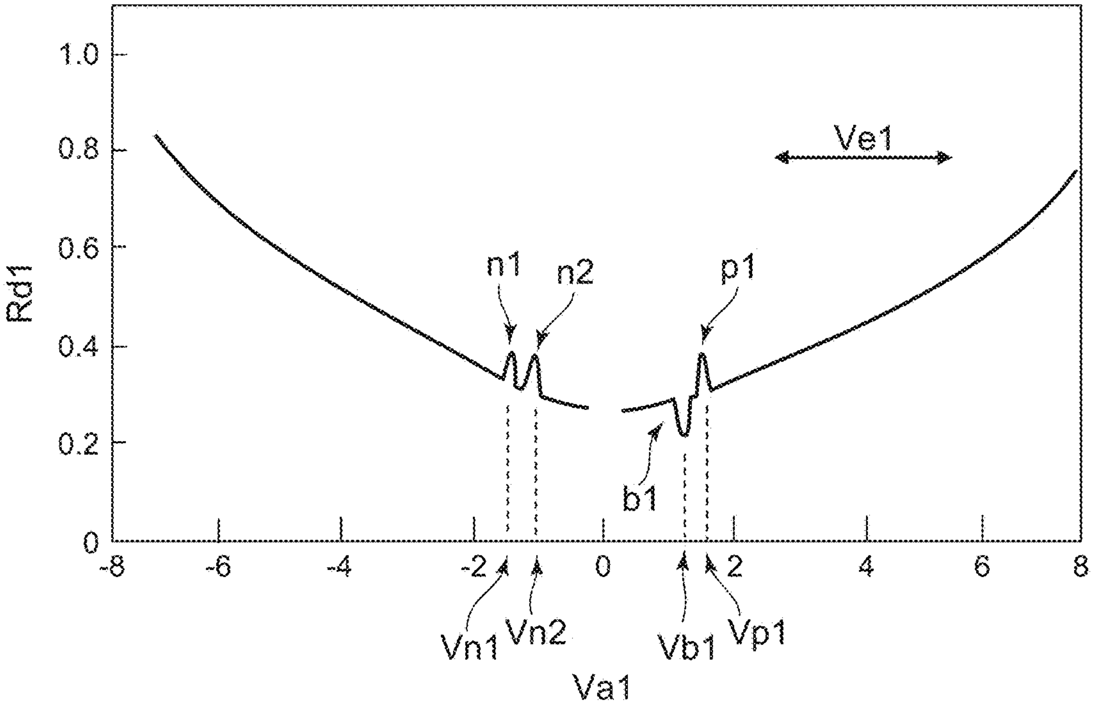
FIG. 59 is a graph illustrating characteristics of the magnetic head according to the fourth embodiment.

As shown in FIG. 59, in the magnetic head 141*a*, the differential electrical resistance Rd1 includes the first negative peak n1, the second negative peak n2, the first positive bottom b1 and the first positive peak p1. The element voltage Ve1 is higher than the peak voltages (first negative peak voltage Vn1, second negative peak voltage Vn2, and first positive peak voltage Vp1) and higher than the bottom voltage (first positive bottom voltage Vb1). A stable and high-intensity oscillation can be obtained.

Figure 60:
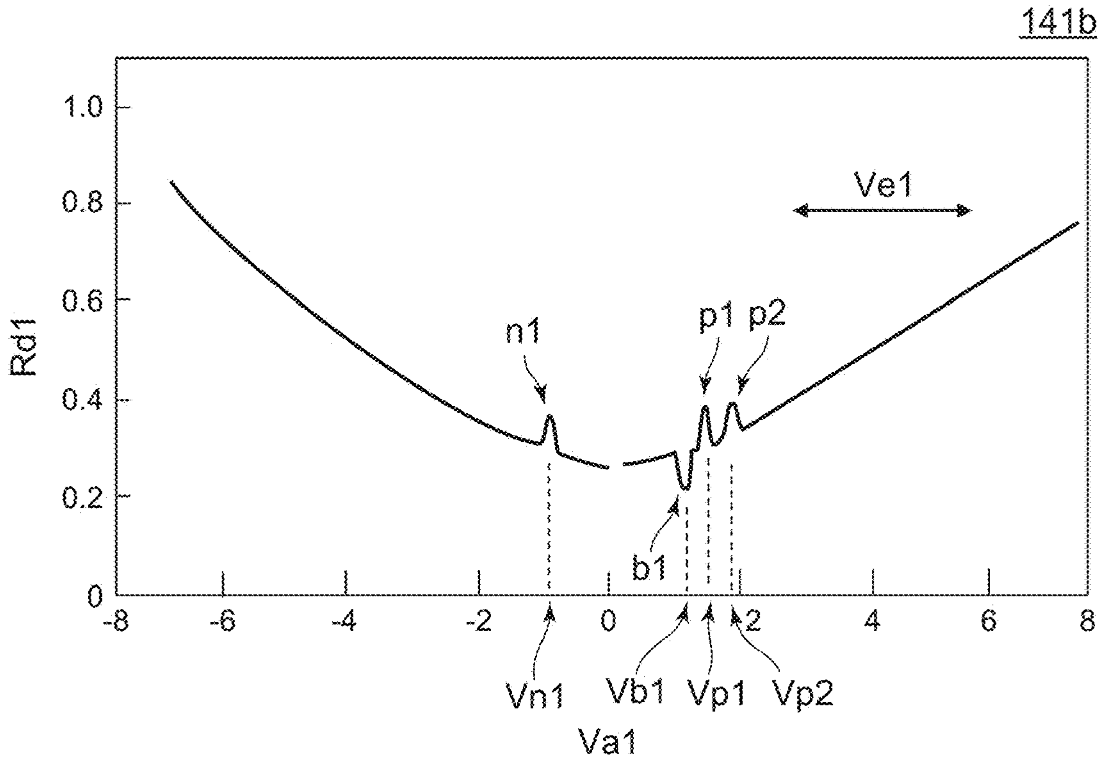
FIG. 60 is a graph illustrating characteristics of the magnetic head according to the fourth embodiment.

As shown in FIG. 60, in the magnetic head 141*b*, the differential electrical resistance Rd1 includes the first negative peak n1, the first positive bottom b1, the first positive peak p1, and the second positive peak p2. The element voltage Ve1 is higher than the peak voltages (first negative peak voltage Vn1, first positive peak voltage Vp1, and second positive peak voltage Vp2) and higher than the bottom voltage (first positive bottom voltage Vb1). A stable and high-intensity oscillation can be obtained.

Figure 61:
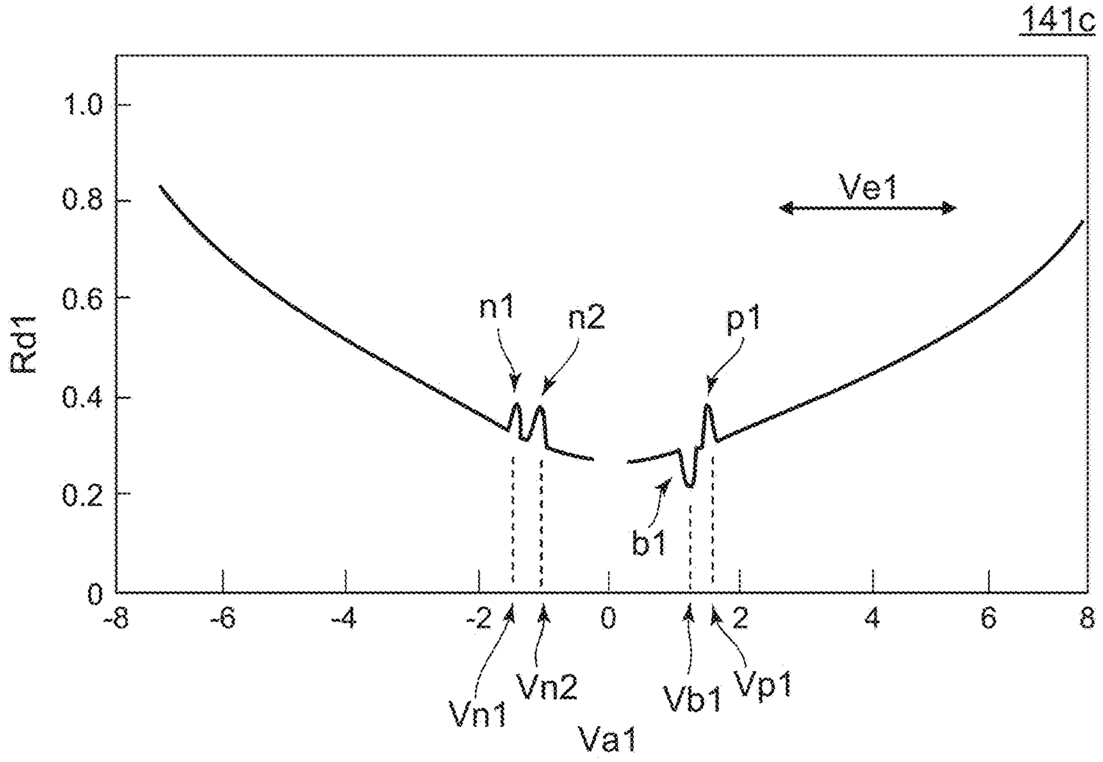
FIG. 61 is a graph illustrating characteristics of the magnetic head according to the fourth embodiment.

As shown in FIG. 61, in the magnetic head 141*c*, the differential electrical resistance Rd1 includes the first negative peak n1, the second negative peak n2, the first positive bottom b1, and the first positive peak p1. The element voltage Ve1 is higher than the peak voltages (first negative peak voltage Vn1, second negative peak voltage Vn2, and first positive peak voltage Vp1) and higher than the bottom voltage (first positive bottom voltage Vb1). A stable and high-intensity oscillation can be obtained.

Figure 62:
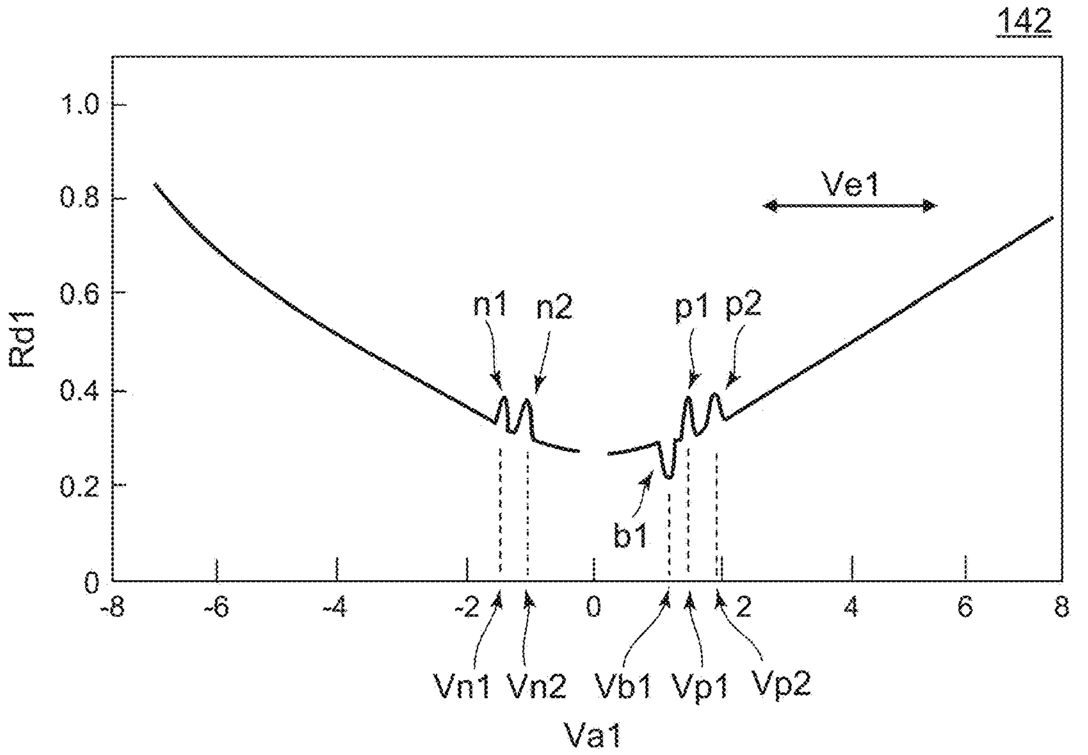
FIG. 62 is a graph illustrating characteristics of the magnetic head according to the fourth embodiment.

As shown in FIG. 62, in the magnetic head 142, the differential electrical resistance Rd1 has the first negative peak n1, the second negative peak n2, the first positive bottom b1, the first positive peak p1, and the second positive peak p2. The element voltage Ve1 is higher than the peak voltages (the first negative peak voltage Vn1, the second negative peak voltage Vn2, the first positive peak voltage Vp1, and the second positive peak voltage Vp2) and the bottom voltage (the first positive bottom voltage Vb1). A stable and high-intensity oscillation can be obtained.

In the magnetic heads 140, 140*a*, 140*b*, 140*c*, 141, 141*a*, 141*b*, 141*c* and 142, the element voltage Vd1 is 10 times or less of the peak voltage, which is the reference for setting the element voltage Vd1 and 10 times or less of the bottom voltage, which is the reference for setting the element voltage Vd1. The element voltage Ve1 may be 8 times or less of the peak voltage, which is the reference for setting the element voltage Ve1 or 8 times or less of the bottom voltage, which is the reference for setting the element voltage Ve1.

In fourth embodiments, the tail of one peak may overlap the adjacent peak. The tail of one peak may overlap one bottom. The tail of one bottom may overlap adjacent peaks. The tail of one bottom may overlap adjacent bottom.

In the fourth embodiment, the absolute value of the peak voltage, which is used as the reference for setting the element voltage Ve1, may be 4 times or less the absolute value of the other peak voltages. The absolute value of the above peak voltage, which is the reference for setting the element voltage Ve1, may be 3 times or less the absolute value of the other peak voltages.

The fourth embodiments may include the following configurations (for example, technical proposals).

Configuration D1

A magnetic head, comprising:
- a first magnetic pole;
- a second magnetic pole; and
- a magnetic element provided between the first magnetic pole and the second magnetic pole,
- the magnetic element including
- a first magnetic layer,
- a second magnetic layer provided between the first magnetic layer and the second magnetic pole,
- a third magnetic layer provided between the second magnetic layer and the second magnetic pole,
- a fourth magnetic layer provided between the third magnetic layer and the second magnetic pole,
- a fifth magnetic layer provided between the fourth magnetic layer and the second magnetic pole,
- a first non-magnetic layer provided between the first magnetic pole and the first magnetic layer,
- a second non-magnetic layer provided between the first magnetic layer and the second magnetic layer,
- a third non-magnetic layer provided between the second magnetic layer and the third magnetic layer,
- a fourth non-magnetic layer provided between the third magnetic layer and the fourth magnetic layer,
- a fifth non-magnetic layer provided between the fourth magnetic layer and the fifth magnetic layer,
- a sixth non-magnetic layer provided between the fifth magnetic layer and the second magnetic pole,
- the fifth magnetic layer including a first element and at least one of Fe, Co or Ni, the first element including at least one selected from the group consisting of Cr, V, Mn, Ti, N and Sc,
- the fifth non-magnetic layer including at least one selected from the group consisting of Ru, Ir, Ta, Rh, Pd, Pt and W, and
- the sixth non-magnetic layer including at least one selected from the group consisting of Cu, Au, Cr, Al, V and Ag.

Configuration D2

The magnetic head according to Configuration D1, wherein
- the first magnetic layer, the second magnetic layer, the third magnetic layer and the fourth magnetic layer include at least one of Fe, Co or Ni, and
- the first magnetic layer, the second magnetic layer, the third magnetic layer, and the fourth magnetic layer do not include the first element, or a concentration of the first element in the first magnetic layer, the second magnetic layer, and the third magnetic layer is lower than a concentration of the first element in the fourth magnetic layer.

Configuration D3

The magnetic head according to Configuration D2, wherein
- the fifth non-magnetic layer contacts the fifth magnetic layer, and
- the sixth non-magnetic layer contacts the fifth magnetic layer and the second magnetic pole.

Configuration D4

The magnetic head according to Configuration D3, wherein
- the first non-magnetic layer includes at least one selected from the group consisting of Ru, Ir, Ta, Rh, Pd, Pt and W,
- the second non-magnetic layer includes at least one selected from the group consisting of Cu, Au, Cr, Al, V and Ag,
- the third non-magnetic layer includes at least one selected from the group consisting of Ru, Ir, Ta, Rh, Pd, Pt and W,
- the fourth non-magnetic layer includes at least one selected from the group consisting of Cu, Au, Cr, Al, V and Ag,
- a second thickness of the second magnetic layer in a first direction from the first magnetic pole to the second magnetic pole is thicker than a first thickness of the first magnetic layer in the first direction,
- a third thickness of the third magnetic layer in the first direction is thinner than the second thickness,
- a fourth thickness of the fourth magnetic layer in the first direction is thicker than the third thickness, and
- a fifth thickness of the fifth magnetic layer in the first direction is thinner than the fourth thickness.

Configuration D5

The magnetic head according to Configuration D3, wherein
- the first non-magnetic layer includes at least one selected from the group consisting of Ru, Ir, Ta, Rh, Pd, Pt and W,
- the second non-magnetic layer includes at least one selected from the group consisting of Cu, Au, Cr, Al, V and Ag,
- the third non-magnetic layer includes at least one selected from the group consisting of Ru, Ir, Ta, Rh, Pd, Pt and W, and the fourth non-magnetic layer includes at least one selected from the group consisting of Cu, Au, Cr, Al, V and Ag, a second thickness of the second magnetic layer in a first direction from the first magnetic pole to the second magnetic pole is thinner than a first thickness of the first magnetic layer in the first direction, a third thickness of the third magnetic layer in the first direction is thinner than the first thickness, a fourth thickness of the fourth magnetic layer in the first direction is thicker than the third thickness, and a fifth thickness of the fifth magnetic layer in the first direction is thinner than the fourth thickness.

Configuration D6

The magnetic head according to Configuration D3, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a third thickness of the third magnetic layer in the first direction is thicker than the first thickness, a fourth thickness of the fourth magnetic layer in the first direction is thinner than the third thickness, and a fifth thickness of the fifth magnetic layer in the first direction is thinner than the third thickness.

Configuration D7

The magnetic head according to Configuration D3, wherein the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thinner than a first thickness of the first magnetic layer in the first direction, a third thickness of the third magnetic layer in the first direction is thicker than the second thickness, a fourth thickness of the fourth magnetic layer in the first direction is thinner than the third thickness, and a fifth thickness of the fifth magnetic layer in the first direction is thinner than the third thickness.

Configuration D8

The magnetic head according to Configuration D3, wherein the magnetic element further includes a sixth magnetic layer and a seventh non-magnetic layer, the sixth magnetic layer is provided between the second magnetic layer and the third magnetic layer, the seventh non-magnetic layer is provided between the second magnetic layer and the sixth magnetic layer, the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the seventh non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a sixth thickness of the sixth magnetic layer in the first direction is thinner than the second thickness, a third thickness of the third magnetic layer in the first direction is thinner than the second thickness, a fourth thickness of the fourth magnetic layer in the first direction is thicker than the third thickness, and a fifth thickness of the fifth magnetic layer in the first direction is thinner than the fourth thickness.

Configuration D9

The magnetic head according to Configuration D3, wherein the magnetic element further includes a sixth magnetic layer and a seventh non-magnetic layer, the sixth magnetic layer is provided between the second magnetic layer and the third magnetic layer, the seventh non-magnetic layer is provided between the second magnetic layer and the sixth magnetic layer, the first non-magnetic layer includes at least one selected from the group consisting of Ru, Ir, Ta, Rh, Pd, Pt and W;

the second non-magnetic layer includes at least one selected from the group consisting of Cu, Au, Cr, Al, V and Ag, the seventh non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a sixth thickness of the sixth magnetic layer in the first direction is thinner than the second thickness, a third thickness of the third magnetic layer in the first direction is thicker than the first thickness, a fourth thickness of the fourth magnetic layer in the first direction is thinner than the third thickness, and the fifth thickness of the fifth magnetic layer in the first direction is thinner than the third thickness.

Configuration D10

The magnetic head according to Configuration D3, wherein the magnetic element further includes a sixth magnetic layer and a seventh non-magnetic layer, the sixth magnetic layer is provided between the second magnetic layer and the third magnetic layer, the seventh non-magnetic layer is provided between the second magnetic layer and the sixth magnetic layer, the first non-magnetic layer includes at least one selected from the group consisting of Ru, Ir, Ta, Rh, Pd, Pt and W, a second non-magnetic layer includes at least one selected from the group consisting of Cu, Au, Cr, Al, V and Ag, a seventh non-magnetic layer includes at least one selected from the group consisting of Ru, Ir, Ta, Rh, Pd, Pt and W, a third non-magnetic layer includes at least one selected from the group consisting of Cu, Au, Cr, Al, V and Ag, a fourth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a sixth thickness of the sixth magnetic layer in the first direction is thinner than the second thickness, e third thickness of the third magnetic layer in the first direction is thicker than the first thickness, a fourth thickness of the fourth magnetic layer in the first direction is thinner than the third thickness, and a fifth thickness of the fifth magnetic layer in the first direction is thinner than the third thickness.

Configuration D11

The magnetic head according to Configuration D3, wherein the sixth magnetic layer is provided between the second magnetic layer and the third magnetic layer, the seventh non-magnetic layer is provided between the second magnetic layer and the sixth magnetic layer, the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the seventh non-magnetic layer includes at least one selected from the group consisting of Ru, Ir, Ta, Rh, Pd, Pt and W, the third non-magnetic layer includes at least one selected from the group consisting of Cu, Au, Cr, Al, V and Ag, the fourth non-magnetic layer includes at least one selected from the group consisting of Cu, Au, Cr, Al, V and Ag, a second thickness of the second magnetic layer in a first direction from the first magnetic pole to the second magnetic pole is thinner than a first thickness of the first magnetic layer in the first direction, a sixth thickness of the sixth magnetic layer in the first direction is thinner than the first thickness, a third thickness of the third magnetic layer in the first direction is thicker than the second thickness, a fourth thickness of the fourth magnetic layer in the first direction is thinner than the third thickness, and a fifth thickness of the fifth magnetic layer in the first direction is thinner than the third thickness.

Configuration D12

The magnetic head according to Configuration D3, wherein the magnetic element further includes a sixth magnetic layer, a seventh magnetic layer, a seventh non-magnetic layer, and an eighth non-magnetic layer, the sixth magnetic layer is provided between the second magnetic layer and the third magnetic layer, the seventh non-magnetic layer is provided between the second magnetic layer and the sixth magnetic layer, the seventh magnetic layer is provided between the fourth magnetic layer and the fifth magnetic layer, the eighth non-magnetic layer is provided between the fourth magnetic layer and the seventh magnetic layer, the first non-magnetic layer includes at least one selected from the group consisting of Ru, Ir, Ta, Rh, Pd, Pt and W, the second non-magnetic layer includes at least one selected from the group consisting of Cu, Au, Cr, Al, V and Ag, the seventh non-magnetic layer includes at least one selected from the group consisting of Cu, Au, Cr, Al, V and Ag, the third non-magnetic layer includes at least one selected from the group consisting of Ru, Ir, Ta, Rh, Pd, Pt and W, the fourth non-magnetic layer includes at least one selected from the group consisting of Cu, Au, Cr, Al, V and Ag, the eighth non-magnetic layer includes at least one selected from the group consisting of Cu, Au, Cr, Al, V and Ag, a second thickness of the second magnetic layer in a first direction from the first magnetic pole to the second magnetic pole is thicker than a first thickness of the first magnetic layer in the first direction, a sixth thickness of the sixth magnetic layer in the first direction is thinner than the second thickness, a third thickness of the third magnetic layer in the first direction is thinner than the second thickness, a fourth thickness of the fourth magnetic layer in the first direction is thicker than the third thickness, a seventh thickness of the seventh magnetic layer in the first direction is thinner than the fourth thickness, and the fifth thickness of the fifth magnetic layer in the first direction is thinner than the fourth thickness.

Configuration D13

The magnetic head according to any one of Configurations D1-D12, wherein one end of the magnetic element is electrically connected to the first magnetic pole, another end of the magnetic element is electrically connected to the second magnetic pole, and a differential electrical resistance of the magnetic element when changing a voltage between the first magnetic pole and the second magnetic pole includes at least one peak and at least one bottom.

Configuration D14

A magnetic recording device, comprising:

the magnetic head according to any one of Configurations D1-D12; and a controller including an element circuit, one end of the magnetic element being electrically connected to the first magnetic pole, another end of the magnetic element being electrically connected to the second magnetic pole, the element circuit being configured to apply an element voltage between the first magnetic pole and the second magnetic pole, and when the element voltage is applied, a potential of the first magnetic pole being lower than a potential of the second magnetic pole.

Configuration D15

The magnetic recording device according to Configuration D14, wherein a differential electrical resistance of the magnetic element when a voltage between the first magnetic pole and the second magnetic pole is changed includes at least one peak and at least one bottom, the voltage corresponding to the at least one peak is a peak voltage, the voltage corresponding to the at least one bottom is a bottom voltage, and the device voltage is higher than the peak voltage and higher than the bottom voltage.

In the first to fourth embodiments, the first magnetic pole 31 may include a plurality of magnetic regions arranged along the X-axis direction. The second magnetic pole 32 may include a plurality of magnetic regions arranged along the X-axis direction. The boundaries between multiple magnetic regions may be clear or unclear. For example, the multiple magnetic regions are continuous.

Examples of other configurations of the magnetic recording device according to the embodiment will be described below. An example in which the magnetic head 110 is used will be described below. In the following description, the "magnetic head" may be any magnetic head (or any variation thereof) according to the embodiment.

Figure 63:
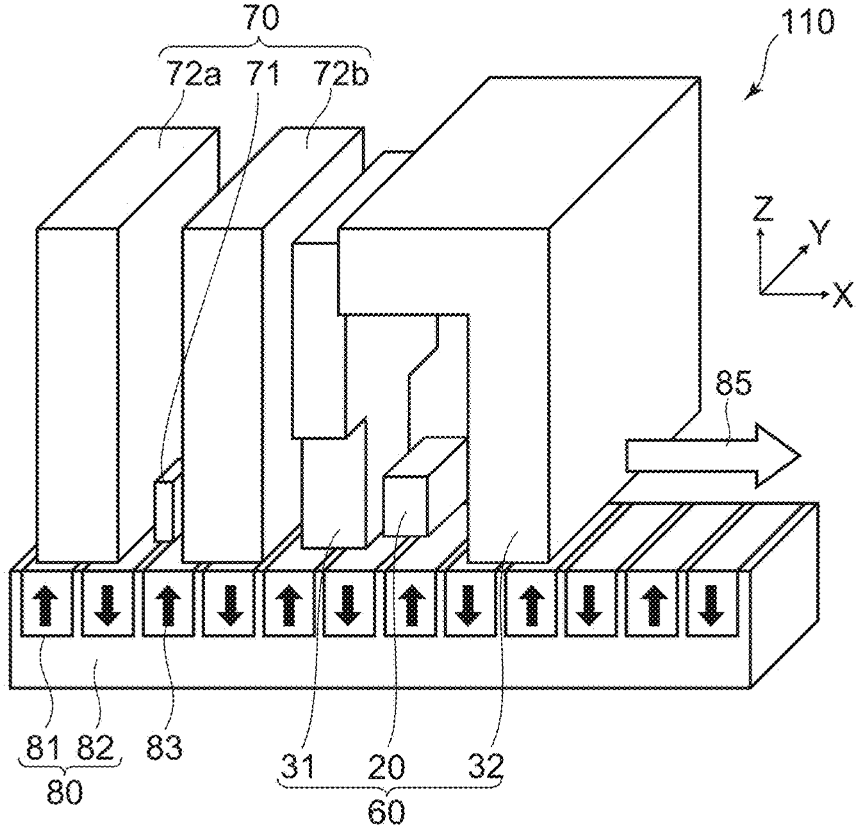
FIG. 63 is a schematic perspective view illustrating the magnetic recording device according to the embodiment.

FIG. 63 is a schematic perspective view illustrating the magnetic recording device according to the embodiment.

As shown in FIG. 63, the magnetic head (for example, the magnetic head 110) according to the embodiment is used together with the magnetic recording medium 80. In this example, the magnetic head 110 includes a recording section 60 and a reproducing section 70. Information is recorded on the magnetic recording medium 80 by the recording section 60 of the magnetic head 110. Information recorded on the magnetic recording medium 80 is reproduced by the reproducing section 70.

The magnetic recording medium 80 includes, for example, a medium substrate 82 and a magnetic recording layer 81 provided on the medium substrate 82. The magnetization 83 of the magnetic recording layer 81 is controlled by the recording section 60.

The reproducing section 70 includes, for example, a first reproducing magnetic shield 72*a*, a second reproducing magnetic shield 72*b*, and a magnetic reproducing element 71. The magnetic reproducing element 71 is provided between the first reproducing magnetic shield 72*a* and the second reproducing magnetic shield 72*b*. The magnetic reproducing element 71 is configured to output a signal corresponding to the magnetization 83 of the magnetic recording layer 81.

As shown in FIG. 63, the magnetic recording medium 80 moves relative to the magnetic head 110 in a direction of medium movement 85. Information corresponding to the magnetization 83 of the magnetic recording layer 81 is controlled at an arbitrary position by the magnetic head 110. Information corresponding to the magnetization 83 of the magnetic recording layer 81 is reproduced at an arbitrary position by the magnetic head 110.

Figure 64:
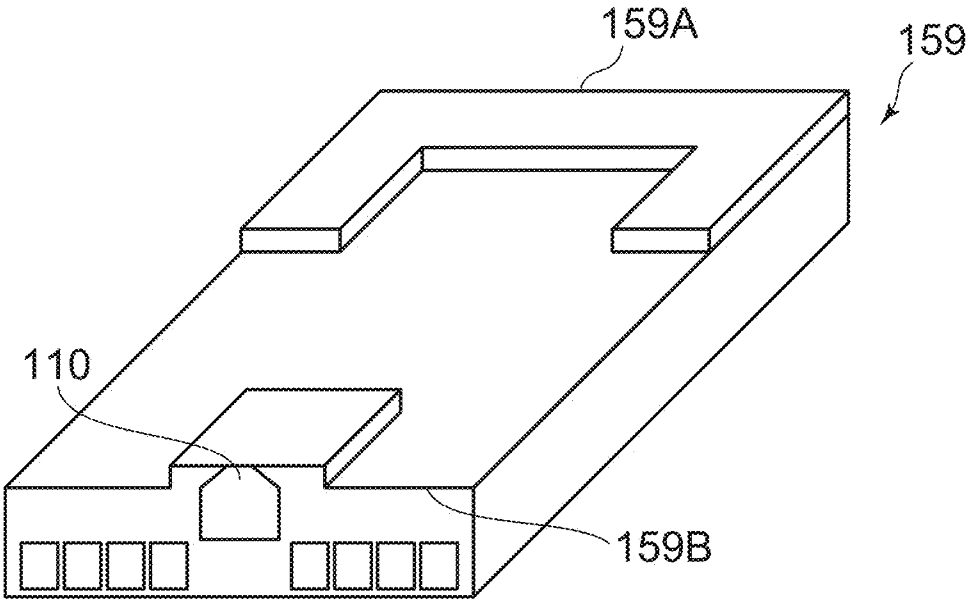
FIG. 64 is a schematic perspective view illustrating a part of the magnetic recording device according to the embodiment.

FIG. 64 is a schematic perspective view illustrating a part of the magnetic recording device according to the embodiment.

FIG. 64 illustrates a head slider.

The magnetic head 110 is provided on the head slider 159. The head slider 159 includes, for example, $Al_2O_3$/TiC or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side surface of the air outflow side 159B of the head slider 159 or the like. As a result, the magnetic head 110 moves relative to the magnetic recording medium while flying above or in contact with the magnetic recording medium.

Figure 65:
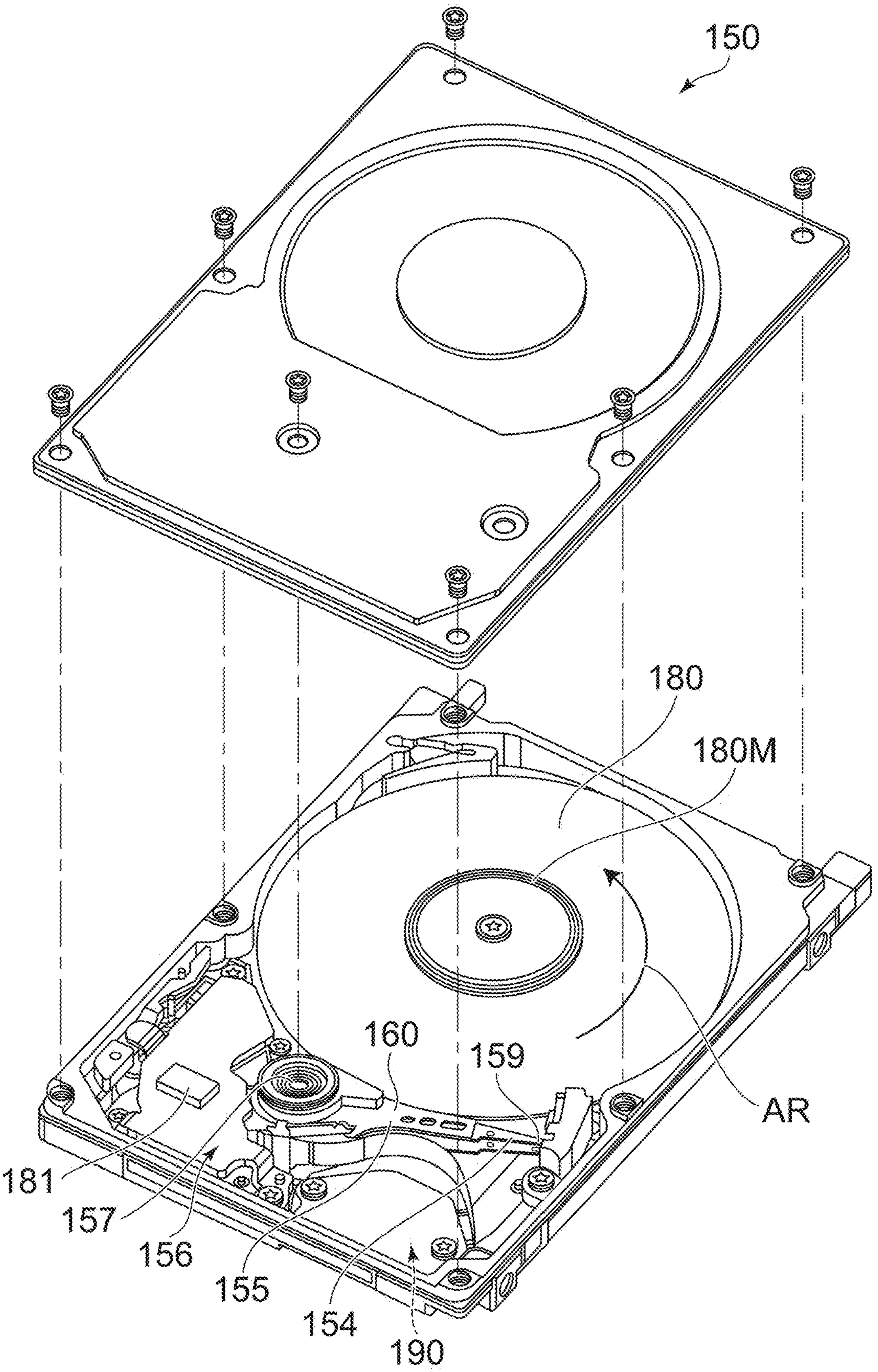
FIG. 65 is a schematic perspective view illustrating the magnetic recording device according to the embodiment.

FIG. 65 is a schematic perspective view illustrating the magnetic recording device according to the embodiment.

Figure 66A:
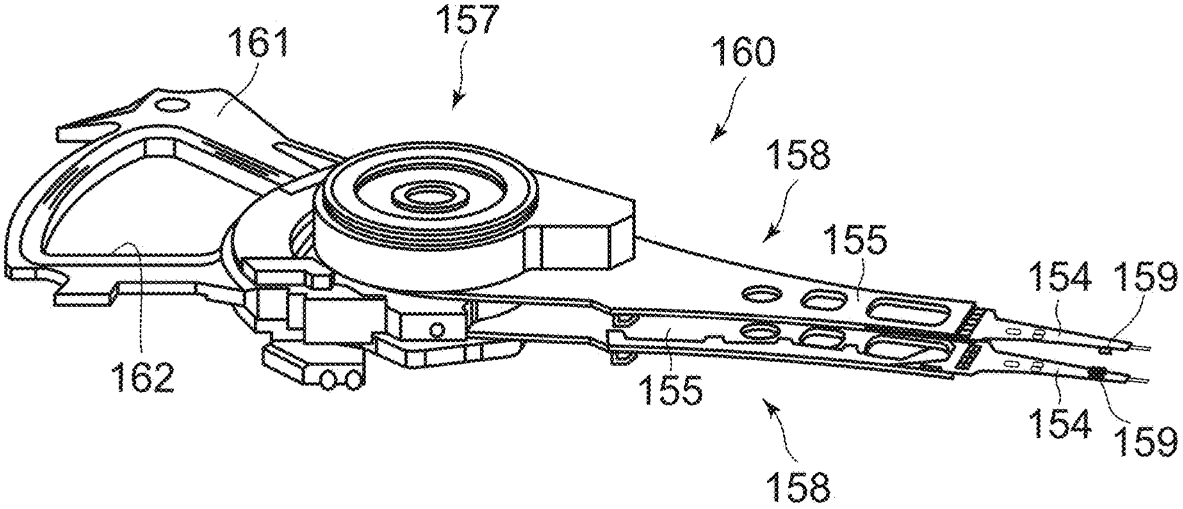
FIGS. 66A and 66B are schematic perspective views illustrating a part of the magnetic recording device according to the embodiment.
Figure 66B:
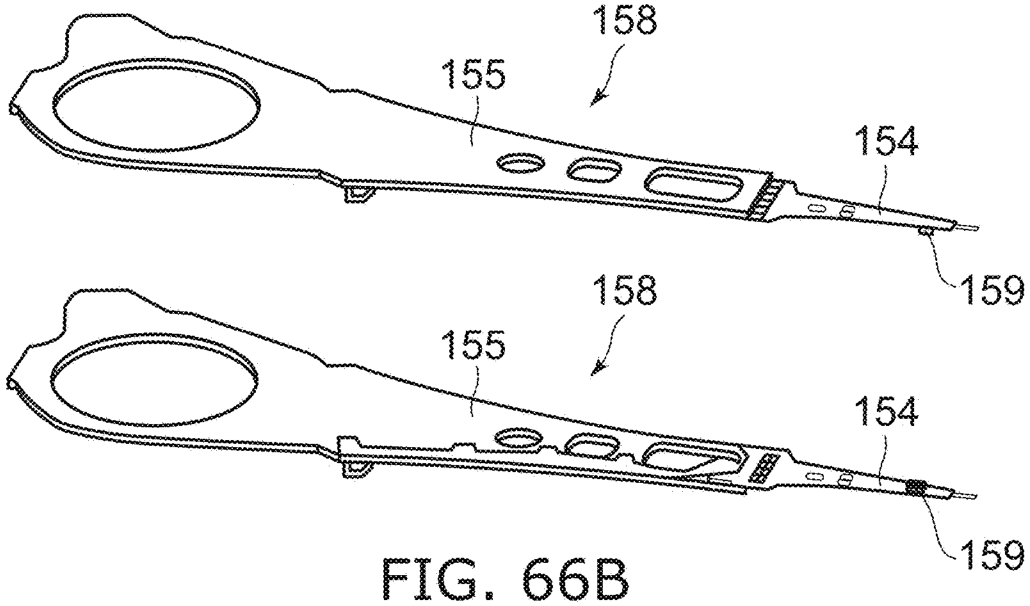

FIGS. 66A and 66B are schematic perspective views illustrating a part of the magnetic recording device according to the embodiment.

As shown in FIG. 65, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 66A is an enlarged perspective view of the head stack assembly 160, illustrating the configuration of a part of the magnetic recording device.

FIG. 66B is a perspective view illustrating the magnetic head assembly (head gimbal assembly: HGA) 158 that forms part of the head stack assembly 160.

As shown in FIG. 66A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 66B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

According to the embodiments, it is possible to provide a magnetic head and a magnetic recording device capable of improving the recording density.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as magnetic poles, magnetic elements, magnetic layers, non-magnetic layers, terminals, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording devices practicable by an appropriate design modification by one skilled in the art based on the magnetic heads and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:

a first magnetic pole;

a second magnetic pole; and a magnetic element provided between the first magnetic pole and the second magnetic pole, the magnetic element including a first magnetic layer, a second magnetic layer provided between the first magnetic layer and the second magnetic pole, a third magnetic layer provided between the second magnetic layer and the second magnetic pole, and a fourth magnetic layer provided between the third magnetic layer and the second magnetic pole, the fourth magnetic layer including a first element and at least one of Fe, Co and Ni, the first element including at least one selected from the group consisting of Cr, V, Mn, Ti, N and Sc, one end of the magnetic element being electrically connected to the first magnetic pole, another end of the magnetic element being electrically connected to the second magnetic pole, a differential electric resistance of the magnetic element when a voltage between the first magnetic pole and the second magnetic pole being changed including a first peak and a first bottom, the voltage corresponding to the first peak being a first peak voltage, the voltage corresponding to the first bottom being a first bottom voltage, the first bottom voltage being positive, an element voltage applied between the first magnetic pole and the second magnetic pole in a recording operation being higher than the first peak voltage and higher than the first bottom voltage, wherein the first peak voltage is positive, wherein the magnetic element includes:

a second non-magnetic layer provided between the first magnetic layer and the second magnetic layer;

a third non-magnetic layer provided between the second magnetic layer and the third magnetic layer;

a fourth non-magnetic layer provided between the third magnetic layer and the fourth magnetic layer; and a fifth non-magnetic layer provided between the fourth magnetic layer and the second magnetic pole, the fourth non-magnetic layer includes at least one selected from the group consisting of Cu, Au, Cr, Al, V, and Ag, the fifth non-magnetic layer includes at least one selected from the group consisting of Cu, Au, Cr, Al, V, and Ag, wherein the magnetic element further includes:

a fifth magnetic layer provided between the third magnetic layer and the second magnetic layer; and a sixth non-magnetic layer provided between the fifth magnetic layer and the third magnetic layer, wherein the first magnetic layer, the second magnetic layer, the third magnetic layer, and the fifth magnetic layer include at least one of Fe, Co, or Ni, and wherein the first magnetic layer, the second magnetic layer, the third magnetic layer, and the fifth magnetic layer do not include the first element, or a concentration of the first element in the first magnetic layer, the second magnetic layer, and the third magnetic layer is lower than a concentration of the first element in the fourth magnetic layer.

2. The magnetic head according to claim 1, wherein the differential electric resistance includes a second peak.

3. The magnetic head according to claim 2, wherein the second peak voltage is positive.

4. The magnetic head according to claim 2, wherein the second peak voltage is negative.

5. A magnetic recording device, comprising:

the magnetic head according to claim 1; and a controller including an element circuit, the element circuit being configured to supply the element voltage.

* * * * *